US006965869B1

(12) United States Patent
Tomita et al.

(10) Patent No.: US 6,965,869 B1
(45) Date of Patent: Nov. 15, 2005

(54) SERVICE POINT MANAGEMENT SYSTEM FOR USE IN SALES PROMOTION SERVICES

(75) Inventors: Tokimori Tomita, Kawasaki (JP);
Shigeta Akihiko, Kawasaki (JP);
Masao Fujiwara, Kawasaki (JP);
Mamoru Matsumoto, Kawasaki (JP);
Yasumasa Hiroshima, Kawasaki (JP);
Satoshi Tomari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/864,762

(22) Filed: May 29, 1997

Related U.S. Application Data

(63) Continuation of application No. 08/187,543, filed on Jan. 28, 1994, now abandoned.

(30) Foreign Application Priority Data

Apr. 9, 1993 (JP) .................................. 5-082905

(51) Int. Cl.[7] ............................................. G06F 17/00
(52) U.S. Cl. ...................................................... 705/14
(58) Field of Search ............................... 364/401, 405, 364/407; 1/408; 705/1, 7, 10, 14, 16, 17, 705/21, 24, 41, 37; 235/375, 379, 380, 381, 235/382; 377/5

(56) References Cited

U.S. PATENT DOCUMENTS

| 4,292,508 A | * | 9/1981 | Rudd ............................. 377/5 |
| 4,361,903 A | * | 11/1982 | Ohta .............................. 455/2 |
| 4,554,446 A | | 11/1985 | Murphy et al. ............. 235/487 |
| 4,723,212 A | | 2/1988 | Mindrum et al. ............. 705/14 |
| 4,746,787 A | * | 5/1988 | Suto et al. .................. 235/379 |
| 4,750,119 A | | 6/1988 | Cohen et al. ................. 705/14 |
| 4,815,741 A | * | 3/1989 | Small ........................... 463/17 |
| 4,876,592 A | * | 10/1989 | Von Kohorn ................ 398/84 |
| 4,882,724 A | * | 11/1989 | Vela et al. .............. 364/401 R |
| 4,885,685 A | | 12/1989 | Wolfberg et al. ............. 705/14 |
| 4,910,672 A | | 3/1990 | Off et al. ....................... 705/14 |
| 4,941,090 A | | 7/1990 | McCarthy ..................... 705/14 |
| 4,949,256 A | * | 8/1990 | Humble ....................... 705/14 |
| 4,972,504 A | * | 11/1990 | Daniel, Jr. et al. ............. 455/2 |
| 4,973,952 A | | 11/1990 | Malec et al. |
| 4,982,346 A | * | 1/1991 | Girouard et al. ............ 364/550 |

(Continued)

FOREIGN PATENT DOCUMENTS

JP 61-273663 12/1986

(Continued)

OTHER PUBLICATIONS

Database Marketng (Article in Catalog AGE, May 1988, pp. 85-97) Author unknown.*

(Continued)

*Primary Examiner*—John Leonard Young
(74) *Attorney, Agent, or Firm*—Staas & Halsey LLP

(57) ABSTRACT

A service point management system employs a computer for managing points issued to each customer who receives service according to the points. A point issue unit issues points to the customer according to transactions performed by the customer. A point accumulation unit calculates and accumulates the issued points. A point notification unit notifies the customer of point information. A customer identification unit identifies the customer according to customer identification data entered through a customer or store terminal. The point notification unit notifies the customer identified by the customer identification unit of the customer's cumulative point information before the customer carries out transactions.

33 Claims, 54 Drawing Sheets

U.S. PATENT DOCUMENTS

| | | | |
|---|---|---|---|
| 5,025,372 A * | 6/1991 | Burton et al. | 705/14 |
| 5,034,596 A * | 7/1991 | Utsunomiya | 235/380 |
| 5,053,955 A | 10/1991 | Peach et al. | 705/14 |
| 5,056,019 A * | 10/1991 | Schultz et al. | 364/405 |
| 5,057,915 A * | 10/1991 | Von Kohorn | 358/84 |
| 5,117,355 A * | 5/1992 | McCarthy | 364/405 |
| 5,144,115 A * | 9/1992 | Yoshida | 705/41 |
| 5,233,514 A | 8/1993 | Ayyoubi et al. | 705/14 |
| 5,245,533 A | 9/1993 | Marshall | 705/10 |
| 5,250,789 A * | 10/1993 | Johnsen | 235/383 |
| 5,264,822 A * | 11/1993 | Vogelman et al. | 340/286.01 |
| 5,287,266 A * | 2/1994 | Malec et al. | 705/1 |
| 5,295,064 A * | 3/1994 | Malec et al. | 364/401 R |
| 5,347,452 A * | 9/1994 | Bay, Jr. | 705/37 |
| 5,483,444 A * | 1/1996 | Heintzeman et al. | 369/401 |
| 5,937,391 A | 8/1999 | Ikeda et al. | 705/14 |

FOREIGN PATENT DOCUMENTS

| | | | |
|---|---|---|---|
| JP | 63-40995 | | 2/1988 |
| JP | 1-99197 | | 4/1989 |
| JP | 01102694 A | | 4/1989 |
| JP | 2-501237 | | 4/1990 |
| JP | 2-111888 | | 9/1990 |
| JP | 03110699 A | | 5/1991 |
| JP | 3-142698 | | 6/1991 |
| JP | 4-264996 | | 9/1992 |
| JP | 04290194 A | | 10/1992 |
| JP | 04315294 A | | 11/1992 |
| JP | 05020341 A | | 1/1993 |
| JP | 05067274 A | | 3/1993 |
| JP | 5-298557 | | 11/1993 |
| JP | 5-342235 | | 12/1993 |
| JP | 6-036143 | | 2/1994 |
| JP | 6-096096 | | 4/1994 |
| WO | 92/14213 | * | 8/1992 |
| WO | 94/09454 | * | 4/1994 |

OTHER PUBLICATIONS

Fischman; "Dahl's Store is Testing Frequent Shopper Plan"; *Supermarket News*; v39 n38; p49 (1); Sep. 18, 1989; Dialog: File 148, Acc# 04112465.*

Thayer; "Database Marketing Demystified"; *Progressive Grocer*; v68 n11; p21(6); Nov., 1989; Dialog: File 148, Acc# 04150369.*

Johnson; "Loyalty Programs Flag: Citicorp, Catalina Pull Plug on Supermarket Tests, Advanced Promotion Tech: Continues to Test Vision Value Club Supermarket Frequent-shopper Club"; *Advertising Age*; Jun. 17, 1991; p. 32; Dialog: File 16, Acc# 03200380.*

"Smart Card Supermarket Program Testing Consumer Promotions"; *Card News*; v7 n8; p7(2); Apr. 20, 1992; Dialog: File 148, Acc# 05929981.*

Author Unknown: "Vision value Goes Live Across Procession", *Card Technology Today*, Jul./Aug. 1992, pp. 9-11.*

U.S. Appl. 09/414,547, filed Oct. 8, 1999, Tokimori Tomita et al.

Gallagher, J.-St. Louis Dispatch, pE1, Dec. 19, 1999- "You can Lose a Chunk of Your Return to Taxes".

Hubbard, C.—Atlanta Business Chronicle, v21, n25, pA8, Nov. 27, 1998- "Sara Lee Kicks off Toz Concept at North Point Mall".

Copy of Office Action from the japanese Patent Office dated Sep. 4, 2001 (3 pages) for the corresponding Japanese Patent Application.

List of Prior Art Information.

Fischman; "Dahl's Store is Testing Frequent Shopper Plan"; *Supermarket News*; v39 n38; p49(1); Sep. 18, 1989; Dialog: File 148, Acc# 04112465.

Thayer; "Database Marketing Demystified"; *Progressive Grocer*; v68 n11; p21(6); Nov., 1989; Dialog: File 148, Acc# 04150369.

Johnson; "Loyalty Programs Flag: Citicorp, Catalina Pull Plug on Supermarket Tests, Advanced Promotion Tech: Continues to Test Vision Value Club Supermarket Frequent-shopper Club"; *Advertising Age*; Jun. 17, 1991; p. 32; Dialog: File 16, Acc# 03200380.

"Smart Card Supermarket Program Testing Consumer Promotions"; *Card News*; v7 n8; p7(2); Apr. 20, 1992; Dialog: File 148, Acc# 05929981.

* cited by examiner

Fig.7(B)

| GROUP NAME | TARGET | TARGET POINTS | PRESENT CUMULATIVE POINTS |
|---|---|---|---|
| NAKAHARA ELEMENTARY SCHOOL | MONOCYCLES (10 SETS) | 50,000 | 35,000 |
| KOSUGI NURSING HOME | WHEEL CHAIRS (3 SETS) | 60,000 | 20,000 |
| SUPPORT ASSOCIATION FOR CHILDREN ORPHANED IN TRAFFIC ACCIDENTS | PERSONAL COMPUTER | 40,000 | 15,000 |
| ... | ... | ... | ... |
| SOMALIA AID ASSOCIATION | FOOD | 300,000 | 80,00 |

LET'S PARTICIPATE IN SOCIAL CONTRIBUTION ACTIVITIES

Fig. 9(A)

```
*SET POINT CALCULATION RATE FOR SPECIFIC DAYS*

• SELECT ONE
    1. DATE: MONTH__DAY__
    2. PERIOD: MONTH__DAY__ TO MONTH__DAY__
    3. DAY: __ , __
• RATE:__%
• CALCULATION BASE:
    1. AMOUNT OF MONEY   2. TOTAL POINTS
```

Fig. 9(B)

```
*SET POINT CALCULATION RATE FOR SPECIFIC PERIOD*

• PERIOD: MONTH__DAY__ TO MONTH__DAY__
• CALCULATION BASE:
    1. AMOUNT OF MONEY   2. TOTAL POINTS
    3. NUMBER OF PURCHASE ACTIONS
• MINIMUM: __ OR MORE
• RATE: __ POINTS
```

Fig. 9(C)

```
*SET POINT CALCULATION RATE FOR SPECIFIC AREA*

• AREA CODE: __
• CALCULATION BASE:
    1. AMOUNT OF MONEY   2. TOTAL POINTS
• RATE:__%
```

Fig. 9(D)

*SET POINT CALCULATION RATE FOR CUSTOMER'S SPECIFIC DAY*

- SELECT CUSTOMER'S SPECIFIC DAY
  1. BIRTHDAY  2. WEDDING ANNIVERSARY
  3. BIRTHDAYS OF FAMILY  4. DATE OF ADMISSION
- CALCULATION BASE:
  1. AMOUNT OF MONEY  2. TOTAL POINTS
- RATE:__%

Fig. 9(E)

*SET POINT CALCULATION RATE FOR SPECIFIC TIME BAND*

- SPECIFY TIME BAND
  __:__ TO __:__
- CALCULATION BASE:
  1. AMOUNT OF MONEY  2. TOTAL POINTS
- RATE:__%

Fig. 9(F)

*SET POINT CALCULATION RATE FOR SPECIFIC COMMODITIES*

| COMMODITY CODE | COMMODITY NAME |
|---|---|
|  |  |
| ⌇ | ⌇ |
|  |  |

- RATE: __ % (COMMODITY PRICE)

Fig. 9(G)

**\*SET POINT CALCULATION RATE FOR NUMBER OF PURCHASE\***

| NUMBER OF PURCHASE | RATE |
|---|---|
| 1 TO 30 | 1% |
| 31 TO 60 | 2% |
| 61 - | 3% |

(POINTS ARE CALCULATED ON TOTAL AMOUNT.)

Fig. 9(H)

**\*SET POINT CALCULATION RATE FOR NUMBER OF ACCESSES\***

| NUMBER OF ACCESSES | RATE |
|---|---|
| 1 TO 100 | 1% |
| 101 TO 300 | 2% |
| 301 - | 3% |

(POINTS ARE CALCULATED ON TOTAL AMOUNT.)

Fig. 9(I)

**\*SET POINT CALCULATION RATE FOR AMOUNT\***

| PURCHASE AMOUNT | RATE |
|---|---|
| ¥10,000~¥20,000 | 1% |
| ¥20,001~¥40,000 | 2% |
| ¥40,001~ | 3% |

(POINTS ARE CALCULATED ON TOTAL AMOUNT.)

Fig. 9(J)

| *SET POINT CALCULATION RATE FOR CUSTOMER RANK* | | | |
|---|---|---|---|
| CUSTOMER RANK | RATE | CUSTOMER RANK | RATE |
| AAA | _% | C | _% |
| AA | _% | D | _% |
| A | _% | E | _% |
| B | _% | F | _% |
| (POINTS ARE CALCULATED ON TOTAL AMOUNT.) | | | |

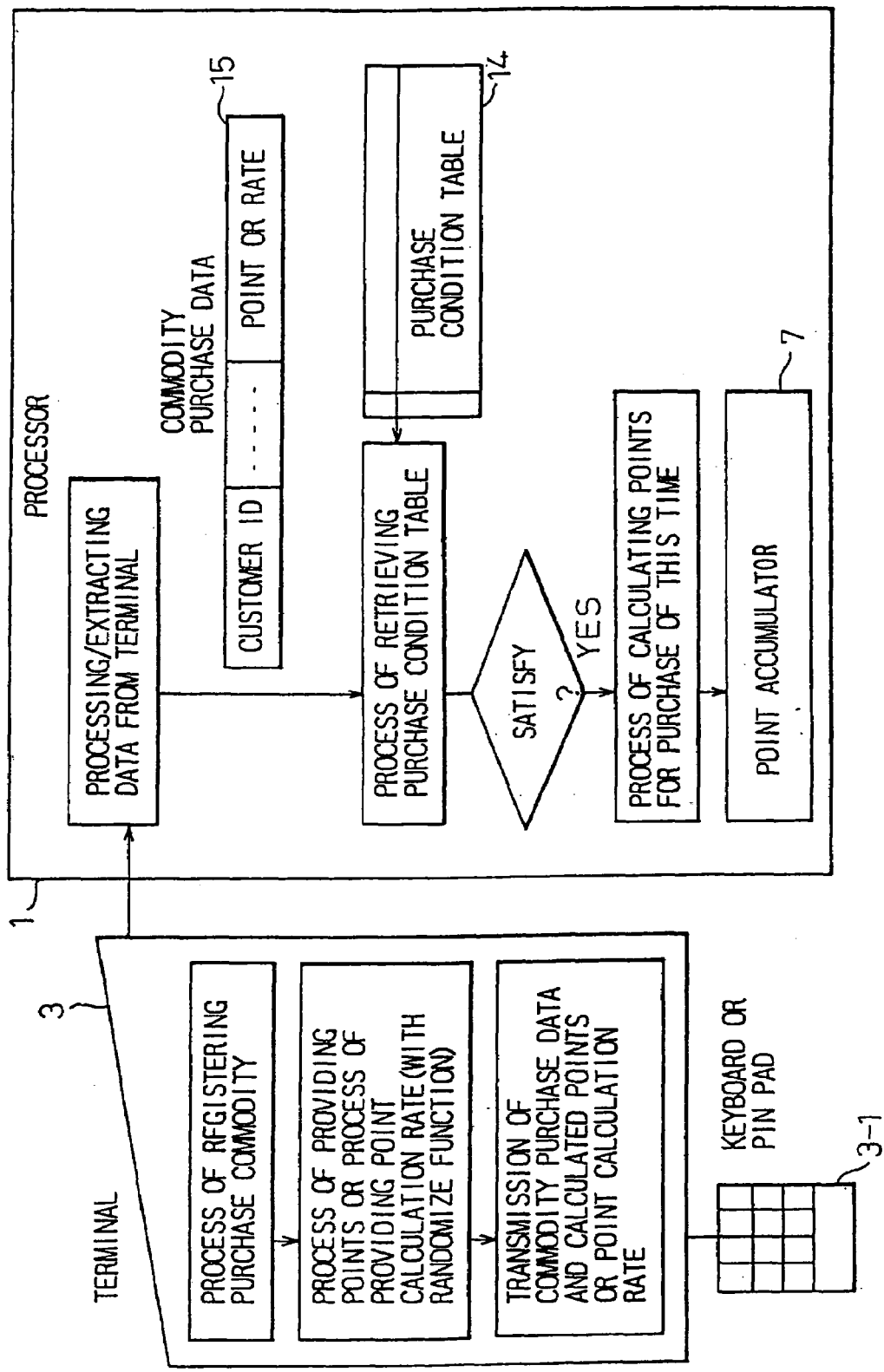

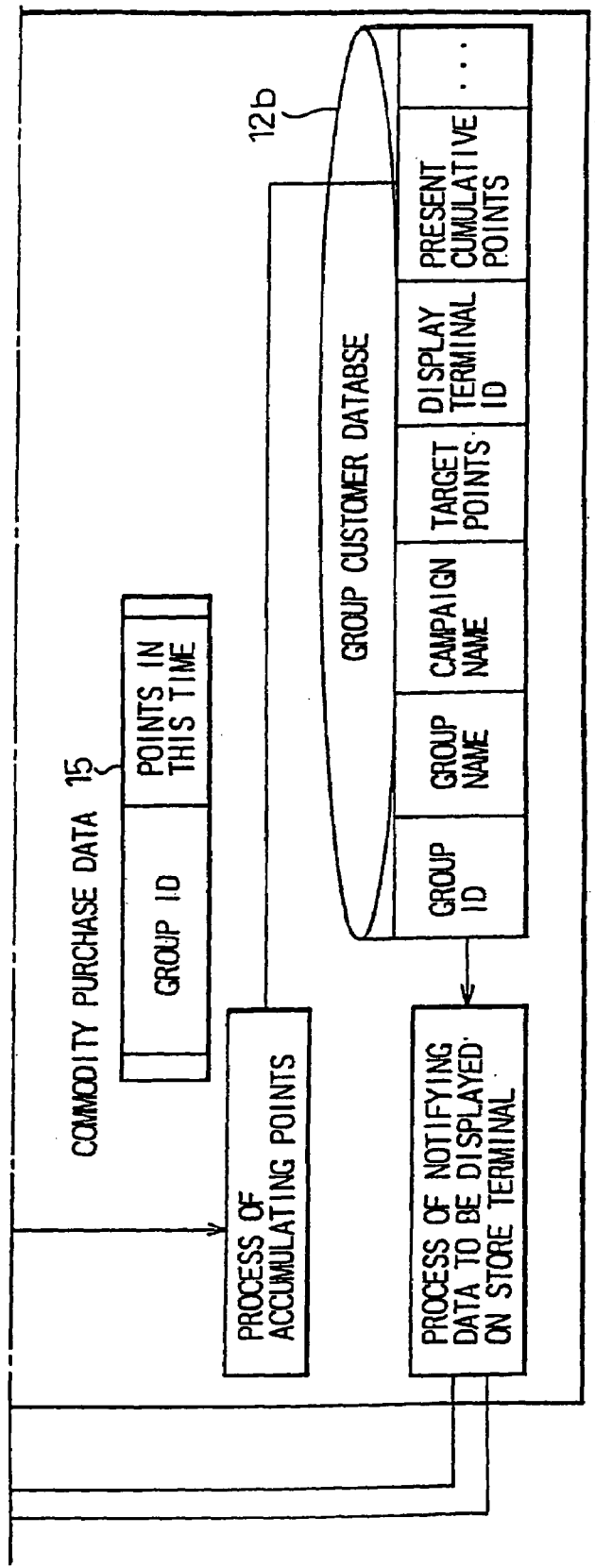

Fig. 24 (A)

| CUSTOMER ID | | NAME | | CUMULATIVE POINTS | |
|---|---|---|---|---|---|

| COMMODITY NO. | 1 | 2 | 3 | 4 |
|---|---|---|---|---|
| REQUIRED POINTS | | | | |
| EXCHANGEABILITY | | | | |
| COMMODITY NAME | | | | |
| PICTURE OF COMMODITY | | | | |

⇧ PREVIOUS PAGE — 35-1a

[PROCEDURE] EXCHANGING PROCEDURE — 35-1c

⇩ NEXT PAGE

[END] END — 35-1f, 35-1b

EXCHANGING PROCEDURE

| SPECIFIED COMMODITY NO. | ① | ② | ③ | ④ | ⑤ |
|---|---|---|---|---|---|
| REQUIRED POINTS | | | | | |
| TOTAL POINTS | | | | | |
| BALANCE OF POINTS | | | | | |

[D K] PROCEDURE DETERMINATION — 35-1d   [CANCEL] CANCEL — 35-1e

| DEPOSIT AMOUNT DISPLAY | CHANGE | CHANGE DISPLAY | 35-3b |
|---|---|---|---|
| 35-3a | CUMULATIVE POINTS | CUMULATIVE POINTS DISPLAY | 35-3c |

SERVICE POINT MANAGEMENT SYSTEM FOR USE IN SALES PROMOTION SERVICES

This application is a continuation of application Ser. No. 08/187,543, filed Jan. 28. 1994, now abandoned.

BACKGROUND OF THE INVENTION

1. Field of the Invention

The present invention relates to a point management system for managing service points issued to customers through customer or store terminals according to customers' transactions. The service points are used for providing the customers with sales promotion services.

2. Description of the Related Art

In retail transactions, sales promotion service "points" (hereinafter referred to as the points) such as coupons, stamps, and service cards are issued. The coupons are issued or marks are stamped on a specific sheet according to the amount of purchase. When the number of coupons or marks reaches a predetermined figure, one can exchange them for commodities or notes, or partly pay for purchased commodities with them. Namely, the service points are a kind of sales promotion service. To issue the coupons, etc., a store must convert the amount of purchase into points. To exchange the coupons for commodities, the store must count the numbers of coupons presented by customers. This is troublesome and frequently involves errors. On the customers side, they must keep the coupons and marked sheets and see whether or not the number of the coupons or marks is exchangeable for commodities.

To reduce the troublesome work and risk of losing the coupons, the service points may be added up at a POS terminal at a checkout counter, and whether or not the points are exchangeable for predetermined commodities may be printed on a receipt, as disclosed in "POS Terminal Apparatus" of Japanese Unexamined Patent Publication (Kokai) No. 63-40995. This disclosure, however, lets a customer know its cumulative points only after the checkout. In addition, actual service such as exchanging for service commodities provided by salesclerks, puts a heavy load on a store. The service provided to customers is limited to exchanging for commodities and discount, which does not fully satisfy a variety of customer requirements.

Another disclosure ("A Method of and an Apparatus for Automatically Issuing Service Coupons" of Japanese Unexamined Patent Publication (Kokai) No. 4-264996) employs an identification card for a customer, adds up service points, issues a service coupon from an automatic coupon dispenser according to the service points, reads the coupon with a POS terminal, and deducts the amount of the coupon from the purchase. According to this technique, a customer must always carry the identification card with him or her when purchasing commodities and keep the card and exchanged service coupons. This is troublesome for customers. On the other hand, a store must once change service points into service coupons and read the service coupons through POS terminals, to provide a service. Namely, the store must increase manpower to provide the service. The service is limited to discounting so that it insufficiently satisfies a variety of customer needs.

Another method converts the amount of a purchase into points, stores cumulative points in a recording medium such as a magnetic card carried by a customer, and updates the stored data whenever the customer purchases commodities or receives service. This method has the following problems.

(1) The customer must carry the recording medium whenever purchasing commodities.

(2) It is impossible for the customer to confirm cumulative points before purchasing commodities.

(3) If the recording medium is lost or destroyed, the cumulative points will be lost, and it is virtually impossible to restore the data.

(4) Ways of accumulating points and providing service are fixed, and it is difficult to flexibly change points and services.

(5) Service information will be given to customers only in pamphlets and direct mail. It is impossible to provide customers with service information according to their needs.

Customers have a variety of needs, not only exchanging points for commodities or money. Retail transactions involve not only sales at stores but also mail-order sales through telephones and personal computers. It is required to provide the same service for these different transactions.

Stores require a point management system that not only issues service points to attract customers but also supports sales promotion services that let customers enjoy shopping with no inconvenience.

SUMMARY OF THE INVENTION

In light of the above problems, the present invention is devised to solve them.

An object of the present invention is to provide a system that is capable of issuing and accumulating points with a seller's computer even if customers have no recording media or member cards and informing the customers of points whenever they request them.

Another object of the present invention is to easily set point-giving methods for various purchase conditions, thereby to improve sales.

Still another object of the present invention is to flexibly provide service information according to customers' cumulative points, thereby to promote sales.

Still another object of the present invention is to provide a point management system that is capable of handling individual and group customers as well as mail-order sales.

In accordance with the present invention, there is provided a service point management system for sales promotion services in retail sales employing a computer for managing points issued to each customer who receives service according to the points. The service point management system of the present invention comprises: a point issuer issuing points according to the customer according to transactions performed by the customer; a point accumulator calculating and accumulating the issued a points; point notifier notifying the customer of point information; and a customer identifier identifying the customer according to customer identification data entered through a customer or store terminal. The point notifier means notifies the customer identified by the customer identifier of the customer's cumulative point information in advance of the sales transaction.

The service point management system according to the present invention identifies a customer who purchases commodities by visiting a store or through a mail-order system, according to an ID signal of the customer entered into the processor through the customer or store terminal connected to the processor through public circuits. The point management system notifies and issues points to the customer, adds up the points and provides service to the customer without salesclerks directly contacting the customer. The system allows the point calculation rate to be changed anytime. The system provides service for various forms of transaction such as mail-order sales using telephones and personal computers without increasing the load on a seller.

Each customer is notified of cumulative points, the target points (that is, points for receiving predetermined services according to the offered points from the stores, for example, offered points in exchange for a premium, a gift certificate, and a theater thicket or points for receiving services of music, film software or the like) of required service, and a shortage of points with respect to the target points, through the customer, store terminal, or a video cart (that is, a kind of shopping cart equipped with a CRT or liquid crystal display) that receives the point and service data transmitted in the store, in a first stage of terminal operation or before purchasing commodities. Accordingly, this system improves customer's interest in the point service system and attracts the customers by notifying the customers of commodity points to be selected by the customers.

BRIEF DESCRIPTION OF THE DRAWINGS

FIG. 7(A) is a flowchart of the management of service points for specific groups and FIG. 7(B) is an example of the display on a screen based on an operational procedure of FIG. 7(A);

FIGS. 9(A) to 9(J) are examples of the display on a screen for setting a point calculation rate at a manager terminal;

FIG. 20 is a view explaining a process of issuing points involving random functions;

FIGS. 22(A) and 22(B) are views explaining a process of collectively accumulating points for a specific group carried out by the point accumulator;

FIGS. 24(A) and 24(B) are views showing a display image of processed data on a display installed at a terminal;

DESCRIPTION OF THE PREFERRED EMBODIMENTS

An embodiment of the present invention will now be explained in detail with reference to drawings.

Figure 1:
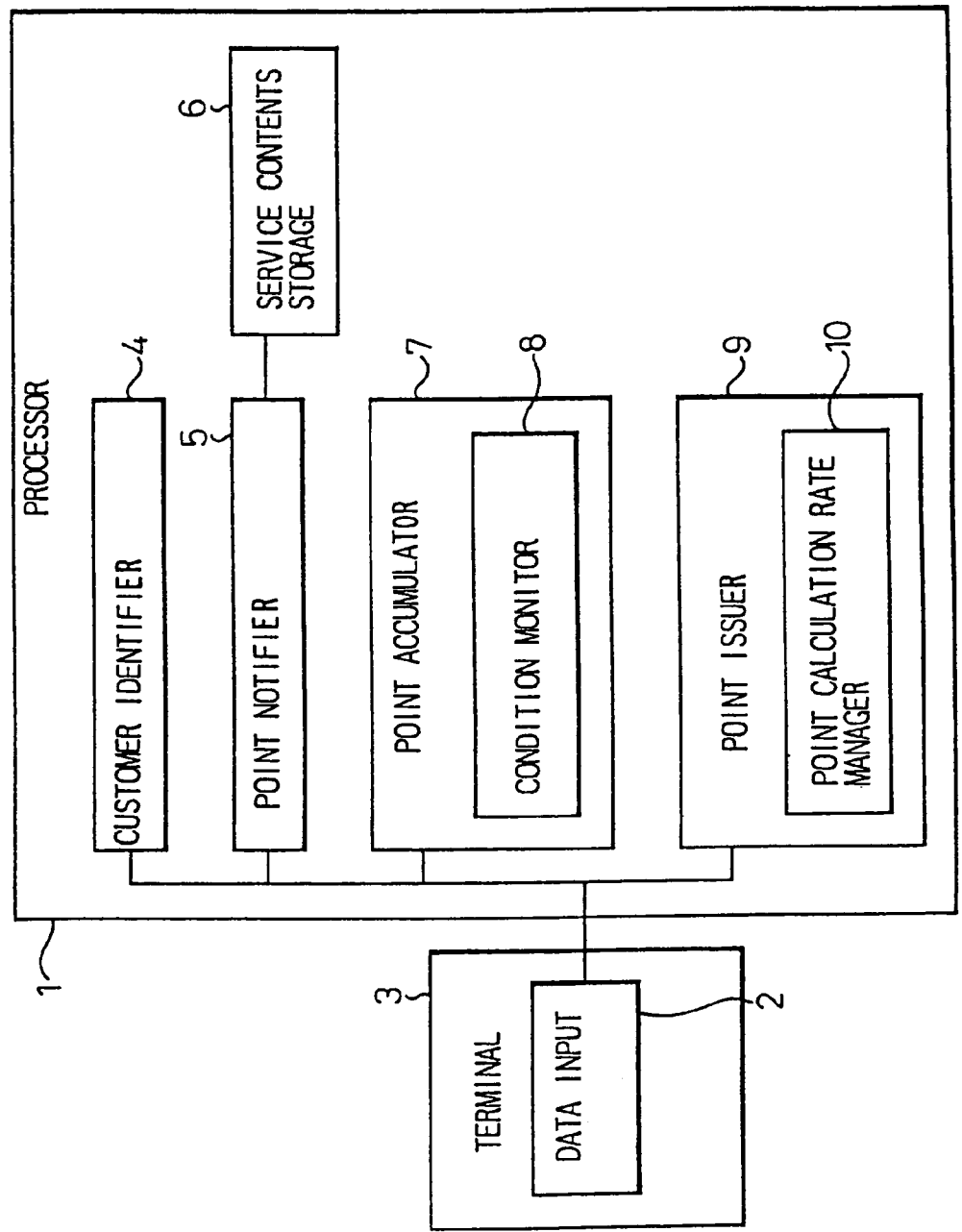
FIG. 1 is a block diagram showing a service point management system according to the present invention.

In FIG. 1, numeral processor 1 comprises a CPU and memories (which are not shown in FIG. 1). The processor is installed in a store, the center of a group of stores, or a VAN center. Data input 2 is included in a customer or store terminal 3, customer identifier 4, point notifier 5, service contents storage 6, point accumulator 7, condition monitor 8, point issuer 9, and rate manager 10, which may be implemented as software programs. The data input means 2 may be incorporated in the processor 1 and installed in a store, or according to this embodiment, provided for the customer or store terminal 3 connected to the processor 1 through public communication circuits.

The following explanations are based on the data input 2 being provided for the customer or store terminal 3 connected to the processor 1 through communication circuits. Part of the functions of the processor 1 may be carried out by the terminal 3.

The customer identifier 4 identifies a customer according to customer identification data such as a customer ID number entered through the customer or store terminal 3.

The point notifier 5 transmits the cumulative point information of the customer identified by the customer identifier 4 to the customer before a transaction to be performed by the customer, and reads service data out of the service contents storage 6, which stores a list of services and corresponding points, within a range selected by the customer through the customer terminal. The read data is transmitted to the terminal 3.

The point accumulator 7 accumulates points issued by the point issuer 9. The condition monitor 8 changes the points according to predetermined conditions. The change is transmitted as point information to the point notifier 5.

The point issuer 9 employs the rate manager 10 that changes the point calculation rate according to transactions and stores the rate. The point issuer 9 calculates points according to the rate and transmits the calculated points to the point accumulator 7 for the customer identified by the customer identifier 4.

Figure 2:
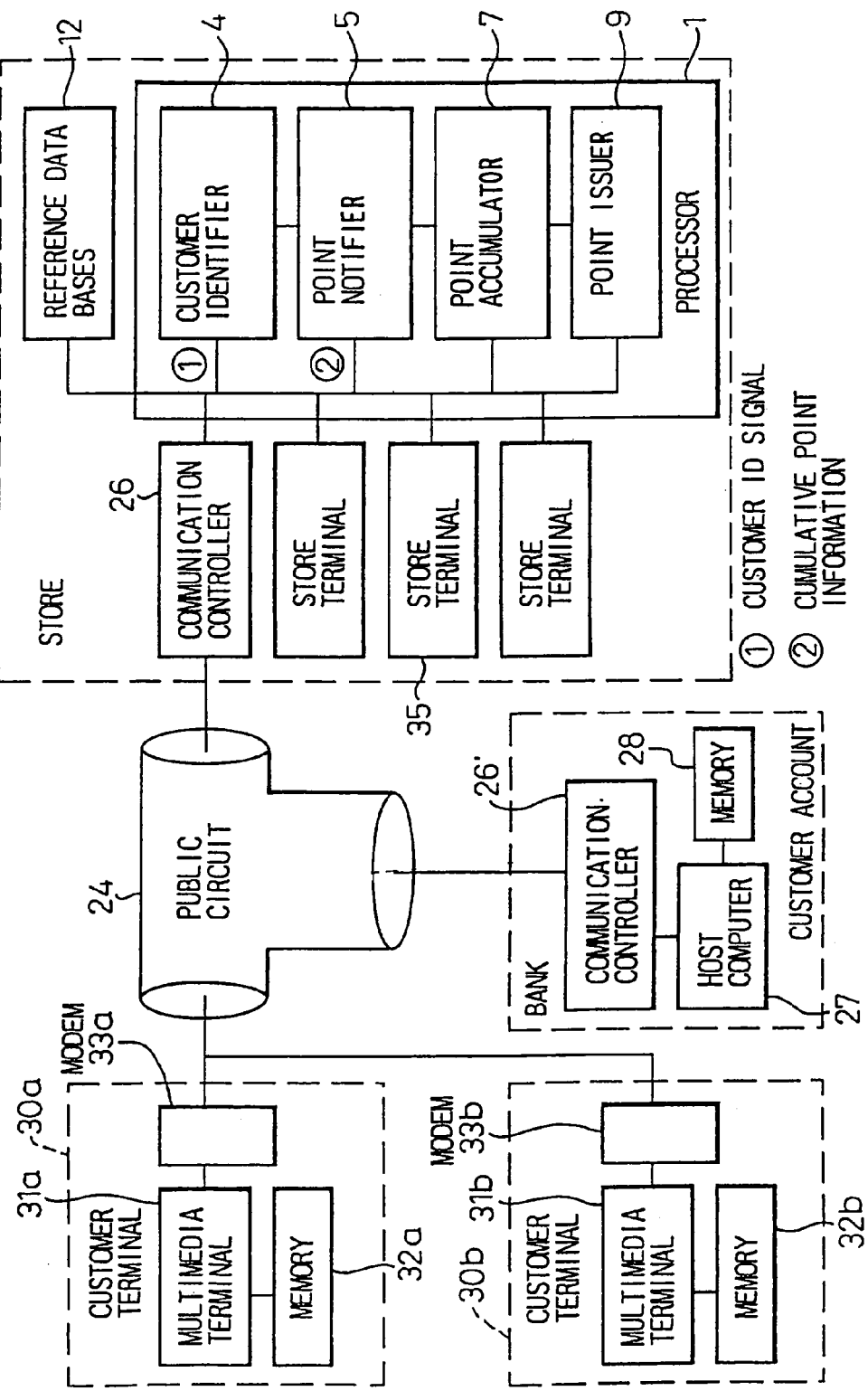
FIG. 2 is a block diagram showing the overall system of an embodiment according to the present invention.

FIG. 2 explains the whole system according to the embodiment of the present invention.

In FIG. 2, a customer terminal 30a including a multimedia terminal 31a (that is, information display terminal which is regarded generally as a personal computer that can process image information, speech information or the like), a memory 32a, and a modem 33a. The customer terminal 30a is connected to the processor 1 through a communication circuit 24 and a communication controller 26. The processor 1 comprises the customer identifier 4, point notifier 5, point accumulator 7, point issuer 9, and reference data bases 12 including a customer data base, etc. Another customer terminal 30b comprises a multimedia terminal 31b, a memory 32b, and a modem 33b. The customer terminal may be comprised of a personal computer communication terminal or a television/telephone set.

The processor 1 may be installed in a store, or in a computer or business center in the case of a large-scale retailer having many stores. One or a plurality of store terminals for customers who visit a store are connected to the processor 1. When a customer ID signal or number is entered through the store terminal 35 or customer terminal 30a or 30b as indicated with 1 in FIG. 2, the customer identifier 4 of the processor 1 identifies the customer. If there is point information such as cumulative points for the customer, the point notifier 5 provides the point information as indicated with 2 in FIG. 2. When purchase data is entered, the point issuer 9 provides point information to the point accumulator 7. The point accumulator 7 accumulates and updates points and transfers the updated point information to the point notifier 5. The point notifier 5 notifies the point information to the store terminal 35 or the customer terminal 30a or 30b, which displays the point information.

The processor 1 provides each of the customer terminals 30a and 30b with functions of on-line purchase, target guidance for explaining kinds of services which can be received such as a gift, theater tickets or the like in exchange for offered points, point issuance, point inquiry, etc., for mail-order sales. For purchases carried out by customers visiting a store, each of the store terminals 35 has functions of target guidance, point issuance, point inquiry, etc. The processor 1 and customer terminals 30a and 30b are connected to a host computer 27 installed in a bank or a credit company through the public communication circuit 24 and a communication controller 26'. The host computer 27 stores customer account data in a memory 28, to carry out transactions such as money transfer, balance notification, balance inquiry, and withdrawal. Namely, purchase transactions carried out at the stores or through the mail-order system can be settled on line.

Figure 3:
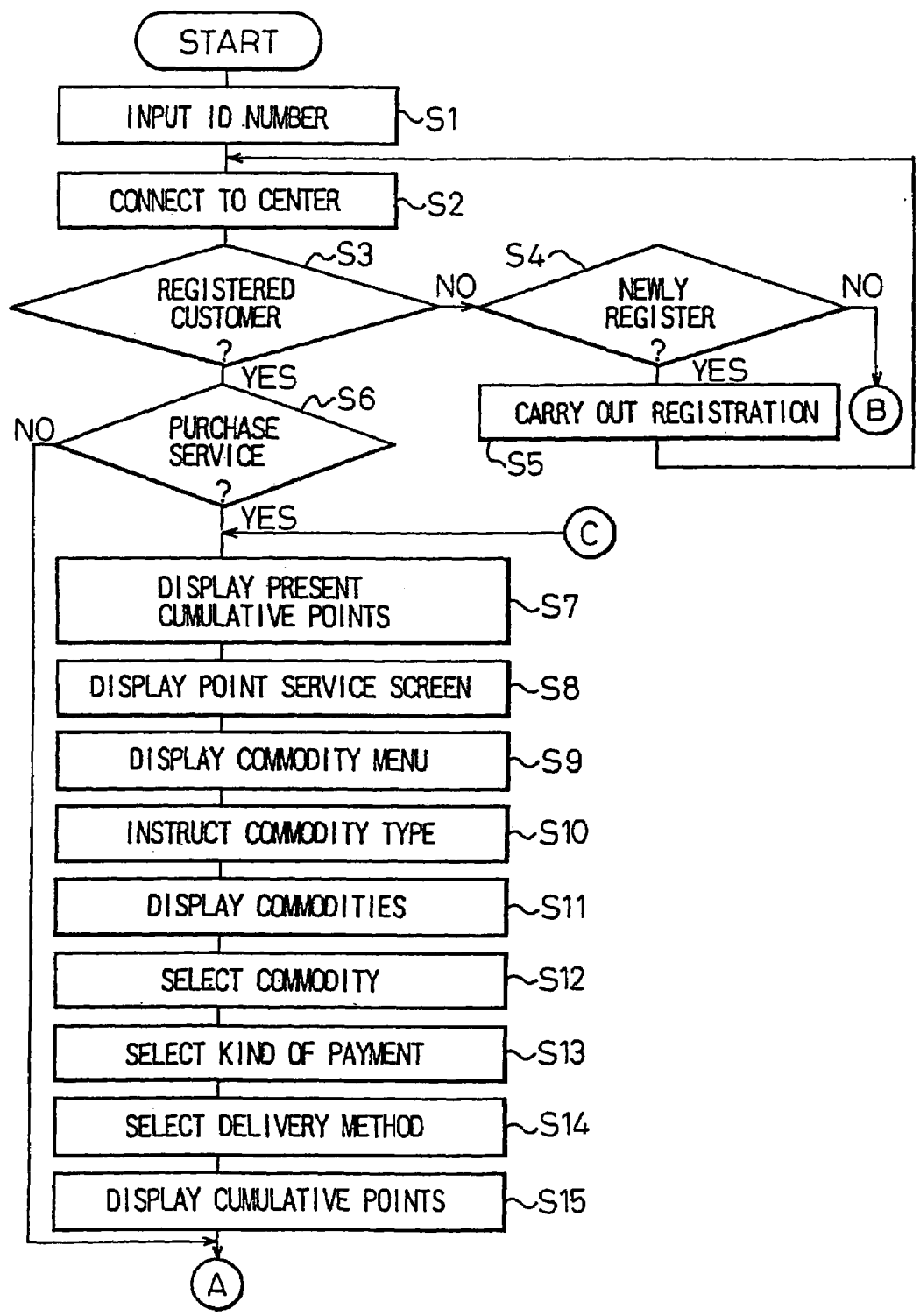
FIG. 3 is a flowchart of the operation of a customer terminal.
Figure 4:
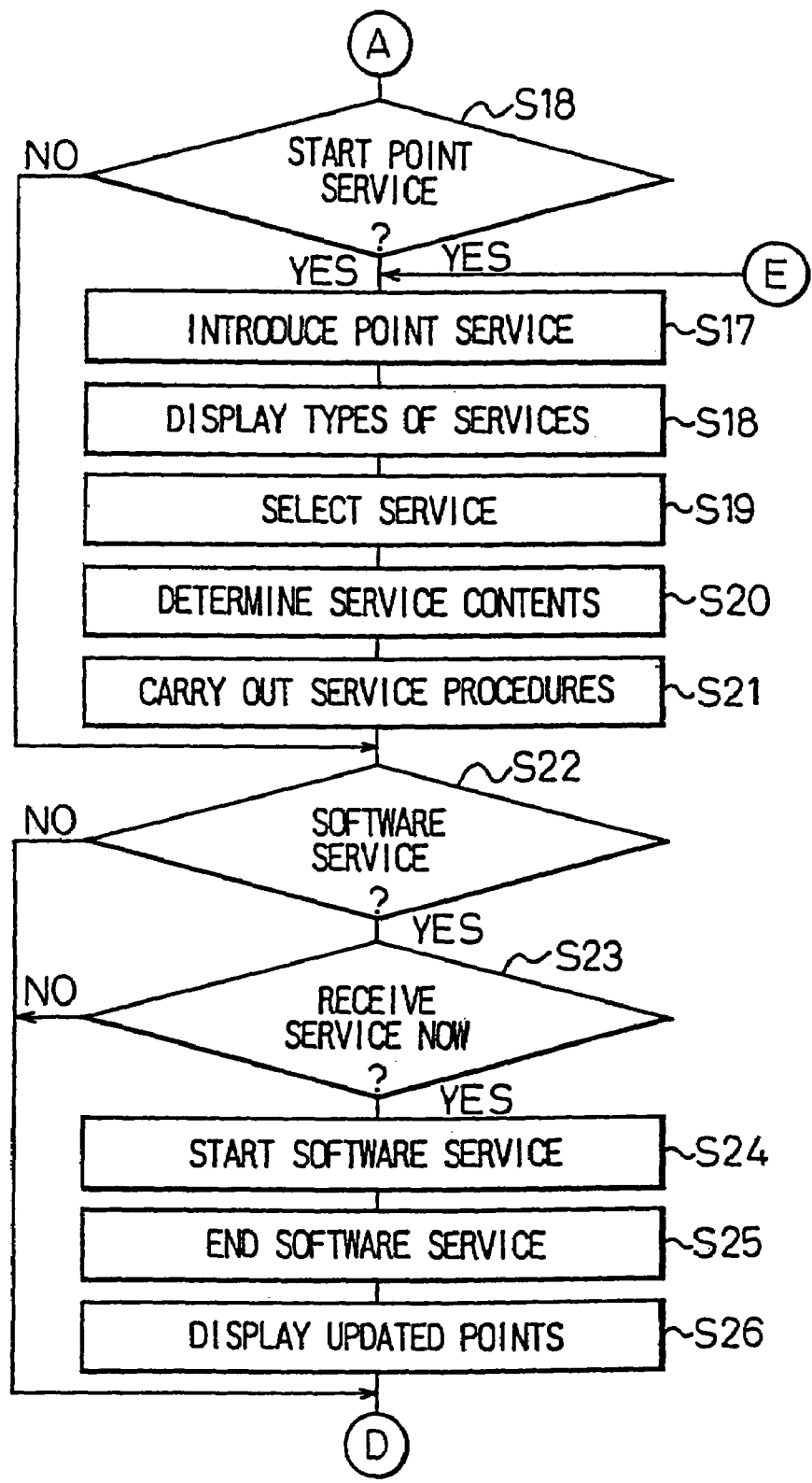
FIG. 4 is a flowchart of the operation of the customer terminal which is connected to a mark A in FIG. 3.
Figure 5:
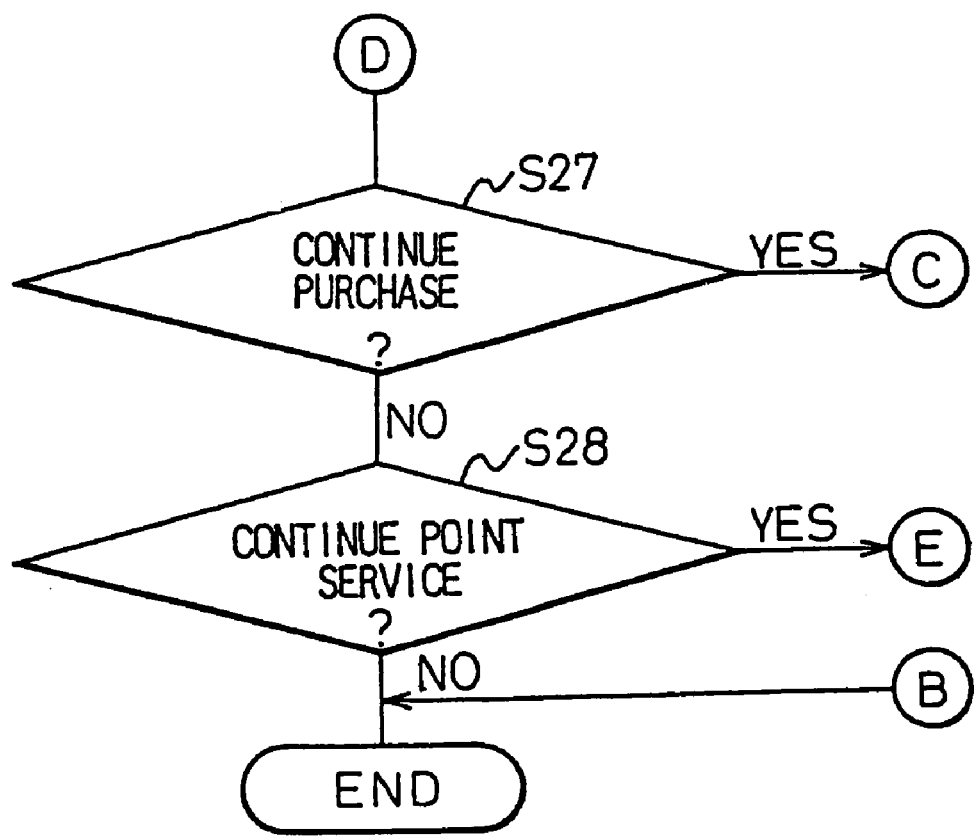
FIG. 5 is a flowchart of the operation of the customer terminal which is connected to a mark D in FIG. 4.

FIGS. 3, 4, and 5 show the operations of the customer terminal. The operations will be explained with reference to the figures.

In step S1, a customer ID number is entered through the customer terminal.

In step S2, the customer terminal is connected to the processor 1 installed in the business center through the circuit, and the customer ID number is transmitted to the processor 1.

Step S3 determines according to a response from the center whether or not the entered ID number is registered. If it is registered, step S6 is carried out, and if it is not, step S4 is carried out.

In the step S4, information to instruct whether or not the customer is to be registered is entered. If registration is requested, step S5 is carried out, and if not, the flow ends.

Step S5 carries out the customer registration, and the flow returns to the step S2.

In step S6, the customer enters an instruction according to a menu. If there is a request to start a purchase, step S7 is carried out, and if not, step S16 is carried out.

The step S7 displays the present cumulative points of the customer. As and when requested, the number of purchase transactions, the number of accesses (that is, the number of times the customer utilizes a terminal to refer to information), and target points (that is, required number of points for which the customer can receive predetermined services) of the customer are displayed.

Step S8 displays point service information including special days of the store (that is, specified days when an event is held in a store, such as a special sale, a Christmas bargain sale or the like), special days for the customer (that is, special days for the particular customer, such as a birthday, a wedding anniversary or the like), service hours, service periods, service areas, etc.

Step S9 displays a menu of commodities including special commodities, sales promotion commodities, etc.

In step S10, the customer specifies a type of commodities on the menu.

Step S11 displays commodities according to the specified type. For example, the views, functions, manufacturer names, prices, points, and point rates of the commodities are displayed.

In step S12, the customer selects and enters a required commodity.

In step S13, the customer enters a bank name, an account number, and a method of payment such as lump sum or installment plan.

In step S14, the customer enters a method of delivering the commodity.

Step S15 displays updated cumulative points of the customer according to the purchase of the commodity.

In step S16, the customer enters an instruction to start or not to start a point service process. If the process is to be started, step S17 is carried out, and if not, step S22 is carried out.

Step S17 displays a guide to the point service.

Step S18 displays branches of the point service including retrieval with indexes and services to be provided for points approximately equal to the customer's cumulative points.

In step S19, the customer selects one branch of the point service.

In step S20, the customer determines the contents of the service to receive.

Step S21 carries out procedures according to the selected service such as commodities, tickets, retrieval service (a retrieval from a data base such as a press story, a directory of names, wanted columns or the like), or software service (which offer music software, a video software or the like at the customer terminal through a communication line).

Step S22 determines if the selected service is the software service. If it is YES, step S23 is carried out, and if it is NO, step S27 is carried out.

Step S23 asks the customer whether or not the software service must be given now. If the answer is YES, step S24 is carried out, and if NO, step S27 is carried out.

The step S24 displays the customer's present points and starts the software service involving video software information, PCM music information, game software information, etc.

Step S25 ends the software service.

Step S26 displays updated points.

In step S27, the customer enters an instruction. If the customer instructs the purchase of another commodity, the flow returns to the step S7, and if not, step S28 is carried out.

In the step S28, the customer instructs whether or not the point service is to be continued. If it is to be continued, the flow returns to the step S17, and if not, the flow ends.

Figure 6:
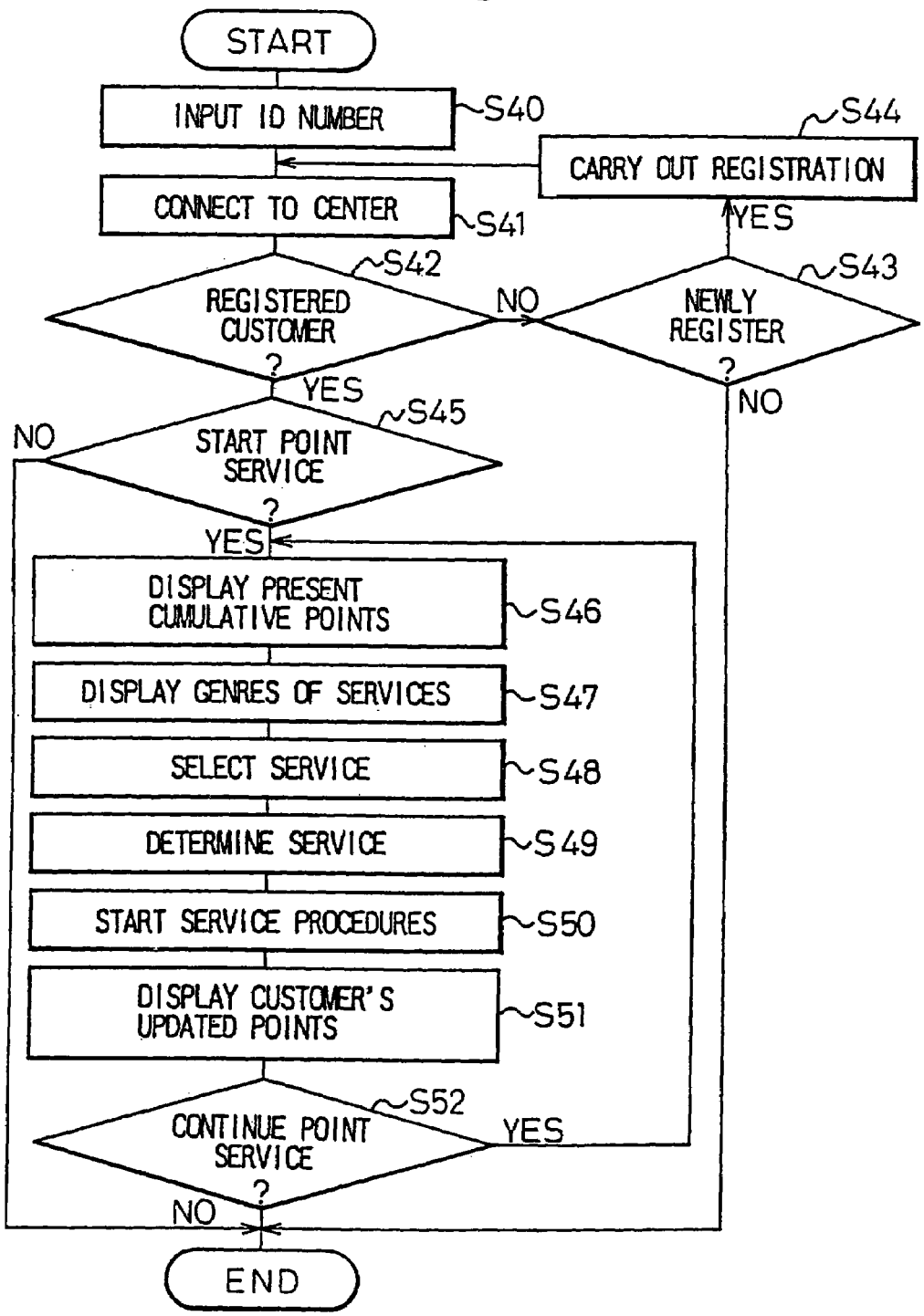
FIG. 6 is a flowchart of the operation of a store terminal.

FIG. 6 shows the operations of the store terminal 35. The operations of the store terminal 35 will be explained next.

In step S40, a customer ID number is entered.

In step S41, the store terminal is connected to the processor 1 installed in the store or business center.

According to a response from the center, step S42 determines whether or not the entered ID number is registered. If it is registered, the flow goes to step S45, and if not, step S43.

In the step S43, it is determined whether or not it is requested to newly register the customer. If the registration is requested, the flow goes to step S44, and if not, ends.

The step S44 registers the customer and returns to the step S41.

Step S45 determines according to an instruction whether or not point service is to be started. If the point service is to be started, the flow goes to step S46, and if not, ends.

Step S46 displays the present cumulative points of the customer.

Step S47 displays classified point services including a retrieval service with indexes and services to be provided for points around the cumulative points.

In step S48, an instruction to start one of the point services requested by the customer is entered.

In step S49, an instruction to determine the service to be provided is entered.

Step S50 carries out a procedure for providing the requested service such as commodities and tickets.

Step S51 displays the points of the customer updated after the presentation of the service.

In step S52, an instruction to continue or not to continue the point service is entered. If it is to be continued, the flow returns to the step S46, and if not, ends.

Figure 7A:
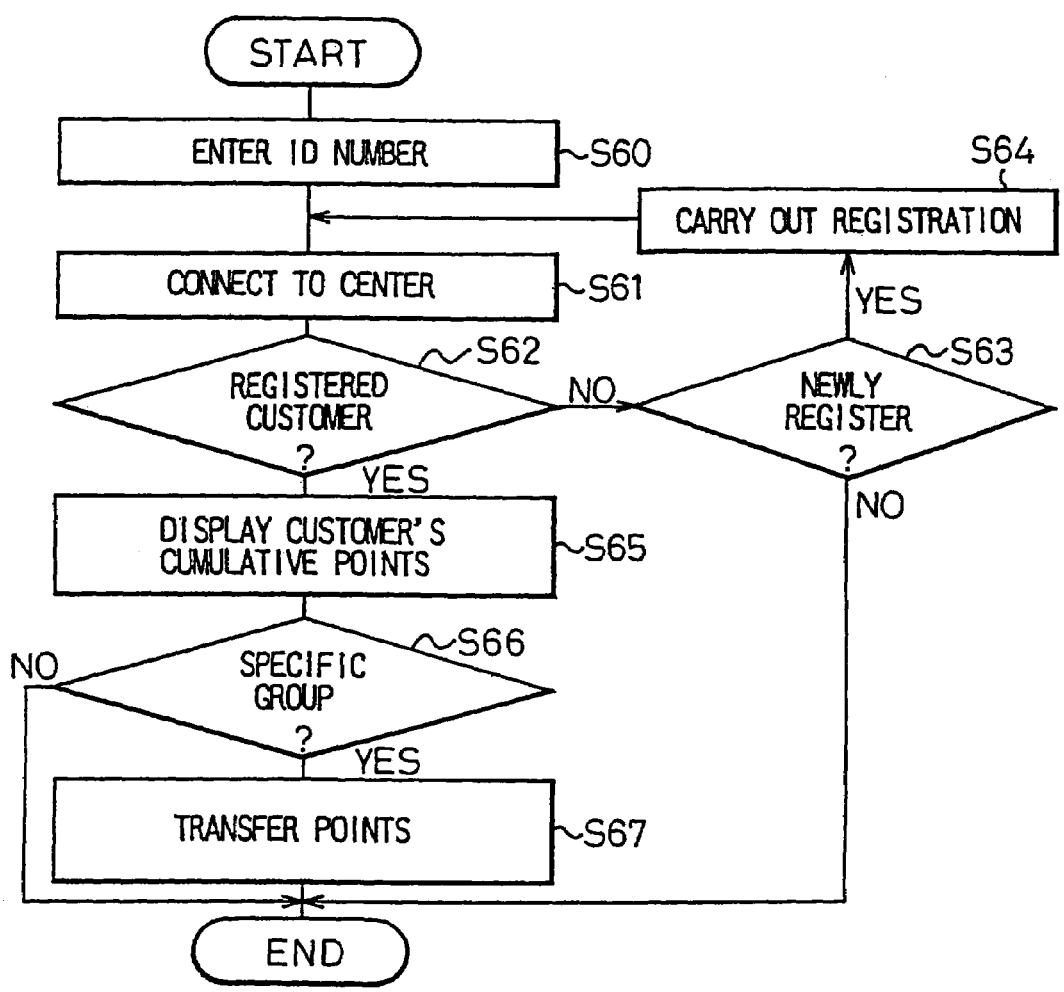

FIG. 7(A) shows a flowchart of the operations of the customer terminal 30 and store terminal 35, for managing points for a specific group. FIG. 7(B) shows an example of a display screen for specifying a group.

In step S60 of FIG. 7(A), a customer ID number is entered.

In step S61, the terminal is connected to the processor 1 installed in the store or business center through a circuit.

Step S62 determines whether or not the entered ID number is already registered. If it is registered, the flow goes to step S65, and if not, step S63.

In step S63, it is determined whether or not it is requested to newly register the customer. If it is requested, the flow goes to step S64, and if not, ends.

In the step S64, the customer is registered, and the flow returns to the step S61.

Step S65 displays the present cumulative points of the customer.

Step S66 displays the names of groups, target commodities requested by the groups or organized parties (that is, target articles such as, for example, a monocycle or foodstuffs, that are required by pre-registered public schools or volunteer groups for social welfare activities; for example, when the Somalia Aid Association has accumulated one thousand points, foodstuffs are presented to the Somalia Government), target points which are necessary to obtain the required commodities for the groups, and present cumulative points, as shown in FIG. 7(B). In this step, one of the registered groups is specified. If no group is specified, the flow goes to step S67, and if not, ends.

The step S67 adds the customer's points to those of the group specified in the step S66, and the flow ends.

In FIG. 7(B), the processor displays the names of the registered groups, target commodities requested by the groups, the target points of the commodities, and the present cumulative points. When the store terminal is in a standby state, these data may be always displayed. Alternatively, they may be displayed after a customer is confirmed to belong to one of the registered groups according to operations on the terminal or to received purchase information.

Functions of managing customers and their points and providing services to the customers and the means for realizing the functions will be explained individually.

1. A function of managing points

Managing points includes the issuance, accumulation, and notification of points.

1.1. A function of issuing points

Figure 8A:
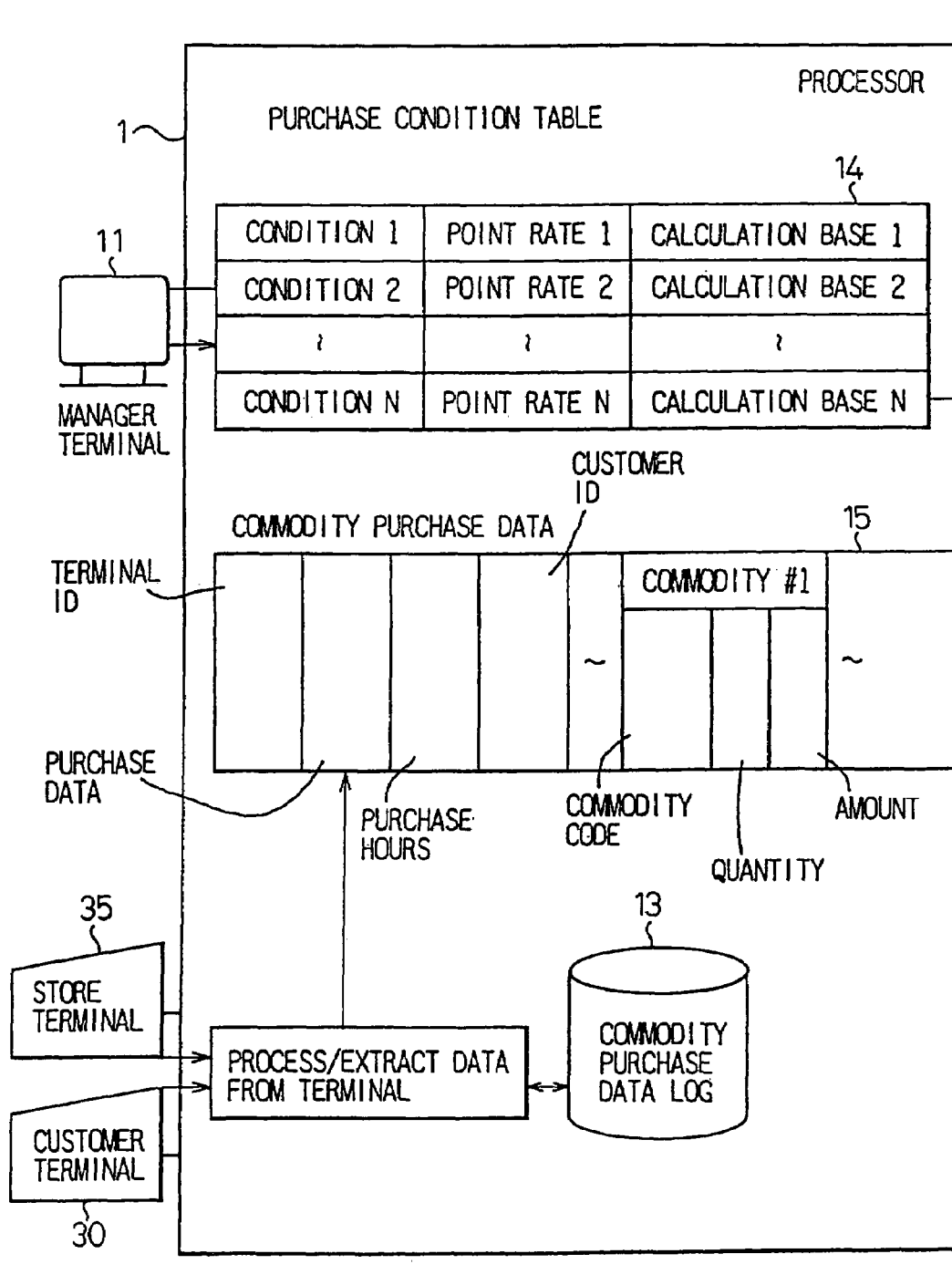
FIGS. 8(A) and 8(B) are schematic block diagrams showing the overall structure of a service point issue.
Figure 8B:
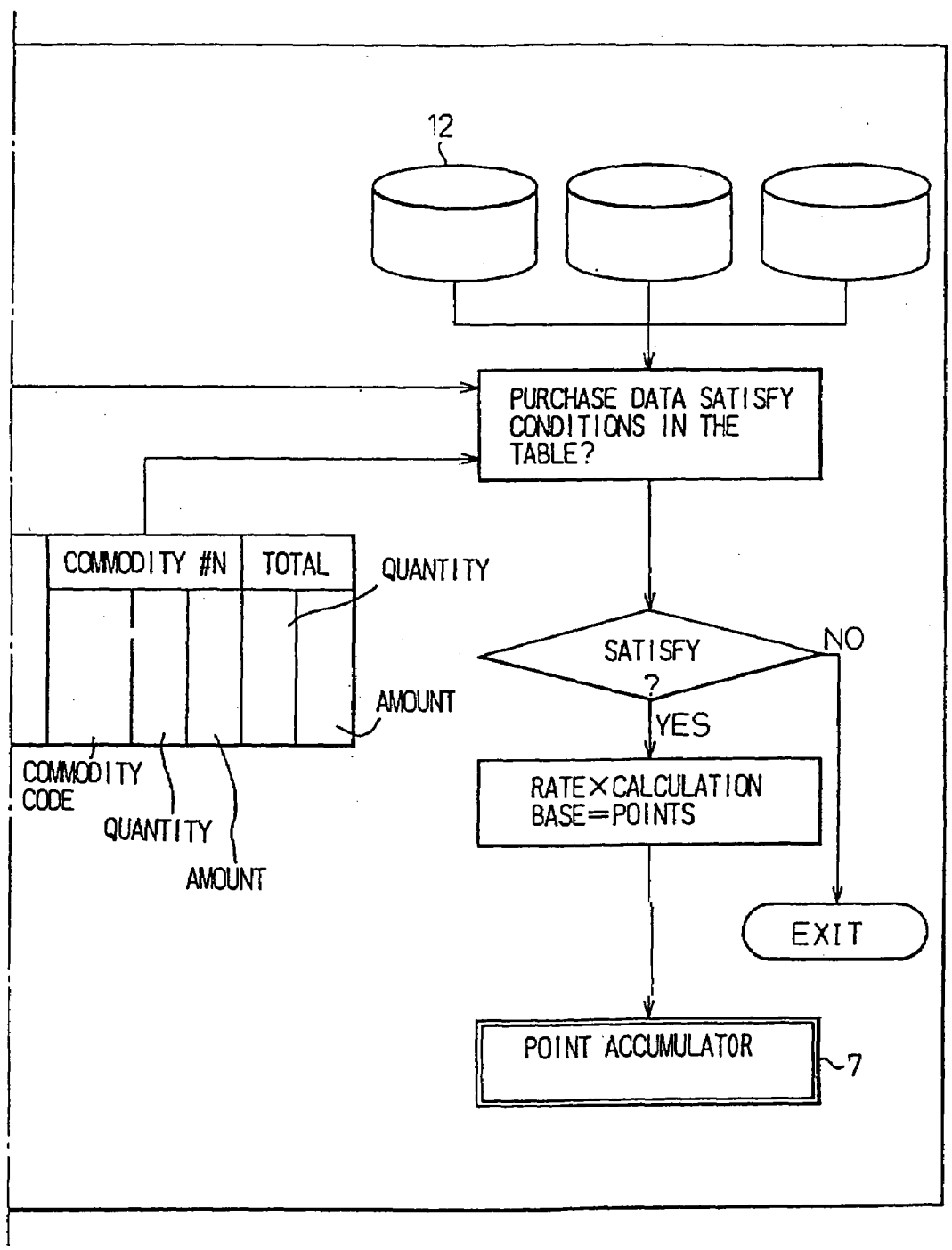

FIGS. 8(A) and 8(B) generally are schematic block diagrams showing the overall structure of the service point issuer 9. In FIGS. 8(A) and 8(B), the processor 1 is a host computer, a store computer, or a POS register. The processor 1 comprises a purchase condition table 14 in which purchase conditions are optionally set at any time through a manager terminal 11. The purchase conditions are related to point calculation rates and point earning commodities. When purchase data is entered into the store terminal 35 or customer terminal 30, the data is processed and extracted according to a purchase data log 13 stored beforehand, to form purchase data 15 of a predetermined format. The purchase data 15 includes a terminal ID, purchase date, purchase time, a customer ID, commodity codes, quantities, amounts of money, total quantity, and total amount of money. According to the purchase data 15, purchase condition table 14, and reference data bases 12, it is determined whether or not the purchase at this time satisfies the conditions stated in the purchase condition table 14. If the conditions are satisfied, points for the purchase are calculated and transferred to the point accumulator 7.

FIGS. 9(A) to 9(J) show examples of display screens used to set a point calculation rate with the rate manager 10 and manager terminal 11. Before explaining the processes of the point issuer 9, items appearing in these screens will be explained.

To set the point calculation rate according to specific days, the screen of FIG. 9(A) is used. Objective dates or days, or a period are entered according to the screen. The point calculation rate is also entered. Total amount of money or points is selected as a point calculation base.

To set the point calculation rate according to a specific period, the screen of FIG. 9(B) is used. The dates of an objective period are entered according to the screen. At the same time, a point calculation base is selected, and a minimum and points for the minimum are entered.

To set the point calculation rate according to a specific area, the screen of FIG. 9(C) is used. An area code of an objective area is entered according to the screen, a point calculation base is selected, and the point calculation rate is entered.

To set the point calculation rate according to a customer's special day, the screen of FIG. 9(D) is used. A customer's special day is selected in the screen, a point calculation base is selected, and the point calculation rate is entered.

To set the point calculation rate according to a specific time band, the screen of FIG. 9(E) is used. An objective time band is entered in the screen, a point calculation base is selected, and the point calculation rate is entered.

To set the point calculation rate according to specific commodities, the screen of FIG. 9(F) is used. The codes, names, and point calculation rates of one or a plurality of objective commodities are entered according to the screen.

To set the point calculation rate according to the number of purchase transactions, the screen of FIG. 9(G) is used. Different point calculation rates for ranks of purchase transactions are entered according to the screen.

To set the point calculation rate according to the number of accesses, the screen of FIG. 9(H) is used. Point calculation rates for ranks of accesses are entered according to the screen.

To set the point calculation rate according to amounts of payment, the screen of FIG. 9(I) is used. Point calculation rates for respective ranks of purchase amounts are entered according to the screen.

To set the point calculation rate according to ranks of customers, the screen of FIG. 9(J) is used. Point calculation rates for respective ranks of customers are entered according to the screen as follows:

1.1.1. A function of calculating points for purchase according to specific conditions 1.1.1.1. A function of calculating points for purchases carried out on a store's specific days A store issues points on purchases made on specific days and dates determined by the store including weekdays and holidays. Collective purchase transactions over a short period or in a limited area are also in this category. This technique promotes sales on special bargain days, etc., and increases the quantity of each purchase. This technique is effective to carry out on the opening day of a store or when entering into a new market area.

Figure 10A:
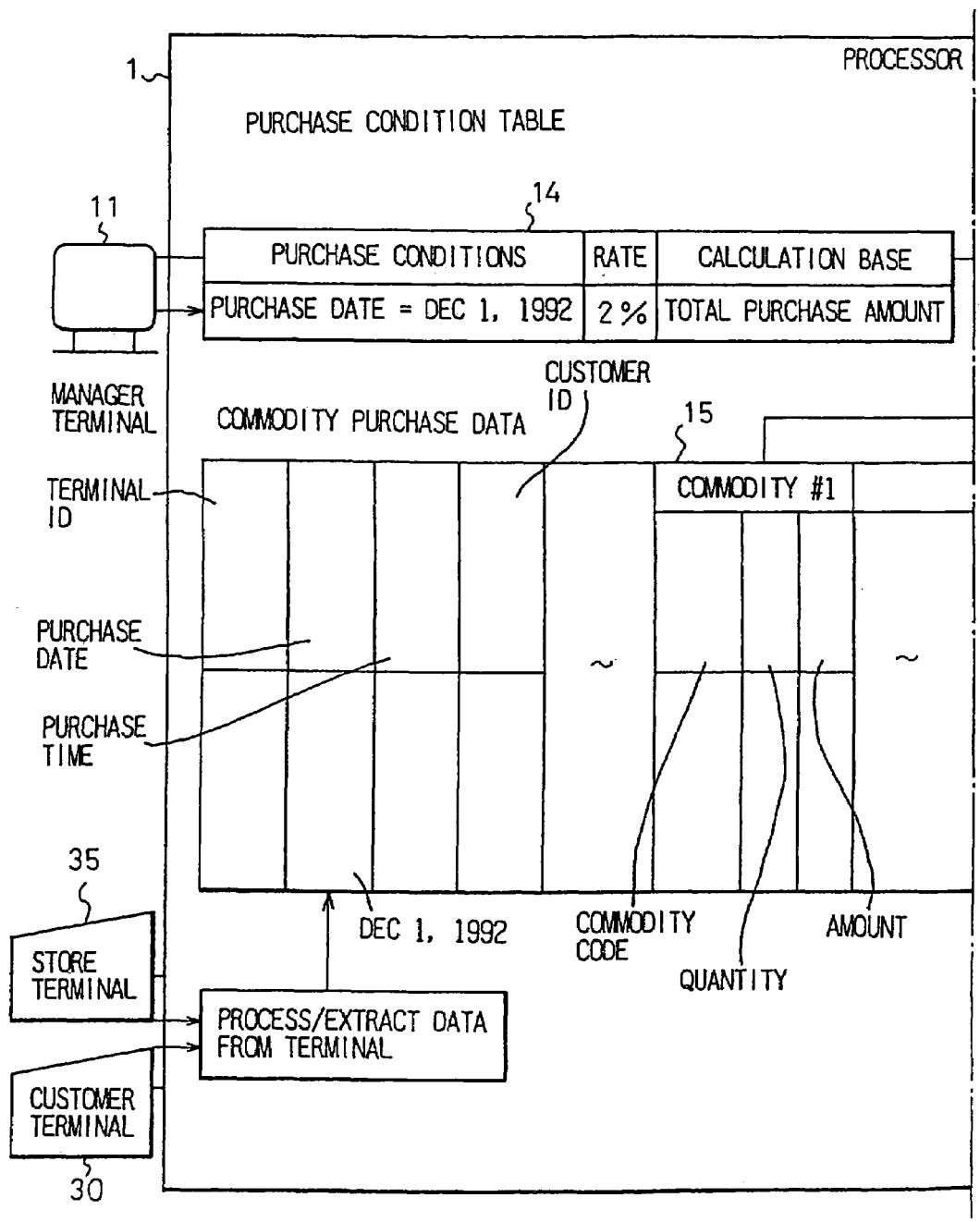
FIGS. 10(A) and 10(B) are explanatory views of a process for issuing points according to specified days of a store as a purchase condition.
Figure 10B:
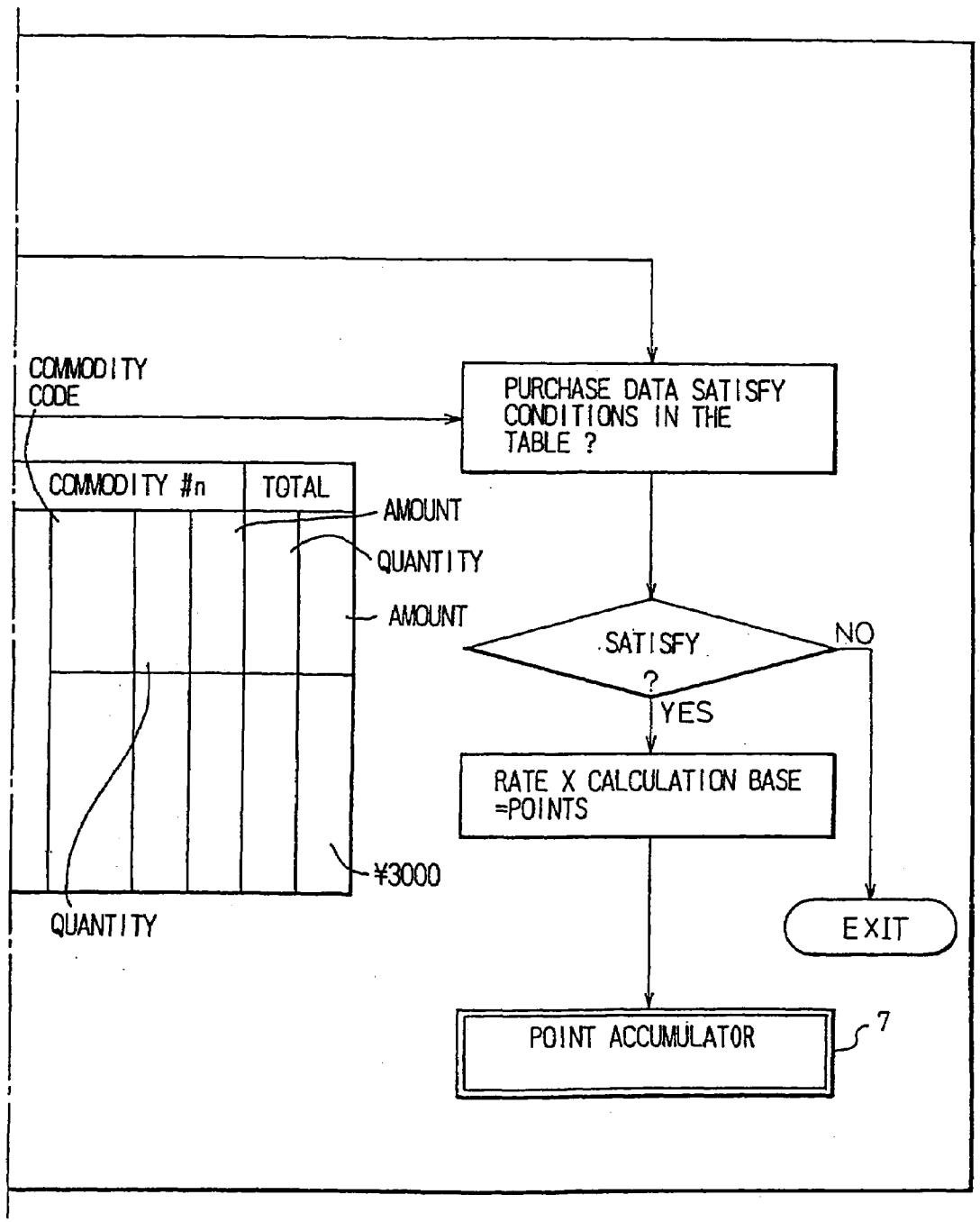

FIGS. 10(A) and 10(B) are views explaining a process of issuing points on the store's specific days.

In the figures, the purchase condition table 14 contains the purchase conditions set according to the screen of FIG. 9(A) for the specific days. The store terminal 35 or customer terminal 30 provides purchase data, which are processed and extracted to form purchase data 15 of a predetermined format. Purchase data from the purchase data 15 is collated with the purchase conditions in the table 14. If the conditions are satisfied, points for the purchase at this time are calculated and transferred to the point accumulation means 7. In the example of FIG. 10(A), the purchase date is Dec. 1, 1992. Since this date satisfies the purchase conditions, points are calculated as: point calculation rate 2%×total purchase amount Yen 3,000=60 points.

Figure 11A:
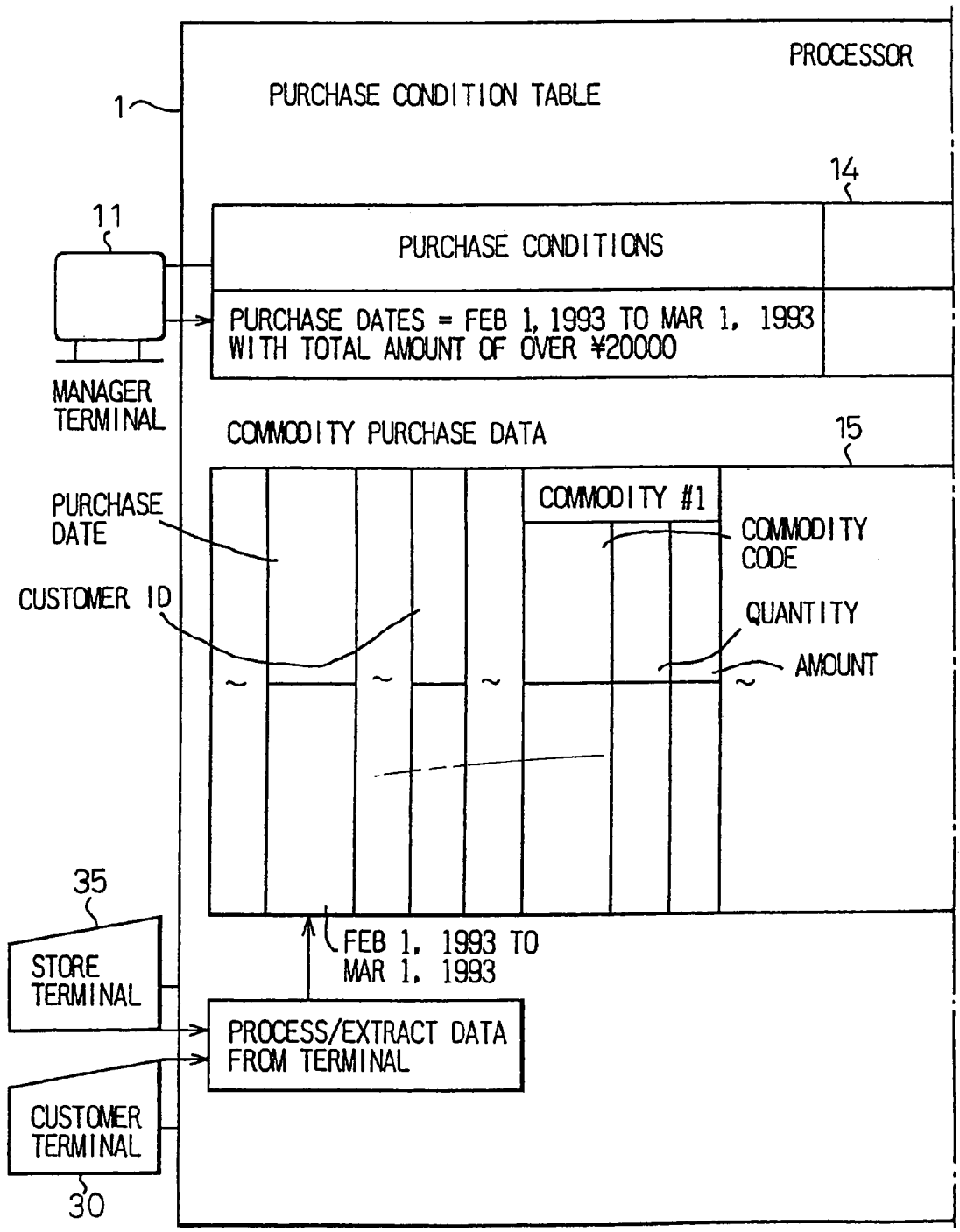
FIGS. 11(A) and 11(B) are views explaining a process of issuing points according to a specified period of a store as a purchase condition.
Figure 11B:
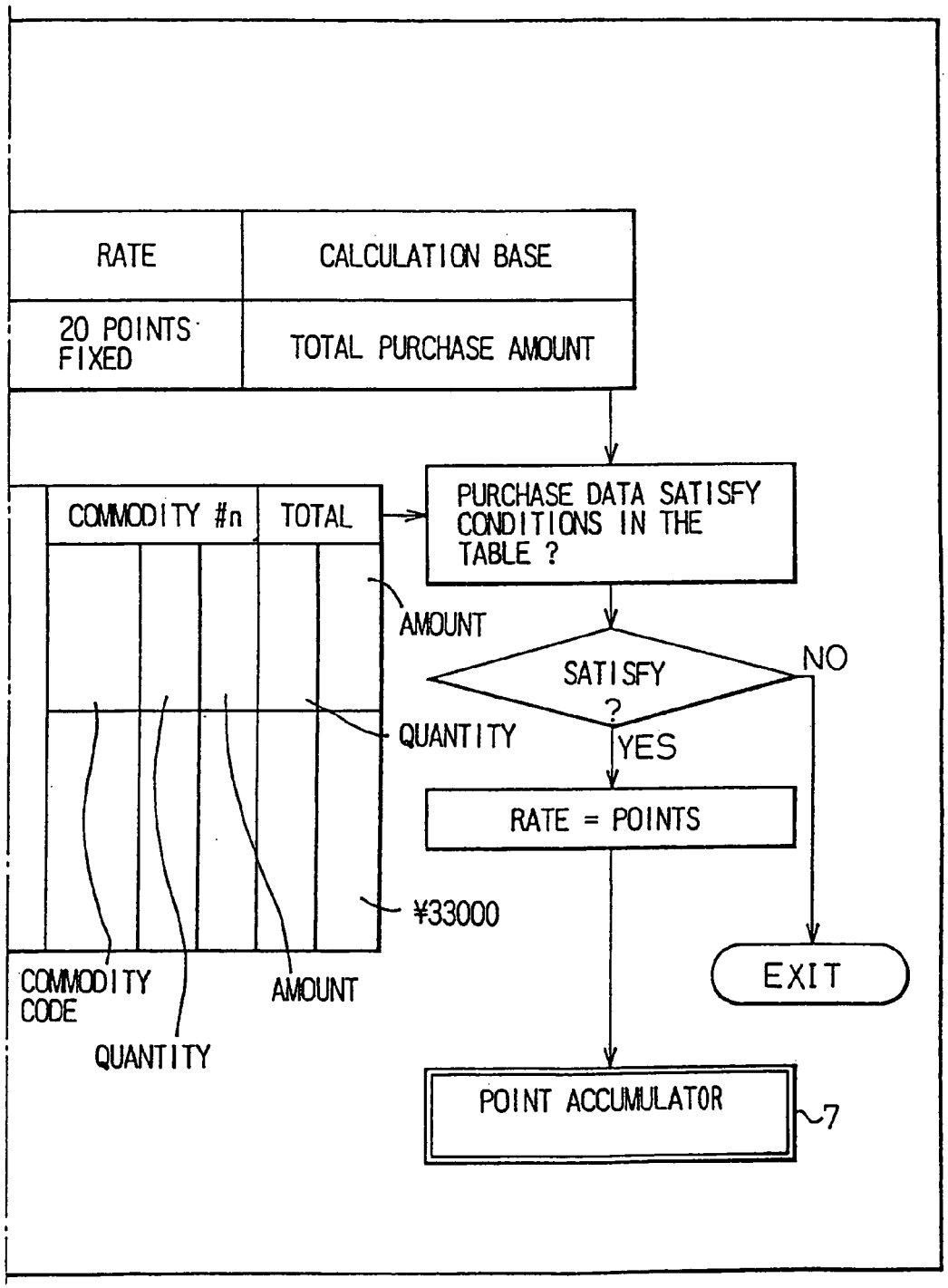

FIGS. 11(A) and 11(B) are views explaining a process of issuing points for a store's specific period.

In the figures, the purchase condition table 14 contains the purchase conditions set according to the screen of FIG. 9(B) for the specific period. The store terminal 35 or customer terminal 30 provides purchase data, which is processed and extracted to form purchase data 15 of a predetermined format. Purchase dates and purchase amounts within the period are collated with the purchase conditions in the table 14. If the conditions are met, points for the purchase of this time are calculated and transferred to the point accumulator 7. In the example of FIGS. 11(A) and 11(B), total-purchase amount is Yen 33,000 in the period of Feb. 1, 1993 to Mar. 1, 1993. Since the amount in this period meets the purchase conditions, fixed points are given for the purchase of this time.

Figure 12A:
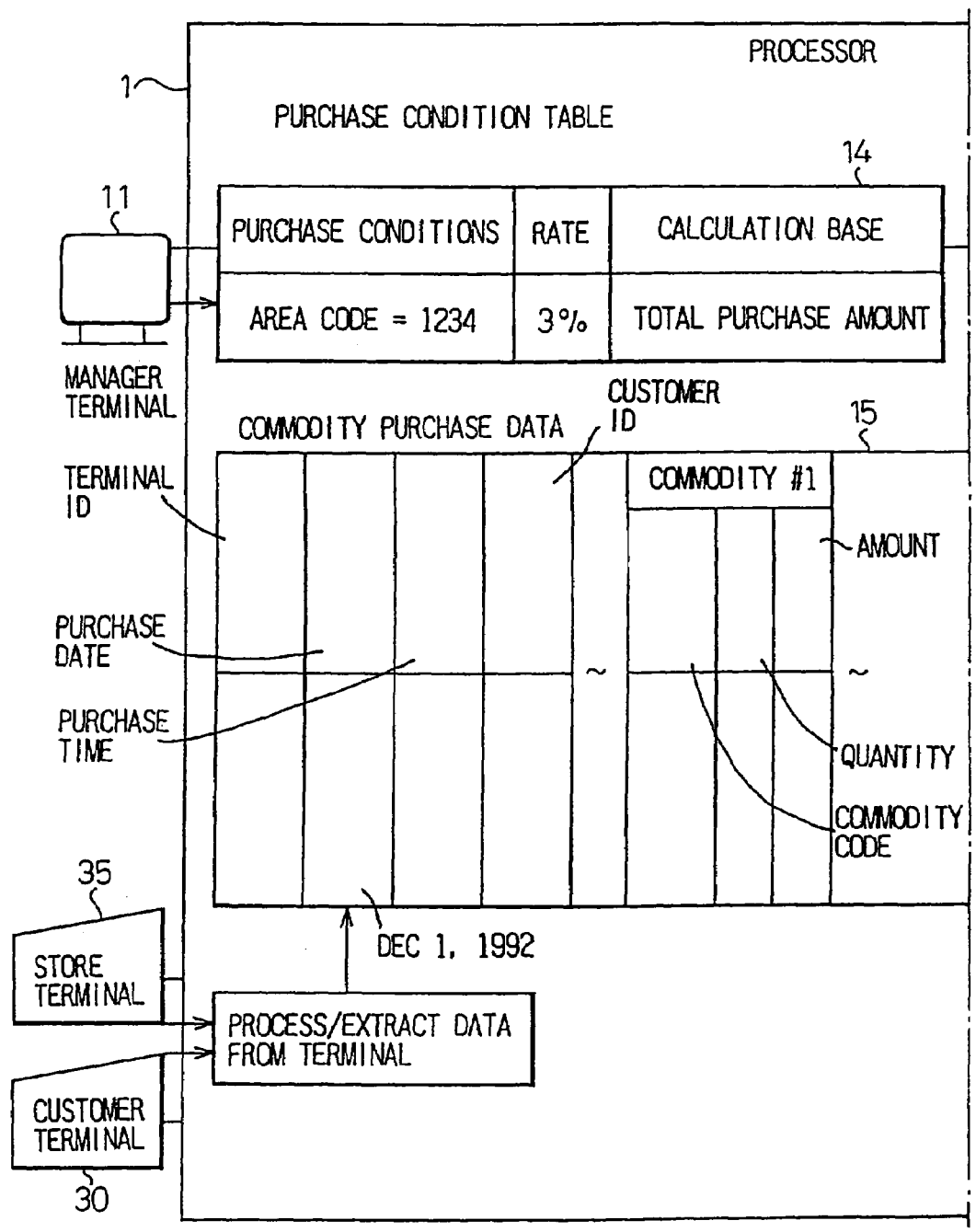
FIGS. 12(A) and 12(B) are views explaining a process of issuing points according to a specified area as a purchase condition.
Figure 12B:
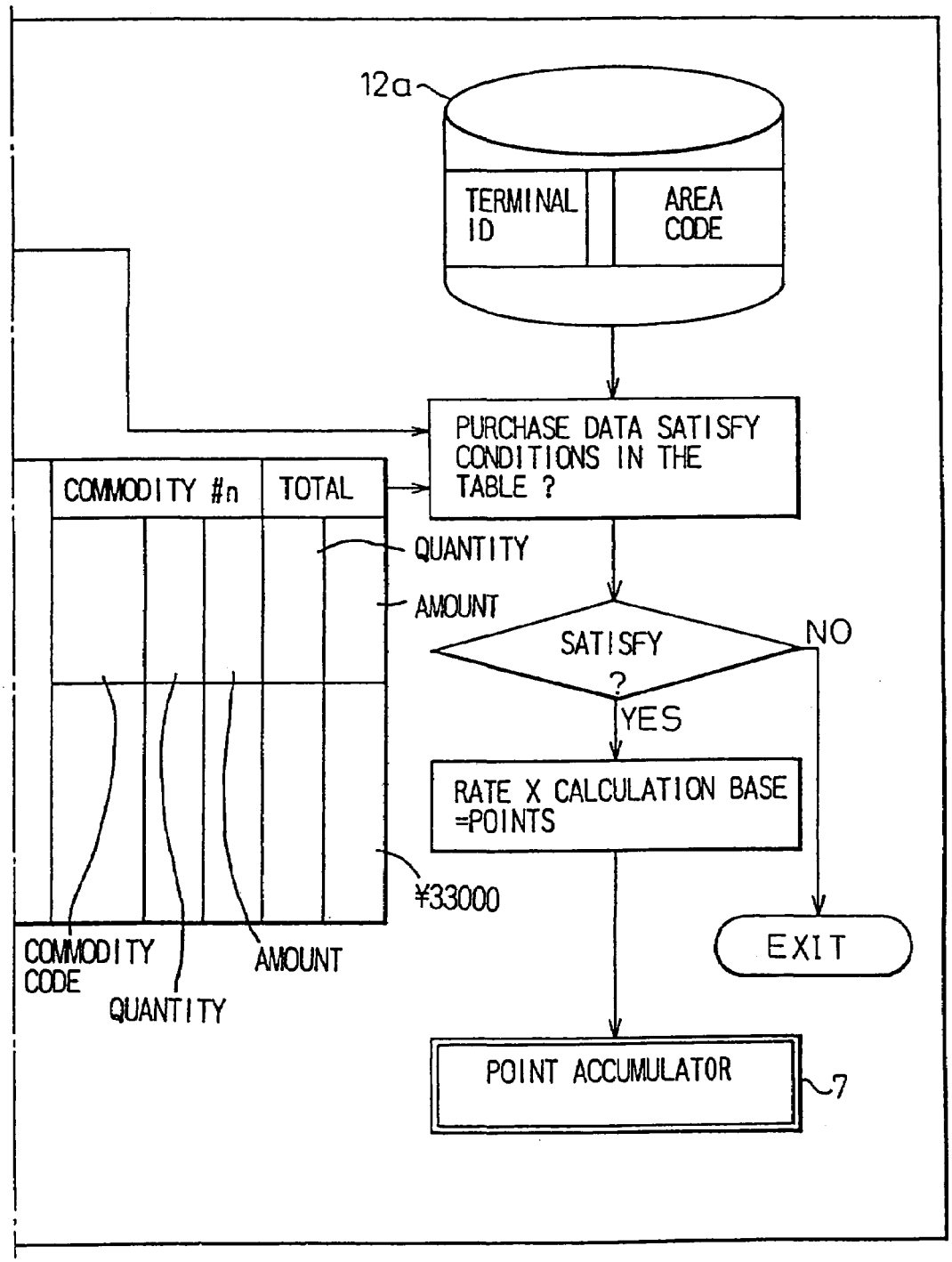

FIGS. 12(A) and 12(B) are views explaining a process of issuing points for purchases made in a specific area.

In the figures, the purchase condition table 14 contains the purchase conditions set according to the screen of FIG. 9(C) for the specific area. The store terminal 35 or customer terminal 30 provides purchase data, which are processed and extracted to form purchase data 15 of predetermined format. With a terminal ID held in the purchase data 15 serving as a key, an area code is retrieved and extracted out of a terminal data base 12a and collated with the purchase conditions in the table 14. If the conditions are met, points for the purchase of this time are calculated and transferred to the point accumulator 7. In the example of FIGS. 12(A) and (B), the area code retrieved from the terminal data base 12a is 1234, which satisfies the purchase conditions. Accordingly, points are calculated as: point calculation rate 3%×total purchase amount Yen 33,000=99 points.

1.1.1.2. A function of calculating points for purchases performed on customer's specific days Customer's specific days may be used as conditions to change the point calculation rate. A store sets specific days for each customer according to customer's data. For example, a customer's visit to the store on the birthday or wedding anniversary of the customer may be used as conditions to change the point calculation rate for the customer. This is customer-oriented sales promotion.

Figure 13A:
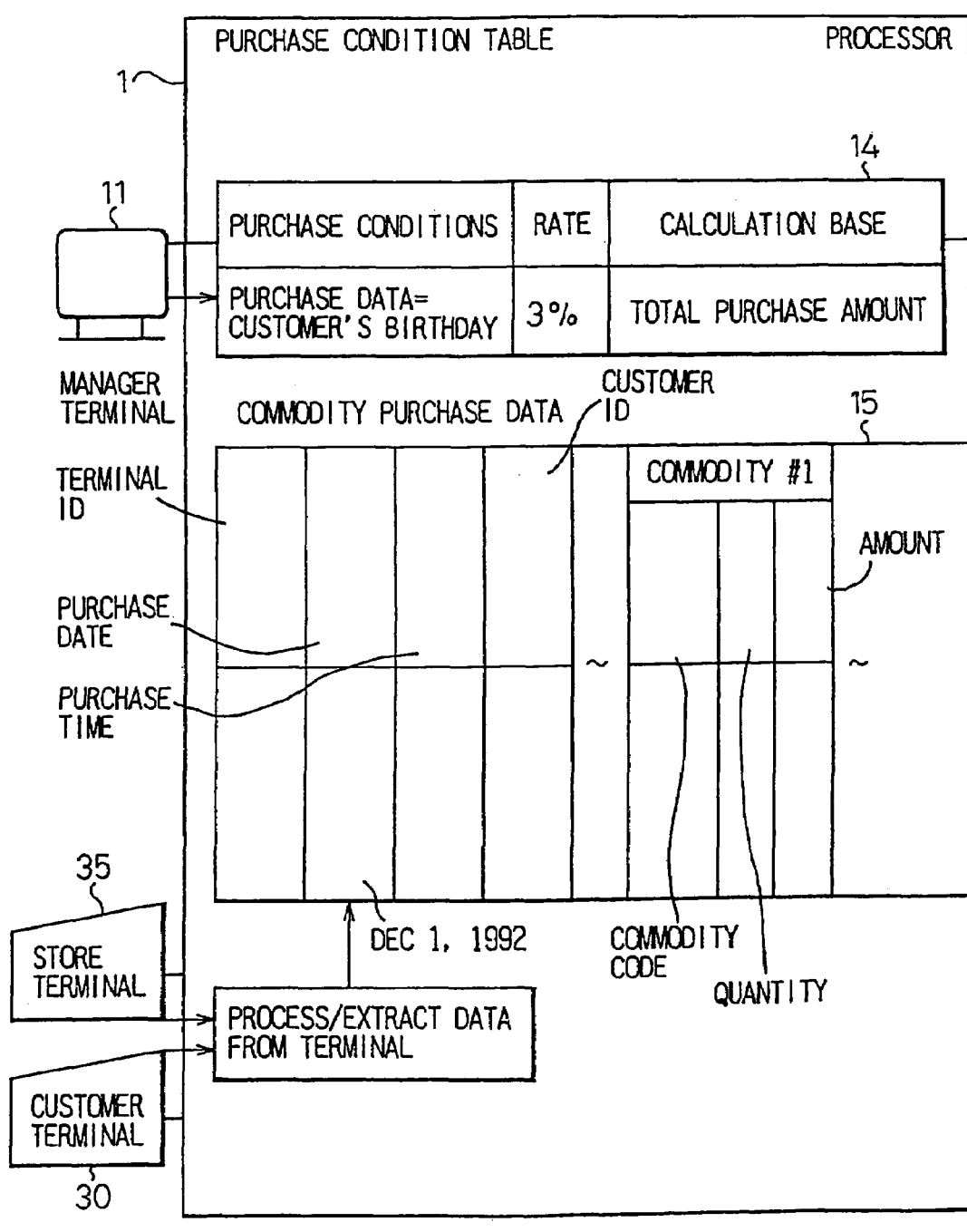
FIGS. 13(A) and 13(B) are views explaining a process of issuing points according to specific days of a customer such as a birthday or a wedding anniversary as a purchase condition.
Figure 13B:
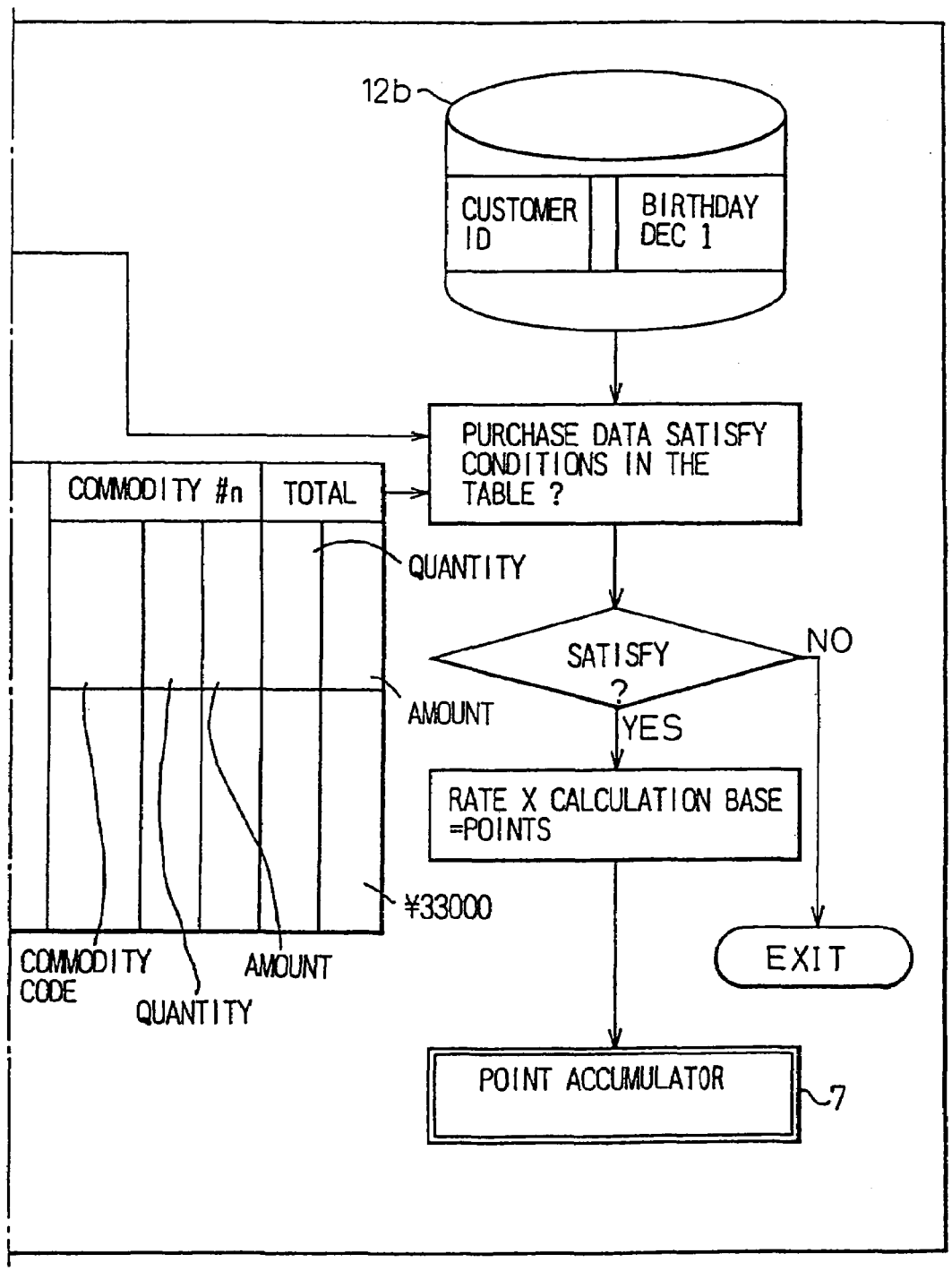

FIGS. 13(A) and 13(B) are views explaining a process of issuing points according to the customer's specific days such as a birthday or a wedding anniversary.

In the figures, the purchase condition table 14 contains the purchase conditions set according to the screen of FIG. 9(D) for the customer's specific days. The store terminal 35 or customer terminal 30 provides purchase data, which is processed and extracted to form purchase data 15 of predetermined format. With a customer ID stored in the purchase data 15 serving as a key, the birthday of the customer is retrieved from a customer database 12b and is collated with the purchase conditions in the table 14. If the conditions are met, points for the purchase at this time are calculated and transferred to the point accumulator 7. In the example of FIGS. 13(A) and 13(B), the date of purchase of Dec. 1, 1992 is equal to the birthday of the customer retrieved from the customer database 12b. Namely, the purchase conditions are met, so that points are calculated as: point calculation rate 3%×total purchase amount Yen 33,000=99 points.

1.1.1.3. A function of calculating points for purchase performed in a specific time period A store may specifically set a time period for which the point calculation rate is changed. For example, purchase performed in a specific time period such as in the morning or a service time period is provided with a high point calculation rate. The point calculation rate may be increased area by area in different time bands. This may attract customers during off-hours of stores and average accesses to customer terminals.

Figure 14A:
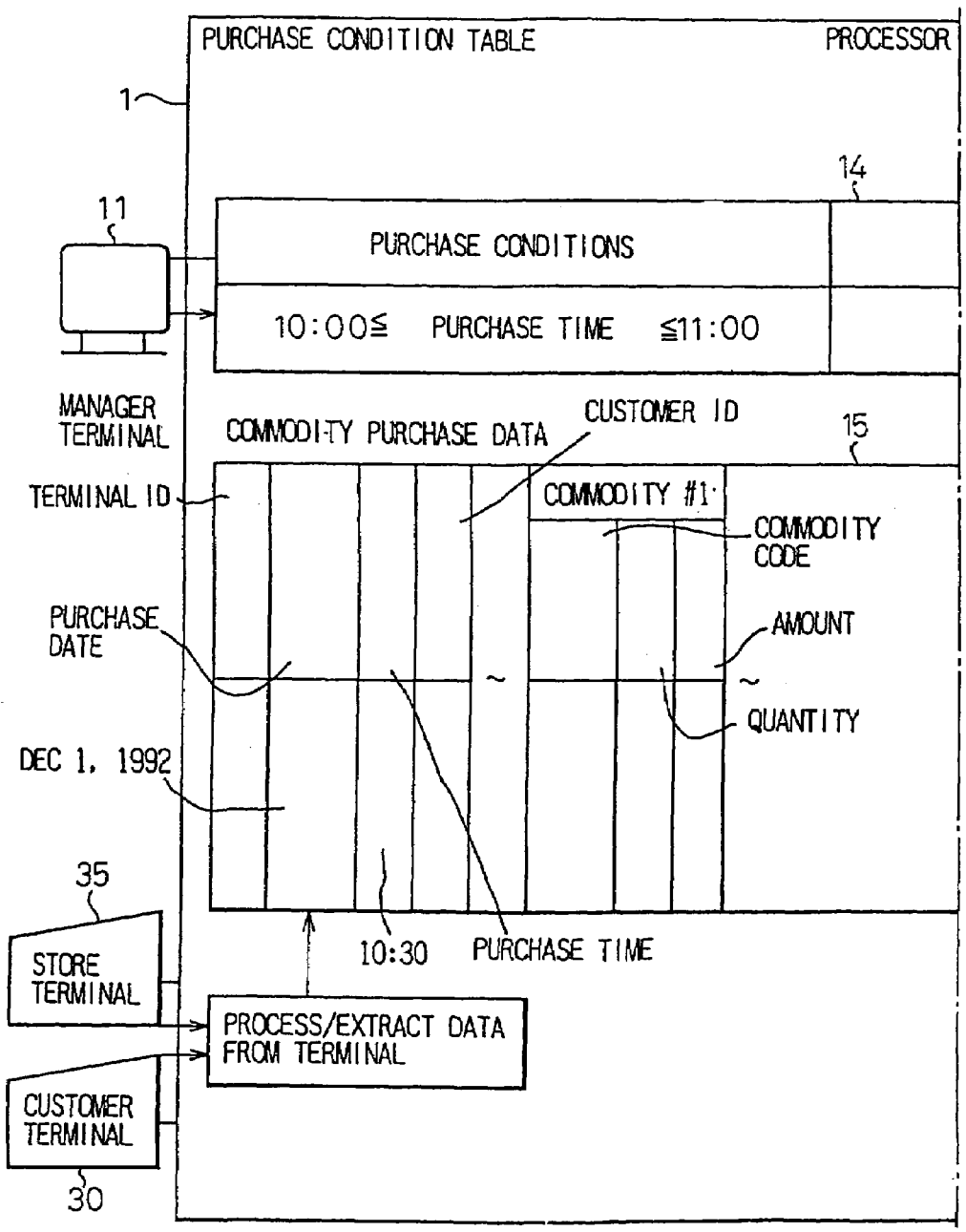
FIGS. 14(A) and 14(B) are views explaining a process of issuing points according to a specific time period such as issuing points only in the morning as a purchase condition.
Figure 14B:
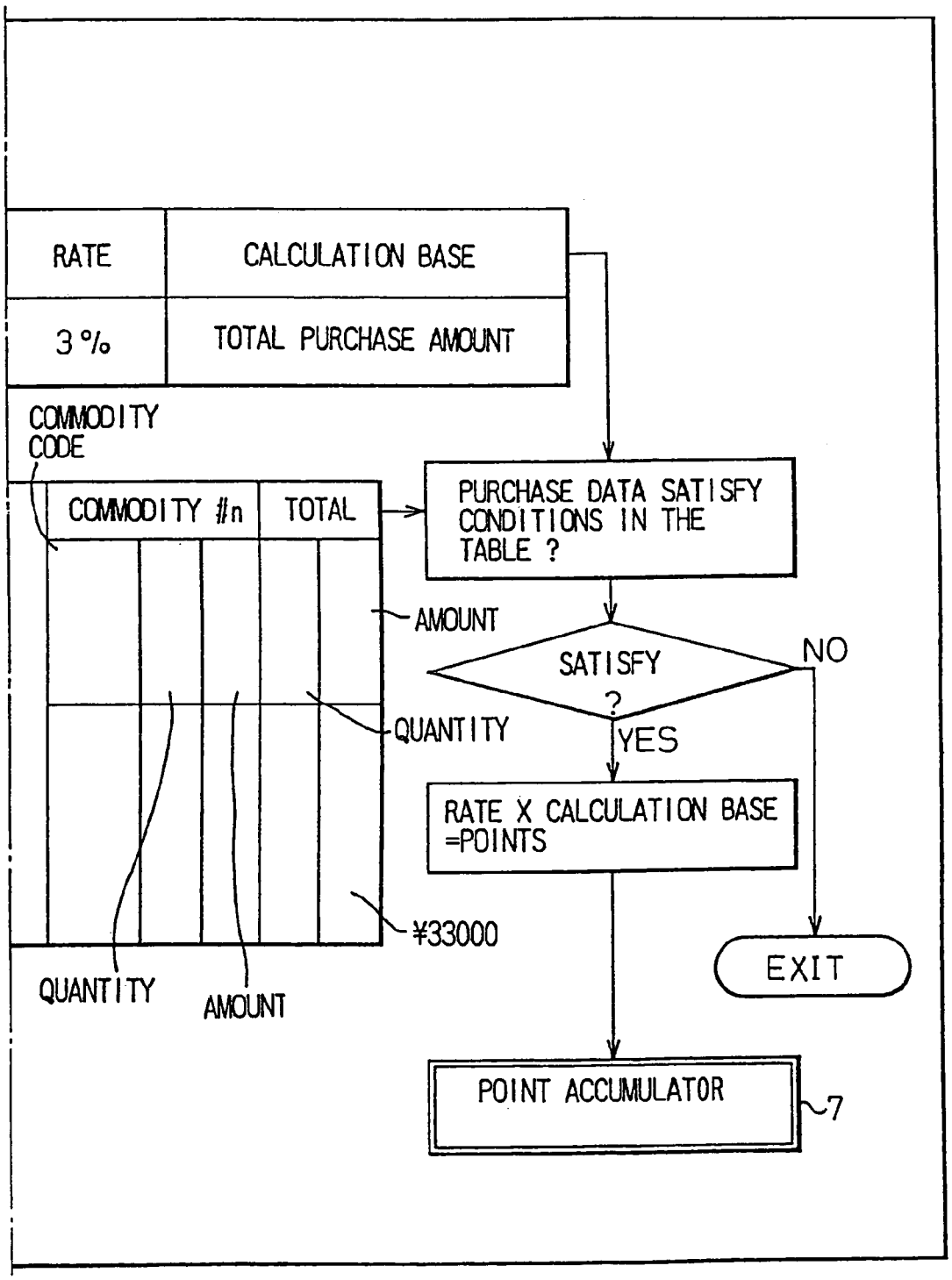

FIGS. 14(A) and 14(B) are views explaining a process of issuing points according to the specific time period.

In the figure, the purchase condition table 14 contains the purchase conditions set according to the screen of FIG. 9(E) for the specific time band. The store terminal 35 or customer terminal 30 provides purchase data, which is processed and extracted to form purchase data 15 of a predetermined format. Purchase time stored in the purchase data 15 is collated with the purchase conditions held in the table 14. If the conditions are met, points for the purchase of this time are calculated and transferred to the point accumulation means 7. In the example of FIGS. 14(A) and 14(B), the purchase time is 10:30 in the morning, which satisfies the purchase conditions. Accordingly, points for the purchase are calculated as: point calculation rate 3%×total purchase amount Yen 33,000=99 points.

1.1.1.4. A function of calculating points for purchase of specific commodities

Purchase of specific commodities may be a condition of changing the point calculation rate. The specific commodities may be changed daily. Sales promotion commodities may have a high point calculation rate. A specific series of commodities may also have a high point calculation rate. This will result in promoting the sales of focused commodities.

Figure 15A:
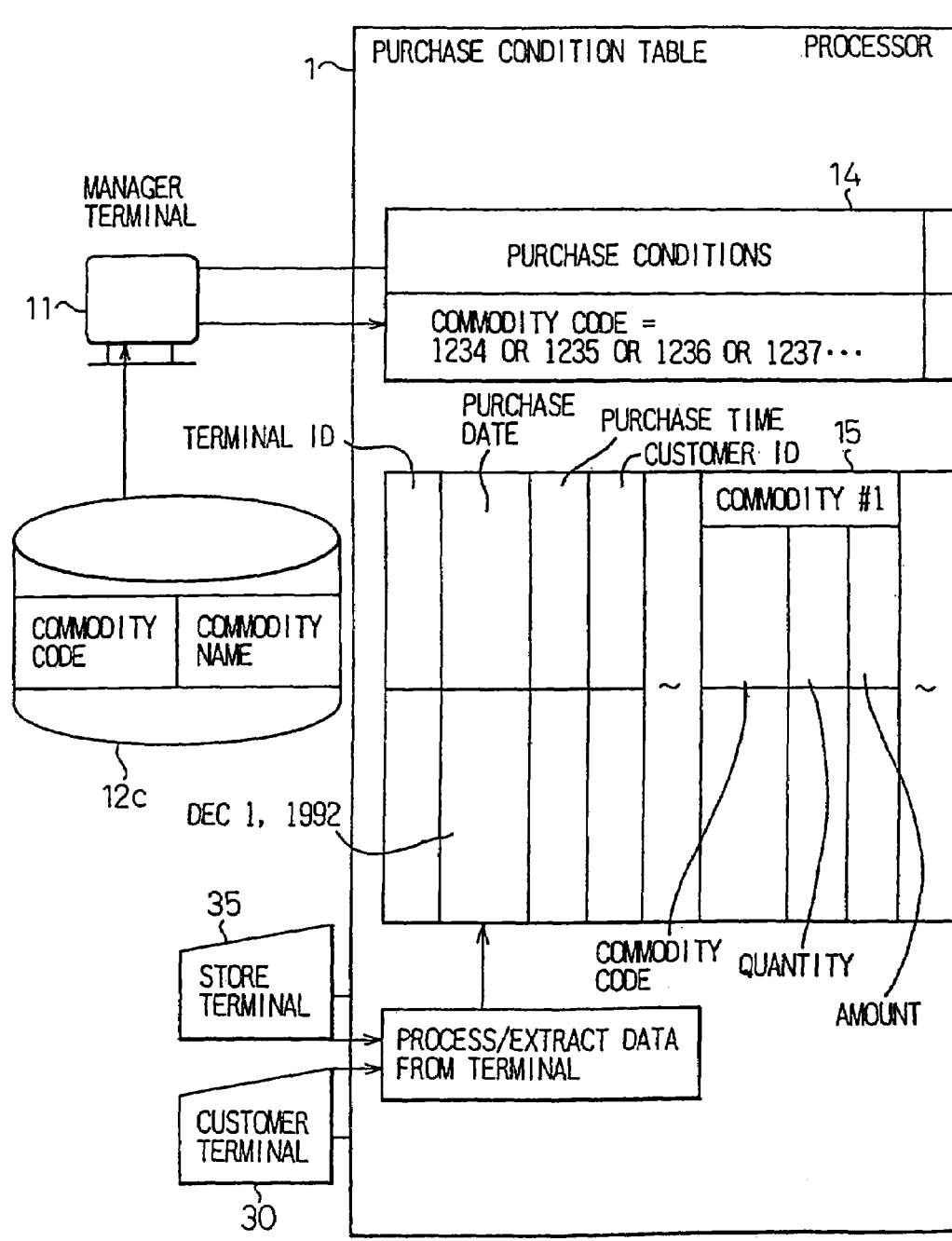
FIGS. 15(A) and 15(B) are views explaining a process of issuing points according to specific commodities as a purchase condition.
Figure 15B:
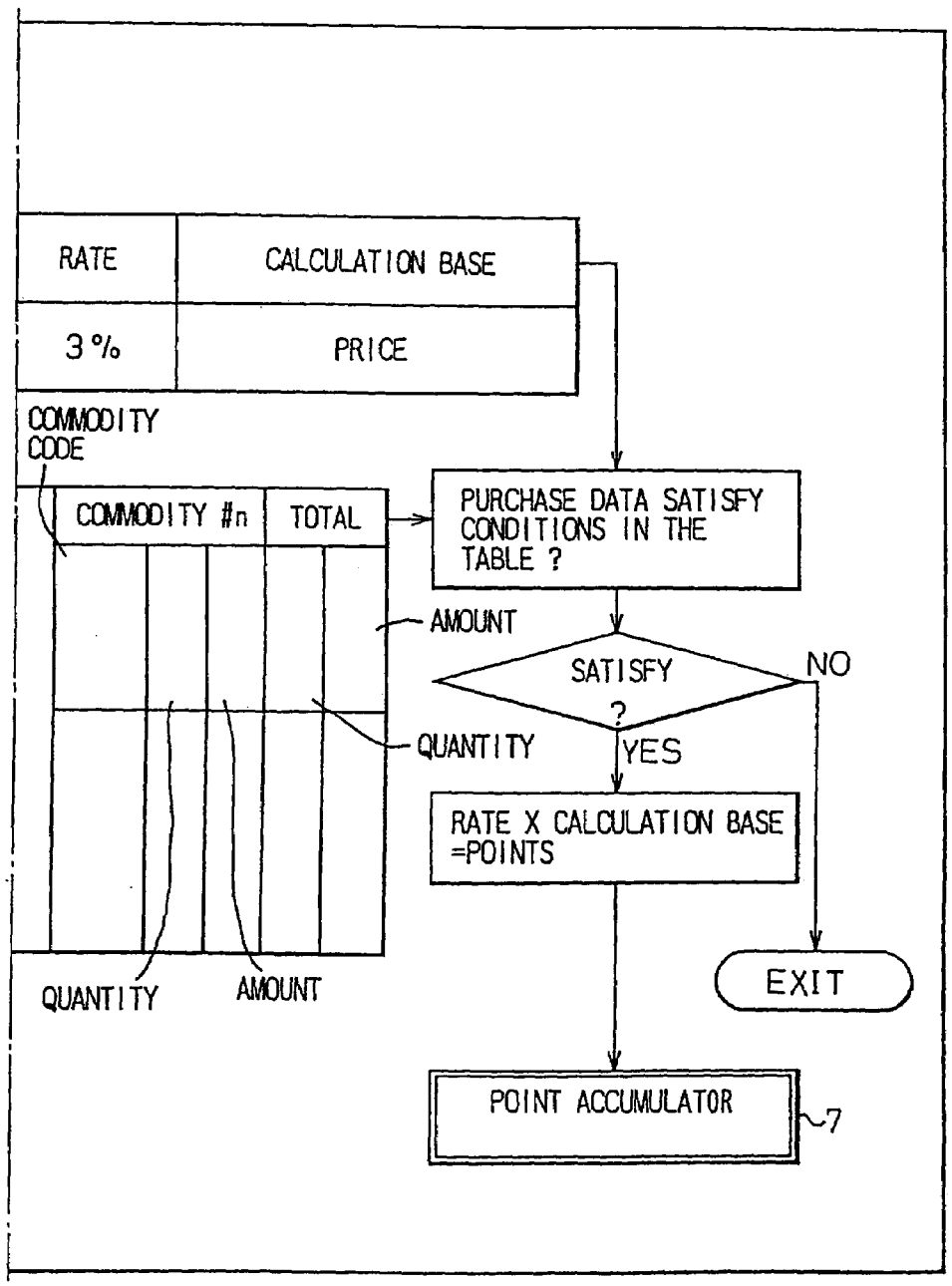

FIGS. 15(A) and 15(B) are views explaining a process of issuing points for the specific commodities.

In the figures, the purchase condition table 14 contains the purchase conditions set according to the screen of FIG. 9(F) for the specific commodities. The store terminal 35 or customer terminal 30 provides purchase data, which is processed and extracted to form purchase data 15 of a predetermined format. One or a plurality of commodity codes in the purchase data 15 are collated with the purchase conditions stored in the table 14. If the conditions are met, points for the purchase at this time are calculated and transferred to the point accumulation means 7. In the example of FIGS. 15(A) and 15(B), a commodity code is 1235, which satisfies the purchase conditions, so that points for the purchase is calculated as: point calculation rate 3%×amount of purchase Yen 6,000=18 points.

1.1.2. A function of determining purchase transactions 1.1.2.1. A function of calculating the number of purchase transactions The host computer or POS register counts the number of purchase transactions of each customer. According to the number, the point calculation rate is changed. Namely, the point calculation rate is increased when the predetermined number of purchase is attained, or when the customer continuously carries out purchases. This results in promoting customers to repeatedly carry out purchases.

Figure 16A:
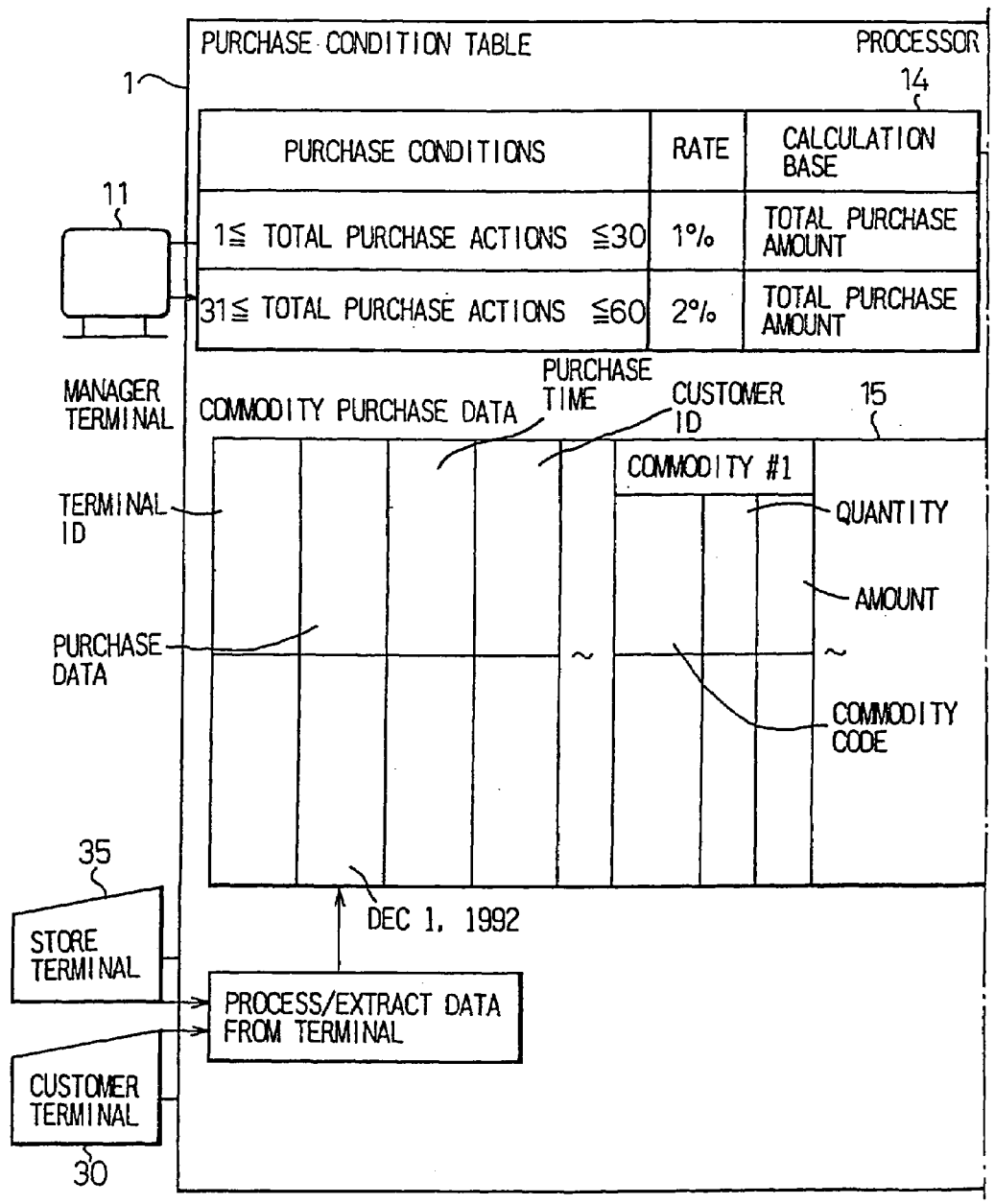
FIGS. 16(A) and 16(B) are views explaining a process of issuing points according to the number of purchase transactions as a purchase condition.
Figure 16B:
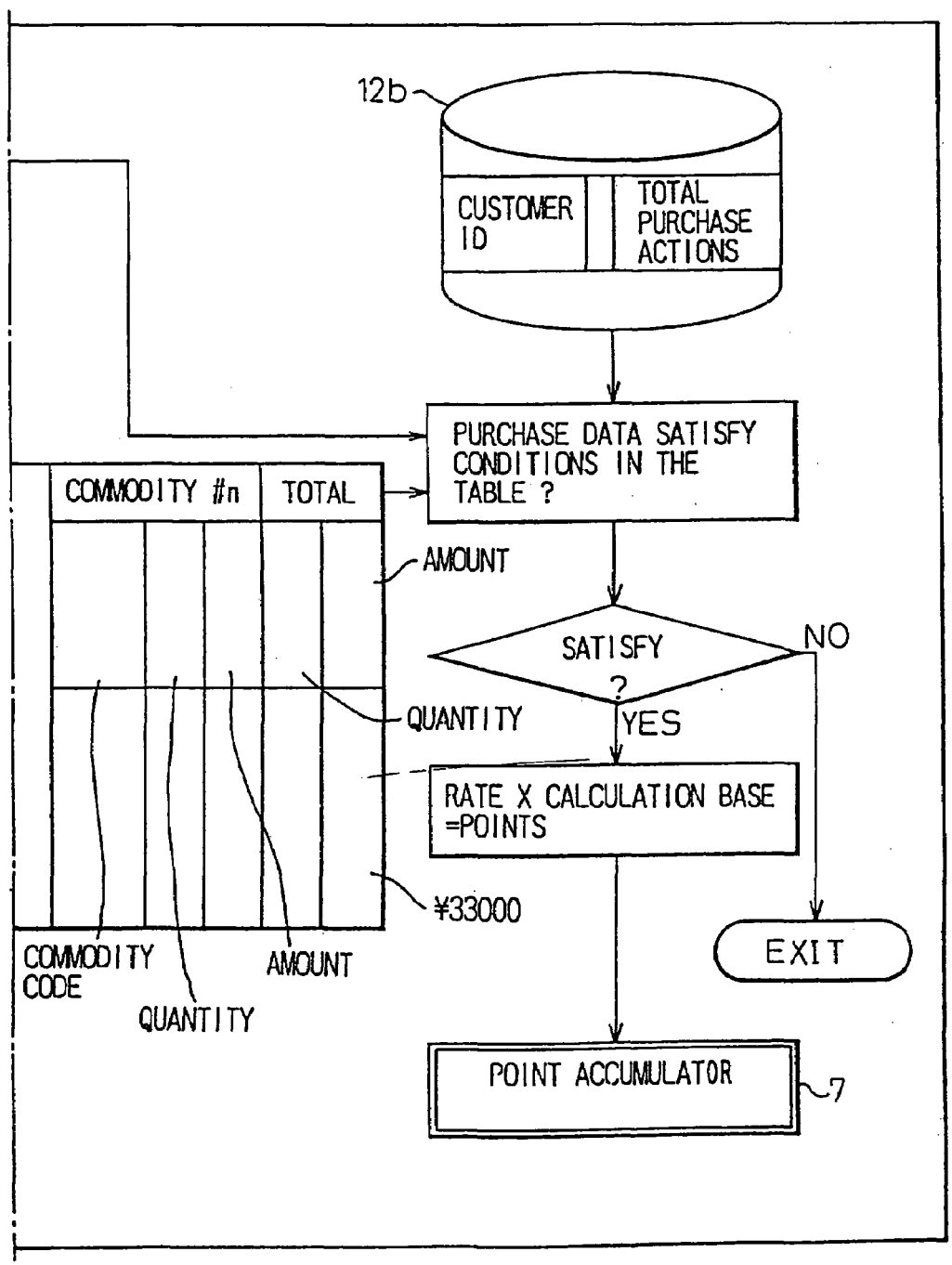

FIGS. 16(A) and 16(B) are views explaining a process of issuing points according to the number of purchase transactions.

In the figures, the purchase condition table 14 contains the purchase conditions set according to the screen of FIG. 9(G) for the number of purchase transactions. The store terminal 35 or customer terminal 30 provides purchase data, which is processed and extracted to form purchase data 15 of a predetermined format. With a customer ID in the purchase data 15 serving as a key, the cumulative number of purchase transactions of the customer is retrieved out of the customer database 12b, and the cumulative number is incremented by 1. The incremented number is collated with the purchase conditions stored in the purchase condition table 14. If the conditions are met, points for the purchase of this time are calculated and transferred to the point accumulator 7. For example, 30 is retrieved as the number of purchase transactions from the customer data base 12b and is updated to 31. Since the point calculation rate for the updated number is 2%, points for the purchase of this time are calculated as: rate of point 2%×total purchase amount Yen 33,000=66 points.

1.1.2.2. A function of determining access conditions

Points may be issued according to access conditions. For example, the number of accesses is counted, and at every several accesses, the point calculation rate is increased step by step. The point calculation rate may be changed if the accesses are carried out in a specific area. The point calculation rate may be increased for accesses during off-hours of communication circuits. In this way, the point calculation rate is changed depending on an access time band. This results in increasing the number of accesses to customer terminals, to thereby increase access charges and sales.

Figure 17A:
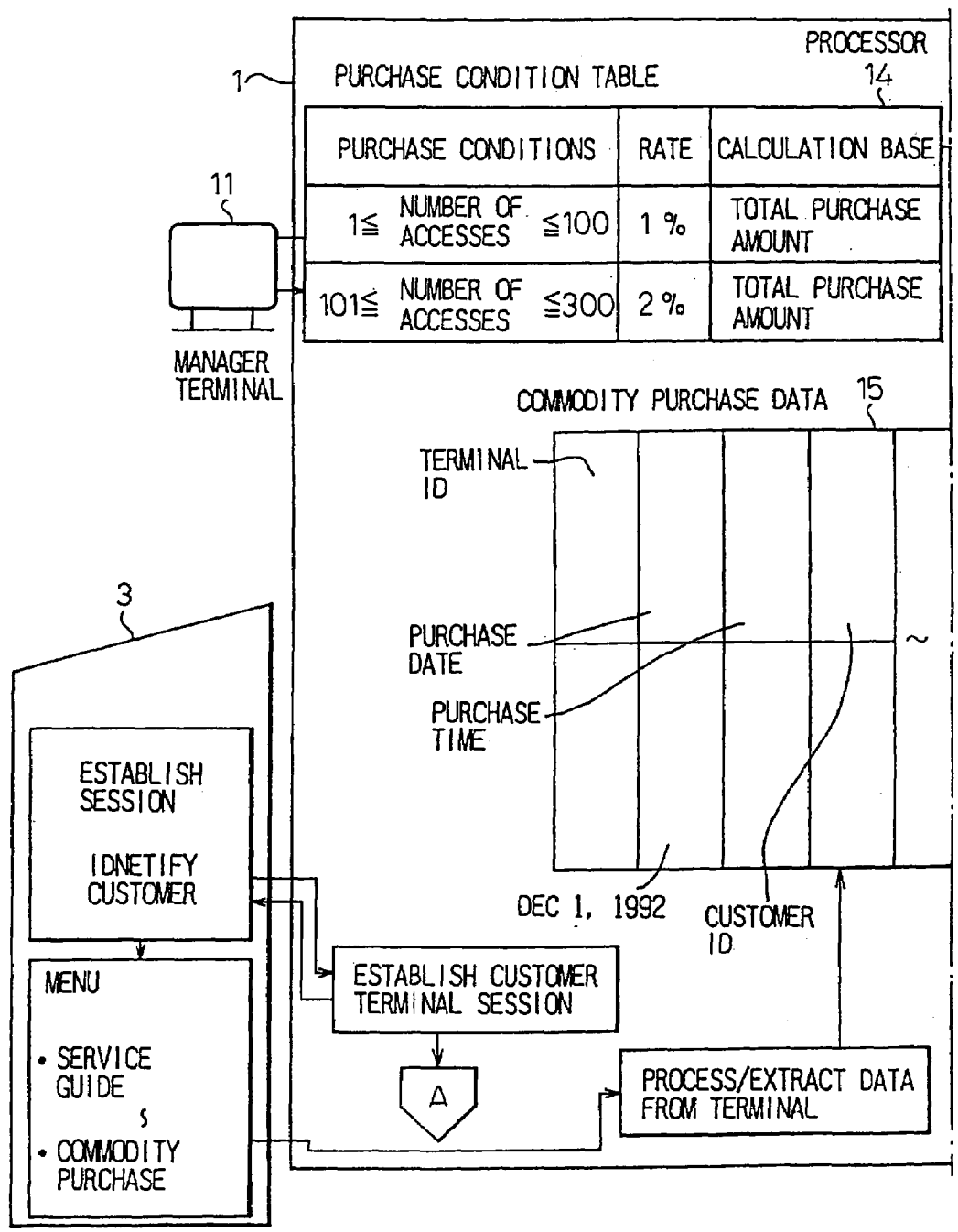
FIGS. 17(A) and 17(B) are views explaining a process of issuing points according to the number of accesses as a purchase condition.
Figure 17B:
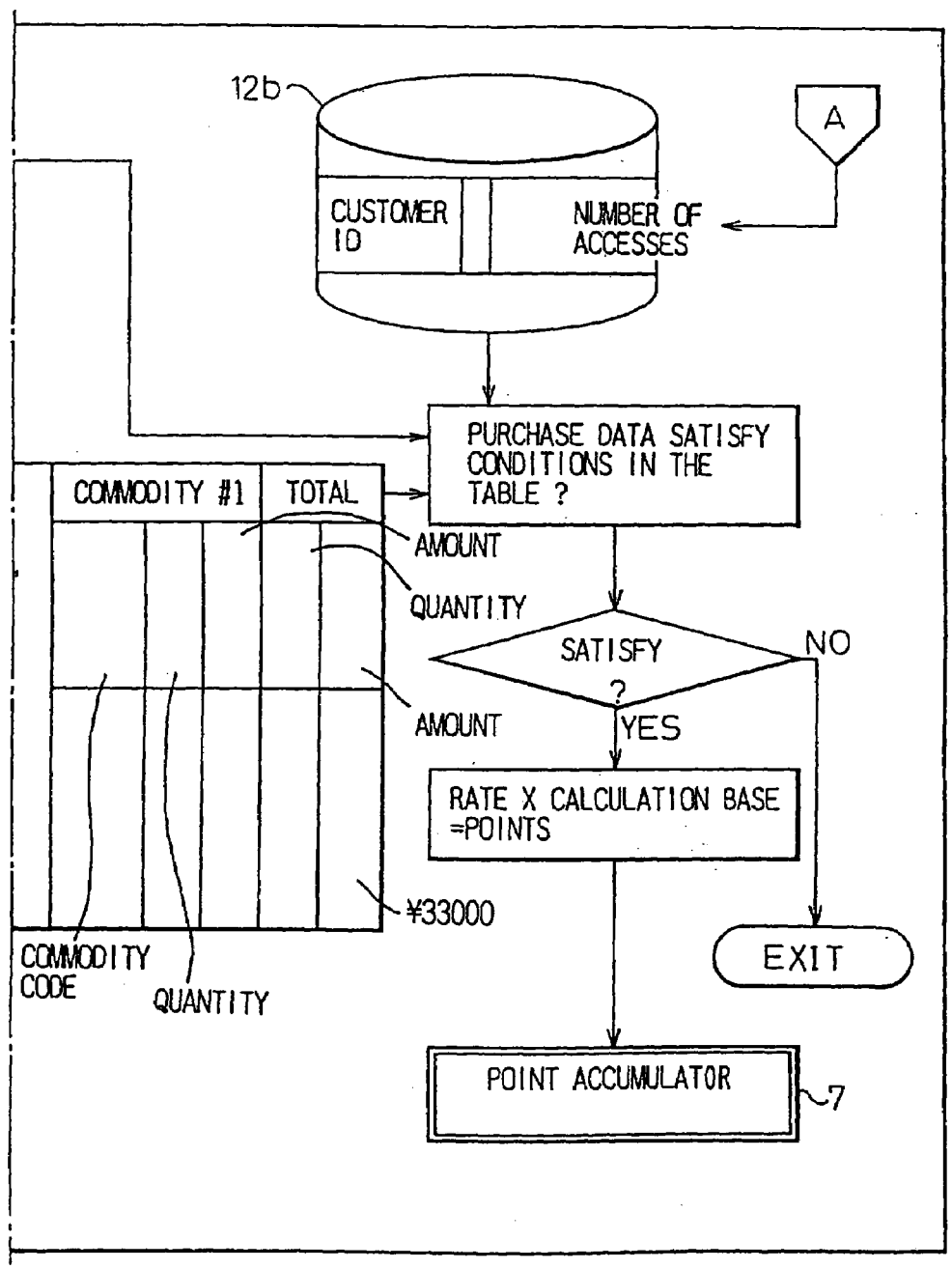

FIGS. 17(A) and 17(B) are views explaining a process of issuing points according to the number of accesses.

In the figures, the purchase condition table 14 contains the purchase conditions set according to the screen of FIG. 9(H) for the number of accesses. The store terminal 35 or customer terminal 30 provides purchase data, which is processed and extracted to form purchase data 15 of predetermined format. A customer ID in the purchase data 15 serving as a key, the number of accesses of the customer is retrieved from the customer database 12b and is incremented by one. The incremented number is collated with the purchase conditions in the table 14. If the conditions are satisfied, points for the purchase of this time are calculated and transferred to the point accumulator 7. If the number of accesses retrieved from the customer database 12b is 230, the number is updated to 231. Since the point calculation rate for the access number of 231 is 2%, points are calculated as: point calculation rate 2%×total purchase amount Yen 33,000=66 points.

1.1.2.3. A function of counting the number of visits to a store

The host computer or POS register counts the number of visits of a customer to a store, and according to the number, points are issued. Namely, the point calculation rate is changed according to the number of visits to the store or continued purchases. This may promote customers to repeatedly purchase commodities at the store.

1.1.3. A function of setting customer ranks The point calculation rate may be determined according to customer ranks. Namely, customers are classified into ranks according to their amounts of purchase, the numbers of purchase transactions, the numbers of accesses, the numbers of visits to stores, job types, and addresses (giving priority to local customers). The point calculation rate is changed according to the ranks. This may have an effect of developing good customers.

Figure 18A:
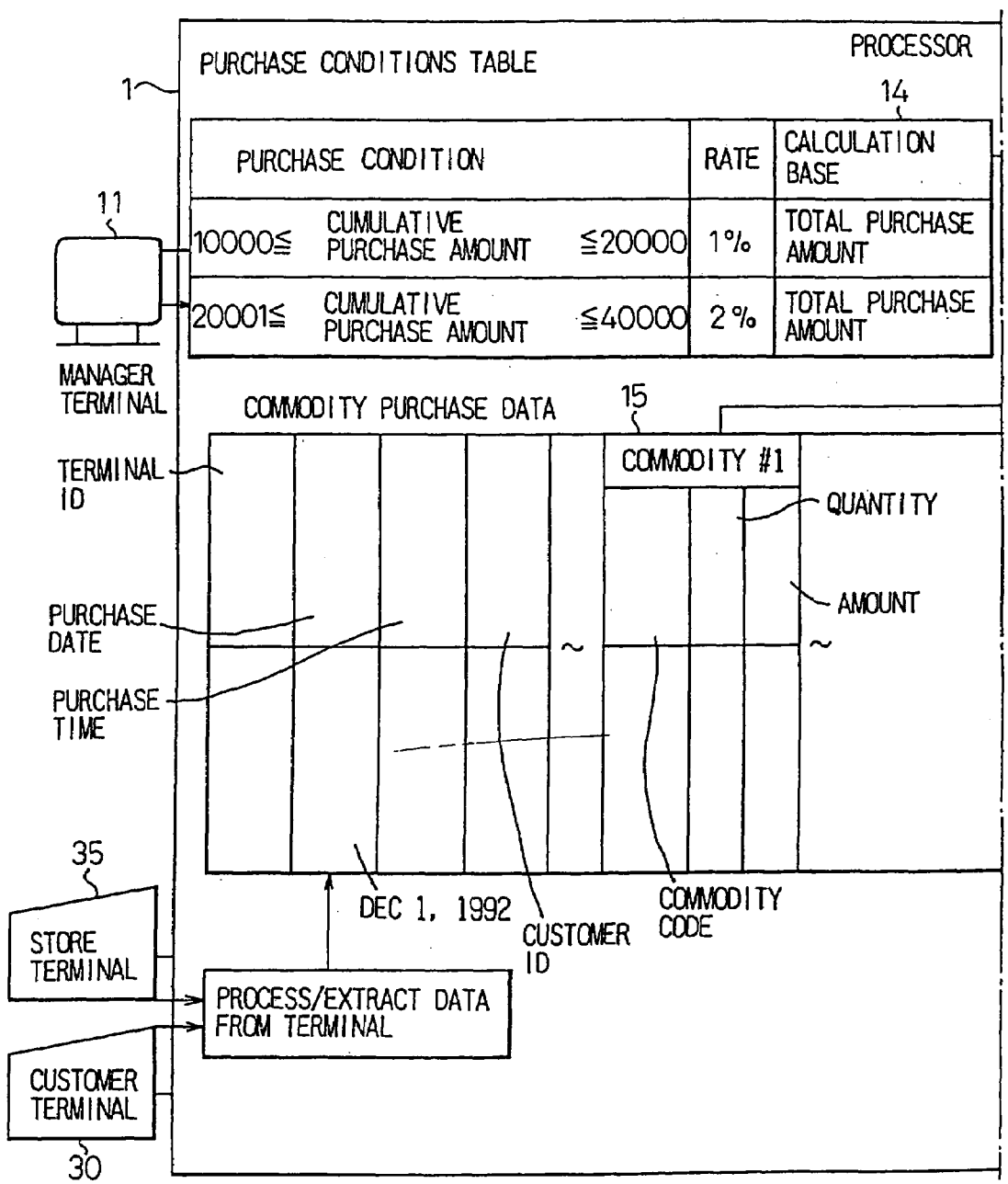
FIGS. 18(A) and 18(B) are views explaining a process of issuing points according to purchase amount as a purchase condition.
Figure 18B:
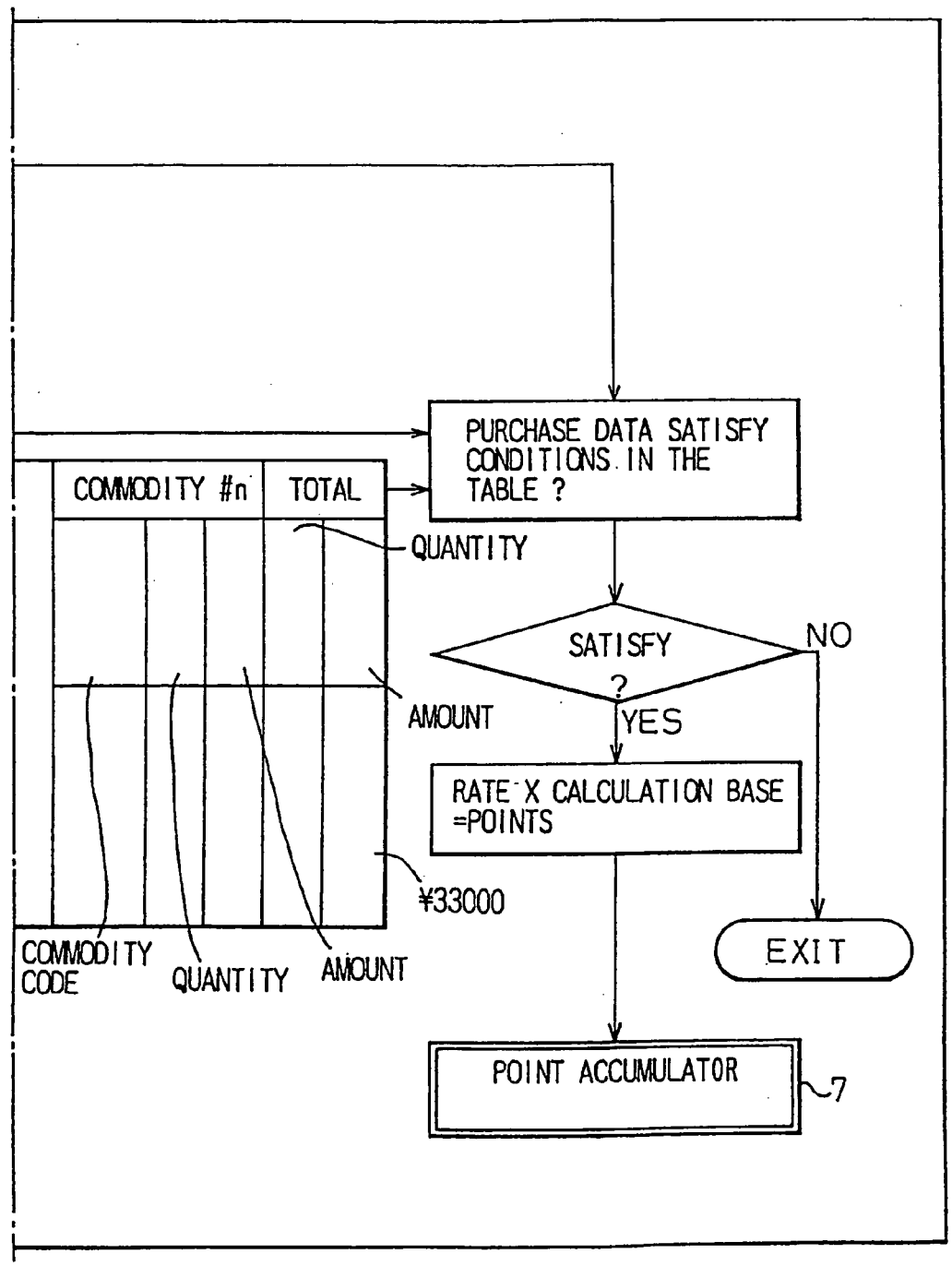

FIGS. 18(A) and 18(B) are views explaining a process of issuing points according to the amount of purchase.

In the figures, the purchase condition table 14 contains the purchase conditions set according to the screen of FIG. 9(I) for the amounts of purchases. The store terminal 35 or customer terminal 30 provides purchase data 15 of a predetermined format. The total purchase amount in the purchase data 15 is collated with the purchase conditions in the table 14. If the conditions are met, points for the purchase at this time are calculated and transferred to the point accumulator 7. In the example of FIG. 18, the total price is Yen 33,000 and the point calculation rate for the price is 2%, so that the points are calculated as: point calculation rate 2%×total price Yen 33,000=66 points.

Figure 19A:
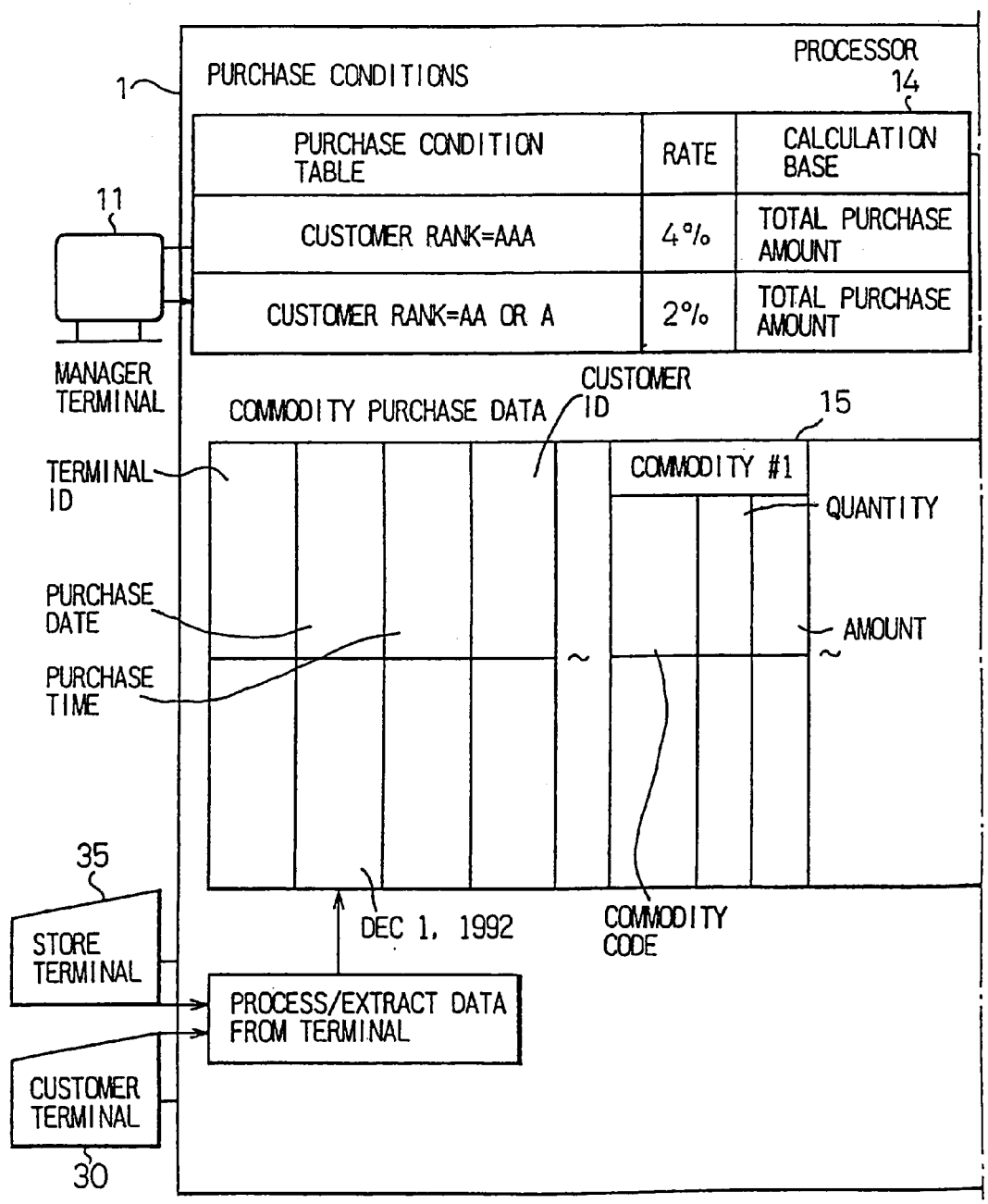
FIGS. 19(A) and 19(B) are views explaining a process of issuing points according to customer rank as a purchase condition.
Figure 19B:
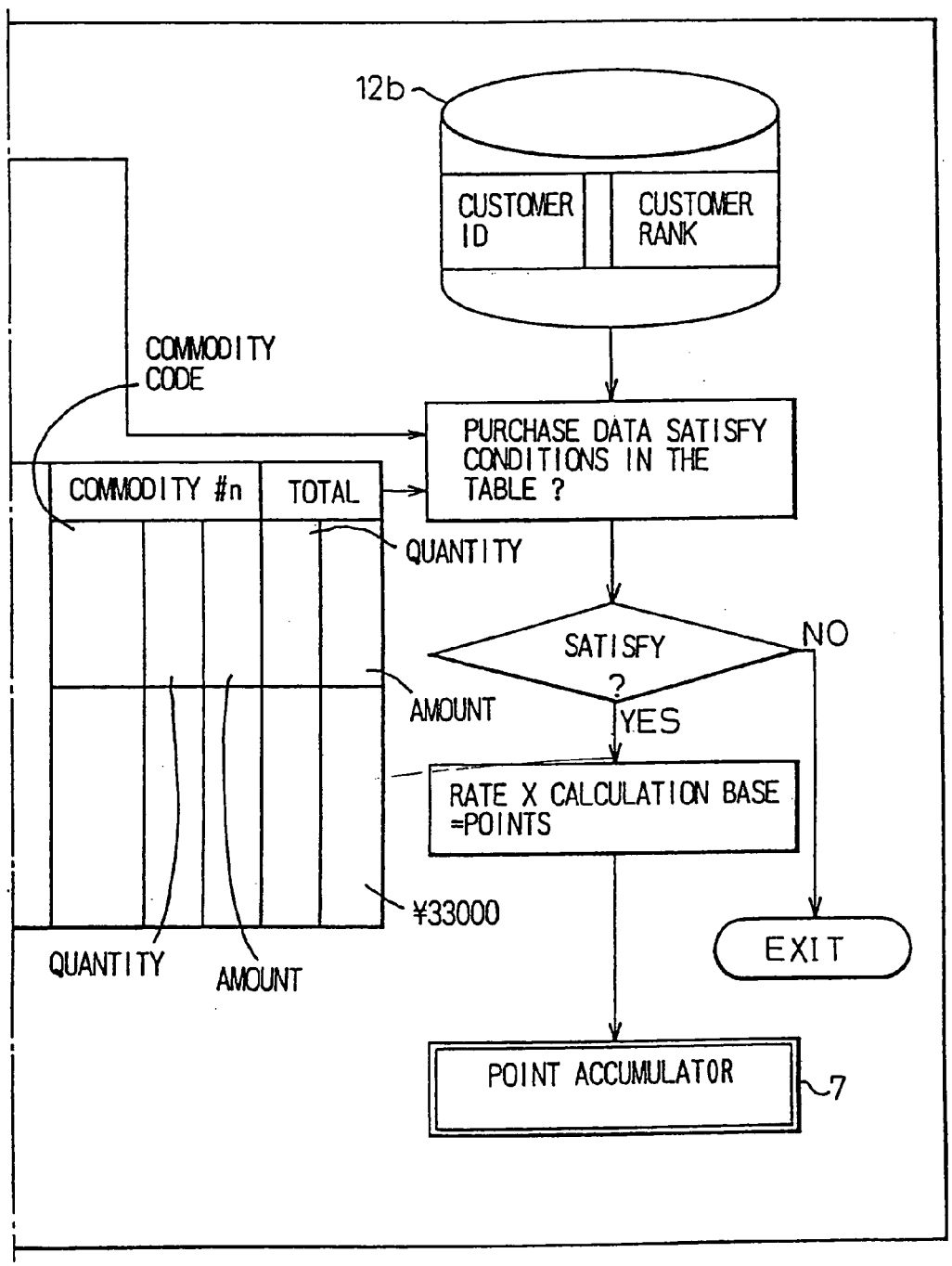

FIGS. 19(A) and 19(B) are views explaining a process of issuing points according to customer rank.

In the figures, the purchase condition table 14 contains the purchase conditions set according to the screen of FIG. 9(J) for the customer ranks. The store terminal 35 or customer terminal 30 provides purchase data, which is processed and extracted to form purchase data 15 of a predetermined format. With a customer ID in the purchase data 15 serving as a key, a customer rank is retrieved out of the customer database 12b. The customer rank is collated with the purchase condition table 14. If the conditions are met, points for the purchase at this time are calculated and transferred to the point accumulator 7. In the example of FIGS. 19(A) and 19(B), a customer rank of A is retrieved from the customer database 12b. Since the point calculation rate for the customer rank of A is 2%, the points are calculated as: point calculation rate 2%×Yen 33,000= 66 points.

1.1.4. A function of adding a degree of chance

Points are issued to customers according to chance. Points of commodities are not disclosed to each customer before issuance. The customer receives points like a game. For this purpose, points for commodities and point calculation rates are provided at random according to terminal operations. Game software may be played on a customer terminal, and according to a result of the play, points or a point calculation rate is determined and issued to the customer. For example, a 10,000th customer to a store may be provided with bonus points. This makes purchase transactions like entertainment, to promote customers' purchase interest.

FIG. 20 is a view explaining a process of issuing points according to chance. The customer terminal 30 or store terminal 35 employs the amount of purchase, a transaction number, the date or time of purchase, or a number entered by a customer through a keyboard or a pin pad 3-1 as an input parameter in the process of registering purchased commodities, to calculate points or a point calculation rate at random in a predetermined range during the process of providing points or the process of providing a point calculation rate. The processor 1 receives the points or the point calculation rate determined at random by the customer terminal 30 or store terminal 35 together with the purchase data, calculates points for this purchase by adding the random points or the point calculation rate to a result of collation with the purchase condition table 14, and transfers the result of the addition to the point accumulator 7. p1 1.2. A function of accumulating points The function of accumulating points includes a function of storing cumulative points, a function of calculating points, a function of determining an accumulation unit, and a function of converting the cumulative points.

1.2.1. A function of storing cumulative points

Cumulative points are stored in the host computer, POS register, or customer terminal.

1.2.2. A function of calculating points 1.2.2.1. A function of adding points

Points are added in the host computer and POS register. Terminals with a bar-code scanner installed in a store and readers attached to store carts may calculate commodity prices and points.

1.2.2.2. A function of referring to conditions

Cumulative points of each customer are periodically monitored. Interest points are added according to the cumulative points. The cumulative points are decreased according to a non-purchase period. These techniques motivate customers to make continuous purchases.

Figure 21A:
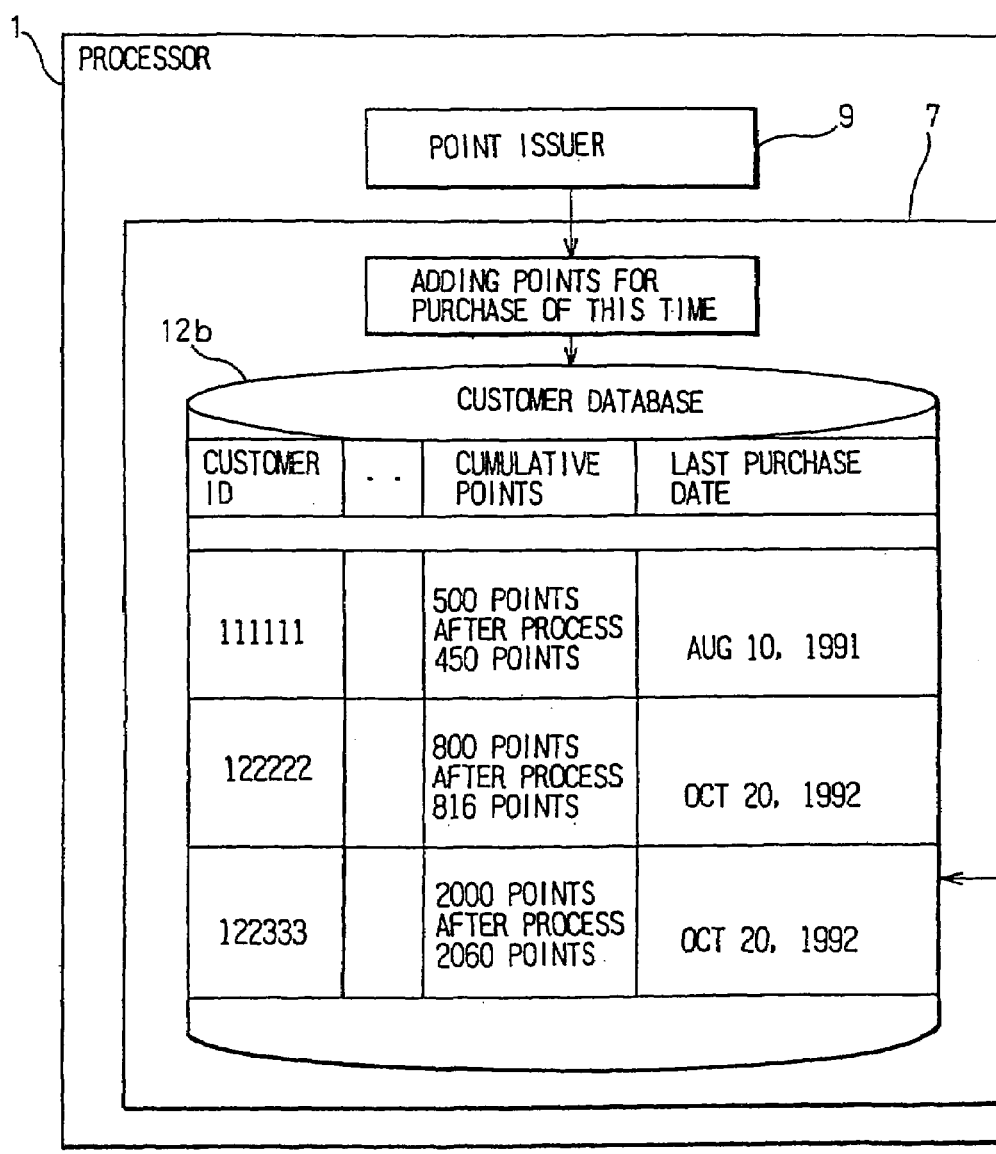
FIGS. 21(A) and 21(B) are views explaining a process of updating cumulative points carried out by point accumulator.
Figure 21B:
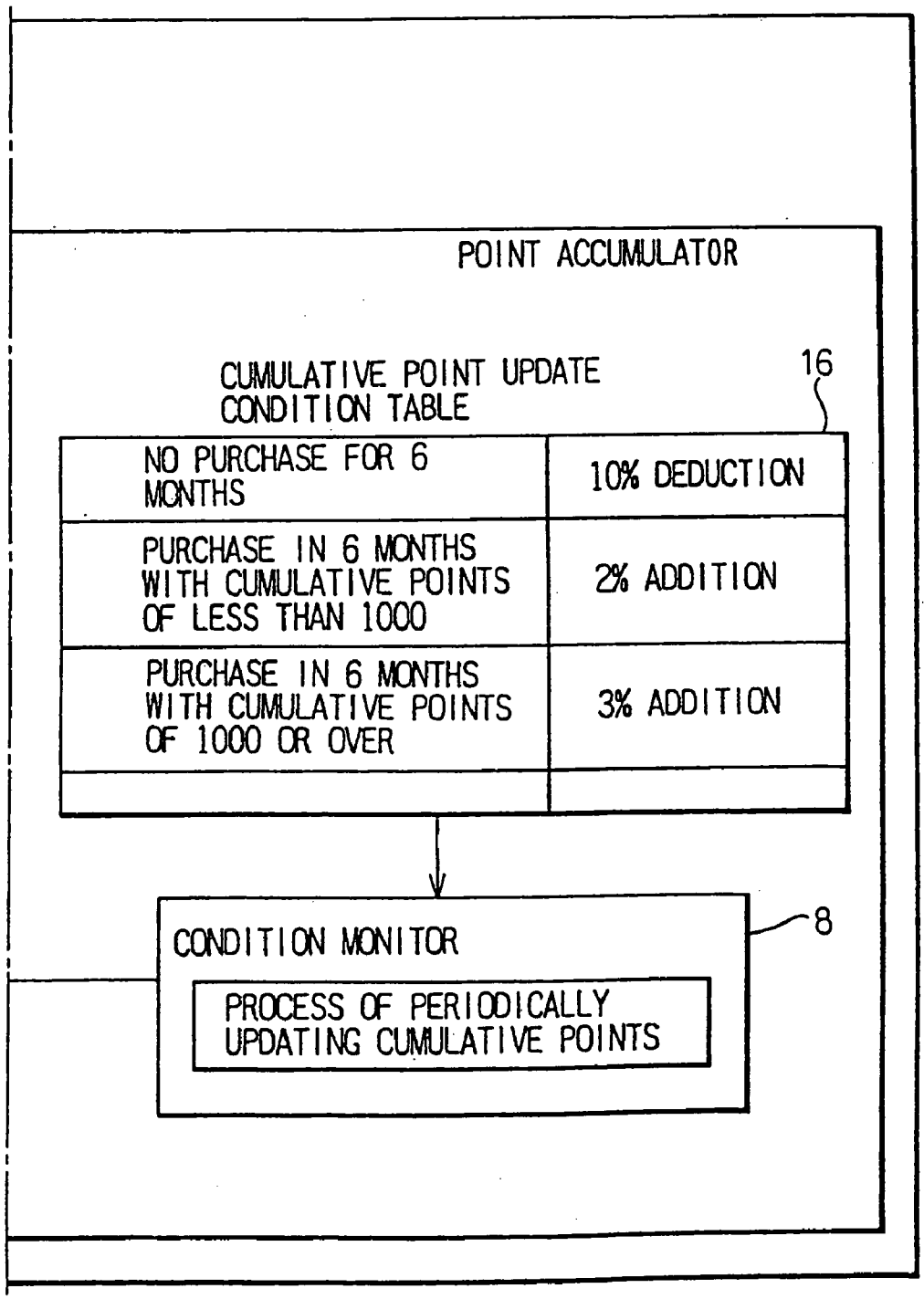

FIGS. 21(A) and 21(B) are views explaining a process of updating cumulative points.

In the figure, the point accumulator 7 adds points for purchase of this time performed by a customer issued by the point issuer 9 to the cumulative points of the customer stored in the customer database 12b and updates the latest purchase data. The condition monitor 8 refers to a cumulative point update condition table 16 prepared in advance, to periodically monitor purchase transactions of the customer and calculate and update the cumulative points of the customer. The periodical cumulative point updating process of the condition monitor 8 is carried out monthly, every six months, or yearly.

In the example of FIGS. 21(A) and 21(B), it is supposed that the date for carrying out the periodical cumulative point updating process is Dec. 1, 1992. A customer with a customer ID of 111111 has the latest purchase date of Aug. 10, 1991. Namely, this customer has purchased nothing during the prior six months. Accordingly, the cumulative points of this customer are decreased by 10% according to the purchase conditions contained in the cumulative point updating condition table 16. Namely, the cumulative points are updated as: 500−(500×10%)=450 points. Another customer with a customer ID of 122222 has the latest purchase date of Dec. 20, 1992. Accordingly, this customer's cumulative points of 800 are increased by 28 according to the purchase conditions in the table 16. Namely, the cumulative points are updated as: 800+(800×2%)=816 points. A customer with a customer ID of 122333 has the latest purchase date of Oct. 20, 1992 and cumulative points of over 1000. Accordingly, the points are increased by 38 according to the purchase conditions in the table 16 and are updated as: 2000+(2000×3%)=2060 points.

In this way, the condition monitor 8 is periodically activated to collate each purchase date stored in the customer data base 12b with the cumulative point update condition table 16. According to a result of the collation, the condition monitor 8 adds interest points to cumulative points or reduces the cumulative points.

1.2.3. A function of determining an accumulation unit

Points are accumulated for each customer, each family, or a group. Points for a group of customers may be collectively accumulated. For example, customers related to a school may collect specific coupons and exchange them for school equipment.

Figure 22A:
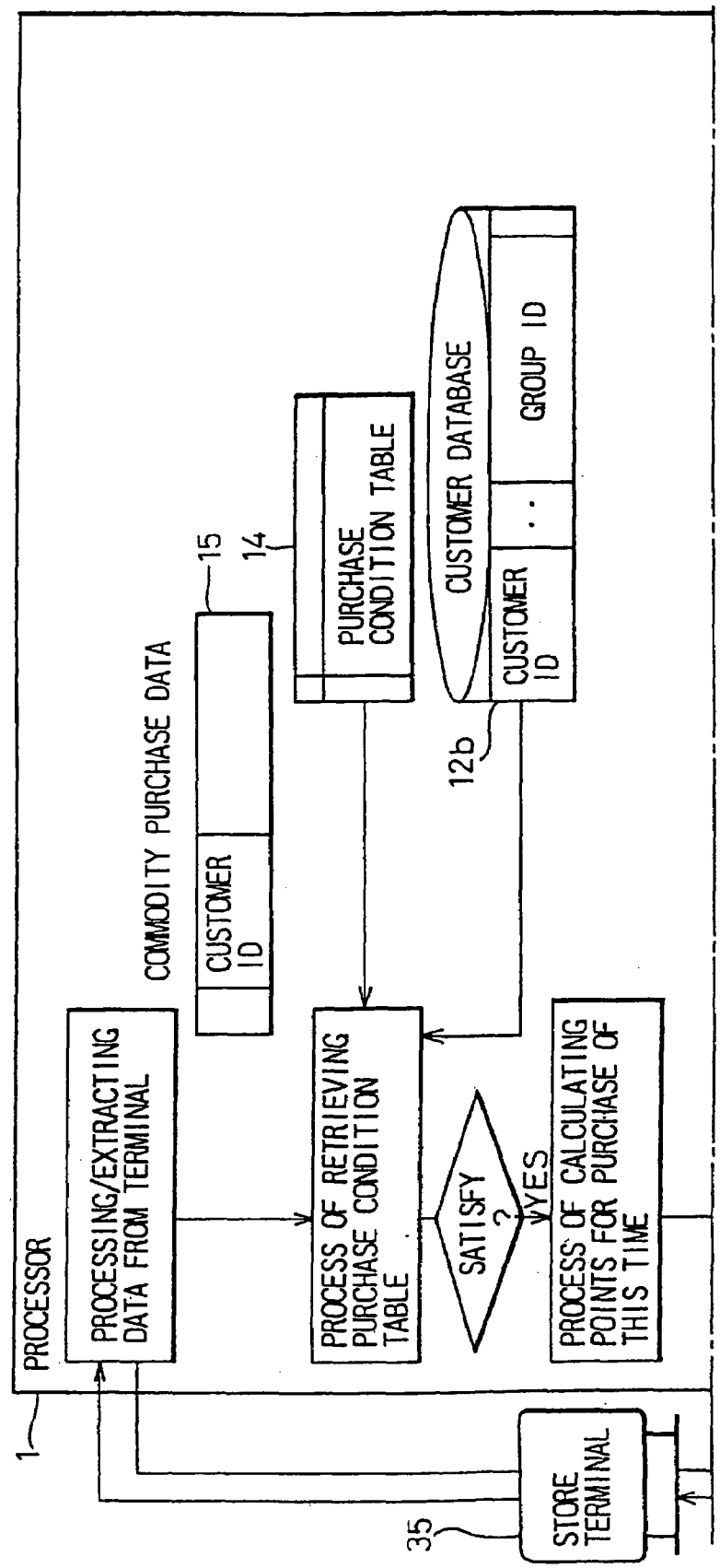

FIGS. 22(A) and 22(B) are views explaining a process of collectively accumulating points for a specific group.

In the figures, the point accumulator 7 receives purchase data from the shop terminal 35, processes and extracts the received data, and forms purchase data 15 of predetermined format. With a customer ID in the purchase data 15 serving as a key, a group ID to which the customer belongs is retrieved from the customer database 12b. If the group ID is retrieved, points for the purchase of this time are calculated according to the purchase condition table 14 and added to the cumulative points of the group stored in the group customer database 12d. The result of the addition is displayed on the store terminal 35.

This function of collectively accumulating points for groups has the following advantages for customers and retailers. Since the accumulation process is carried out in a retailer's system but not in a customer's system, the customers have no trouble accumulating points. For the retailers, the amount of purchase of customers belonging to any one of the groups will be improved. Since the retailers contribute to campaigns performed by the groups, the retailers will be well-received and their images will improve.

For example, a cumulative point display terminal installed in a store always displays the following campaign:

"Messrs. PTA at XX Elementary School Box horse donation campaign, Oct. 1 to Nov. 30 Target: 4000 points Now: 3264 points To go: 736 points This may promote sales for customers related to the group.

1.2.4. A function for converting cumulative points

As and when required by customers, customer's cumulative points may be moved from one store to another through a common center of the same group of stores. The customer's cumulative points may be converted into points of another group or store according to a predetermined rate. This results in commonly using different kinds of point services and improving service for customers.

1.3. A function of notifying points

The notifying of points will be explained with reference to FIG. 1. In the figure, the point notifier 5 transfers to the terminal 3 point information such as cumulative points, target points, a shortage of points accumulated by the point accumulator 7, as well as service information stored in the service storage 6. These data and information may be notified not only through multimedia terminals, customer terminals, store terminals, bank terminals, videocart POS register terminals, and store terminals with a bar-code scanner but also through a telephone by voice, facsimile, personal computer telecommunication displays, television/telephone sets, and bidirectional television sets. The data may be accessed through a specific channel of CATV that is always accessible, electronic catalogs (CD-ROMs), and IC cards. The data may be transmitted to customer terminals through available public circuits.

Figure 23:
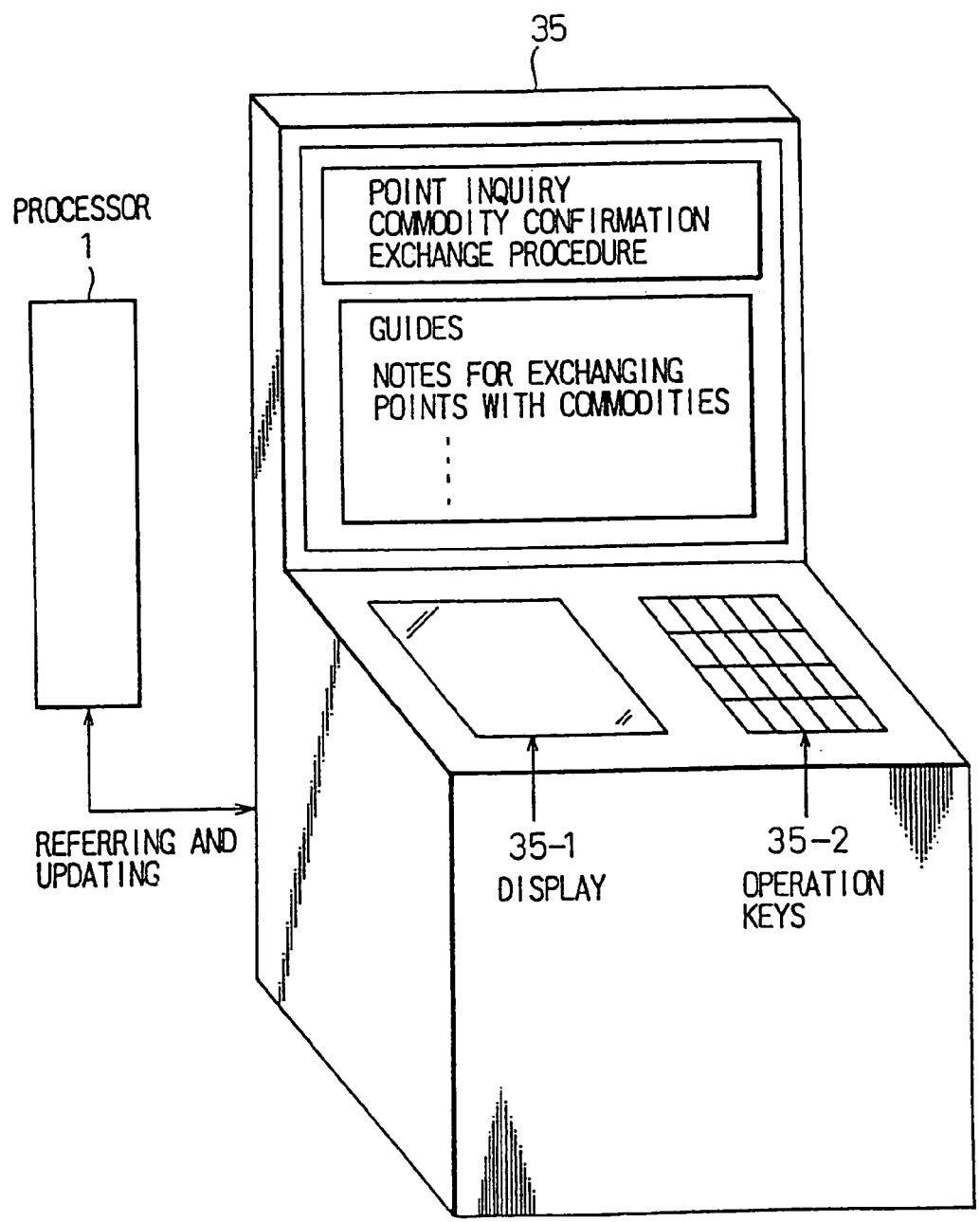
FIG. 23 is a perspective view showing an appearance of a store terminal.

FIG. 23 shows an example of the store terminal 35.

In the figure, the store terminal 35 is provided with a display 35-1 and operation keys 35-2. The terminal 35 is connected to the processor 1 installed in a store or business center. The display 35-1 displays guides for operations to be carried out by a customer, point information, and service information. The terminal 35 is partly operated by a customer through the operation keys 35-2.

When a customer enters his or her ID into the terminal 35, the terminal 35 displays cumulative points of the customer and exchangeable commodities for the points. By specifying a commodity number, the terminal 35 may take place necessary procedure for mailing the commodity to the customer. In this way, the customer can confirm points and exchangeable commodities at once, and through a simple operation, can exchange the points for the commodities.

The same functions may be added to bank terminals such as cans dispensers. In this case, existing facilities are usable to reduce system costs, and the tie-up between banks and stores will reinforce service for customers.

FIG. 24(A) shows an example of a display screen of the customer terminal or store terminal 35, and FIG. 24 (B) shows an example of a display screen of a POS register.

In FIG. 24 (A), the screen 35-1 of the store terminal 35 shows a customer ID, a customer name, cumulative points, etc. Operations such as selection of displayed items, confirmation, deletion, and termination are carried out through and up key 35-1*a*, a down key 35-1*b*, a procedure key 35-1*c*, an OK key 35-1*d*, a cancel key 35-1*e*, and an end key 35-1*f* that are operated by touching them with a finger or a mouse. If a required commodity is specified according to operation guides, the name, picture, and required points of the commodity, whether or not the commodity is exchangeable for the present points, total points to be needed for the exchange, and points to be left after the exchange are displayed.

In FIG. 24(B), the customer display screen 35-3 of the POS register terminal has an amount of money display part 35-3*a* for displaying the amount of money a customer presented to a clerk for payment, a change display part 35-3*b* for displaying the amount of change to be returned to the customer, and a cumulative point display part 35-3*c* for displaying the present cumulative points of the customer.

Figure 25A:
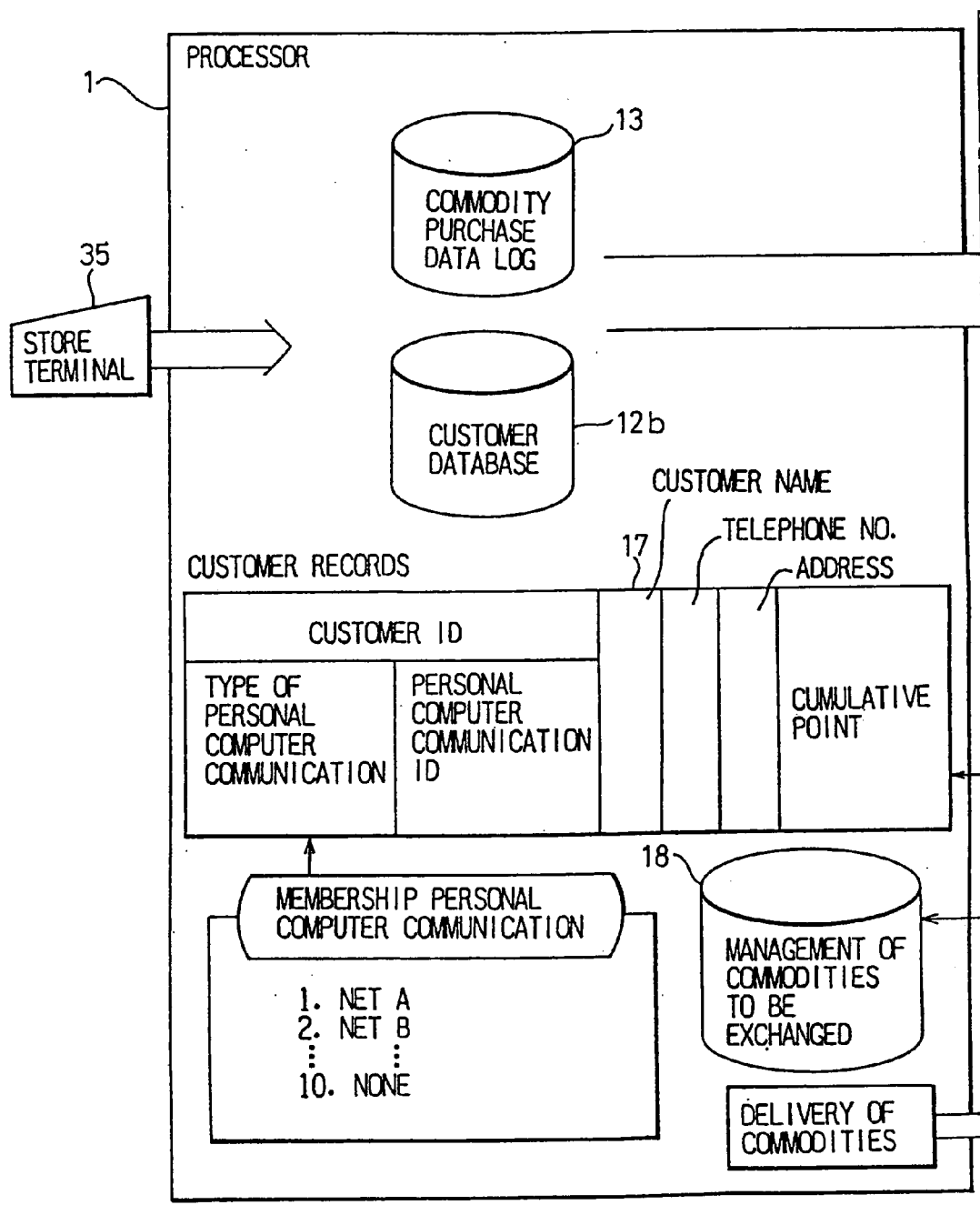
FIGS. 25(A) and 25(B) are views showing an example of a personal computer communication terminal serving as a customer terminal.
Figure 25B:
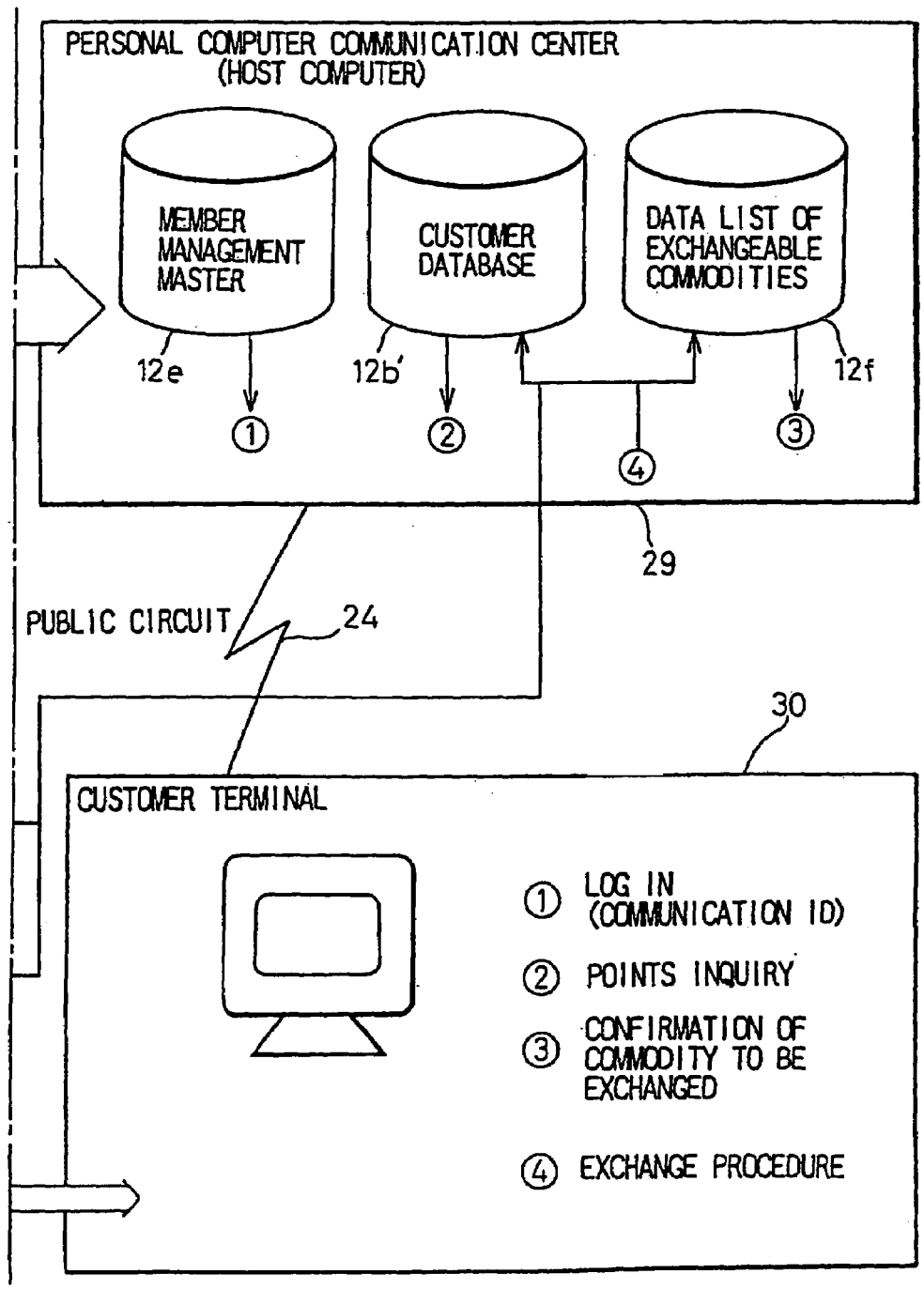

FIGS. 25(A) and 25(B) are views showing an example of employing a personal computer as the customer terminal as well as personal computer communication.

In the figures, a customer obtains point information such as cumulative points and service data and carries out a necessary procedure such as exchanging the points for service through the customer terminal 30 and a host computer of a personal computer communication center. The processor 1 comprises the customer data base 12*b* that stores customer records 17. For each customer, the records 17 hold the type of the personal computer communication and a personal computer communication service ID. The processor 1 periodically transmits the customer records 17 to a database of the host computer 29 of the personal computer communication service center. When a customer connects its personal computer to the host computer 29 of the service center through a communication circuit, the host computer 29 recognizes the communication ID of the customer as a customer ID stored in a member management master data 12*e* as indicated with 1 in FIG. 25, accesses point data stored in a customer database 12' as indicated with 2 in FIG. 25, provides the customer with service information according to an exchangeable commodity list 12*f*, to ask the customer to confirm a commodity to be exchanged as indicated with 3 in FIG. 25, carries out the procedure of exchanging the commodity as indicated with 4 in FIG. 25, and transmits updated data including a request of exchanging the points with the commodity to the processor 1. According to the updated data, the processor 1 updates the customer records 17 and takes necessary steps of sending the commodity according to the data transmitted to a requested commodity manager 18.

This method is advantageous for customers because they can freely access stores from their homes.

1.3.1. A function of guiding target points

Service contents may be electronically informed to customers through periodic electronic catalogs (CD-ROMs) and IC cards. The service contents may be retrieved on terminal displays as mentioned in 1.3. The service contents may be set to be always accessible through a channel of a CATV or personal computer communication. The service contents may be displayed on a bidirectional television display. The service contents may be target commodities as requested by customers. The service commodities may be retrieved with a keyword. Service commodity information may be transmitted to customers through communication circuits during off-hours.

The service contents may be presented to customers according to their cumulative points. Namely, the customers are timely informed of most required information. For this purpose, target commodities nearest to the cumulative points of each customer may be informed. Each customer may retrieve service contents obtainable with the present points of the customer. Sales promotion commodities may be frequently informed to the customers. The next information will be displayed with brighter colors.

Points assigned for commodities may be displayed on videocarts in a store. When the points of a customer reaches a specific value, a catalog may be mailed to the customer.

FIGS. 26(A), 26(B) to 28(A), 28(B) show a process of informing target commodities to a customer using personal computer communication.

Figure 26A:
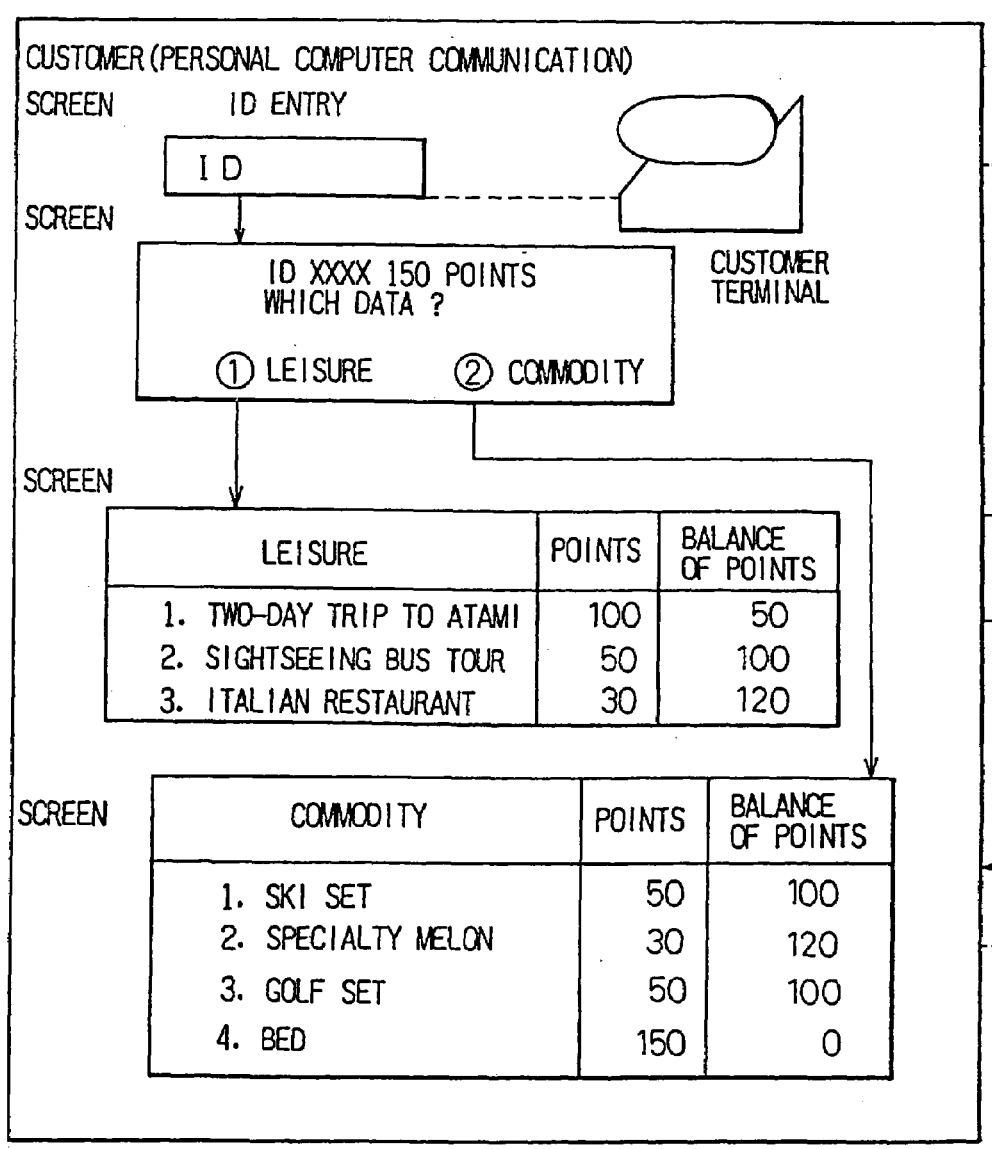
FIGS. 26(A) and 26(B) are views showing an example of informing a customer of a target object through personal computer communication.
Figure 26B:
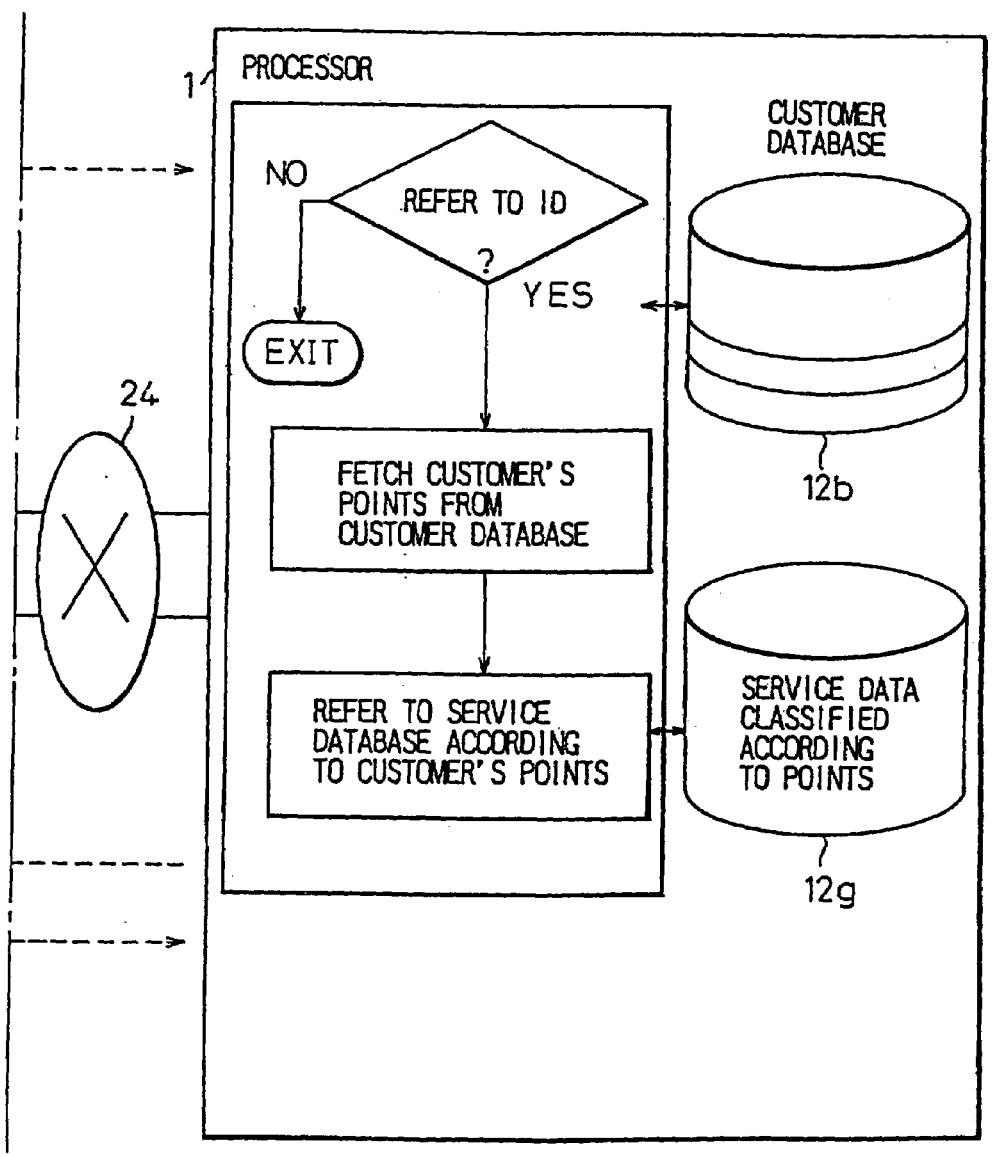

FIGS. 26(A) and 26(B) are views showing an example of a customer employing personal computer communication to retrieve services obtainable in the range of points the customer has. The customer terminal 30 is connected to the processor 1 through a public circuit 24. According to operation guides displayed, the customer enters a customer ID, selects a required genre such as leisure or commodities, and obtains present cumulative points, points required for the guided services, and points left after receiving a required service. If necessary, the customer may proceed to receive service for the present cumulative points. The processor 1 receives the customer ID from the customer terminal 30, retrieves the cumulative points of the customer from the customer database 12a, transmits the cumulative points to the customer terminal 30, retrieves service information from service data 12g classified according to points with the cumulative points serving as a key, and sends the retrieved result to the customer terminal 30.

The customer can instantaneously confirm the cumulative points on the personal computer at home and check services available for the cumulative points.

Figure 27A:
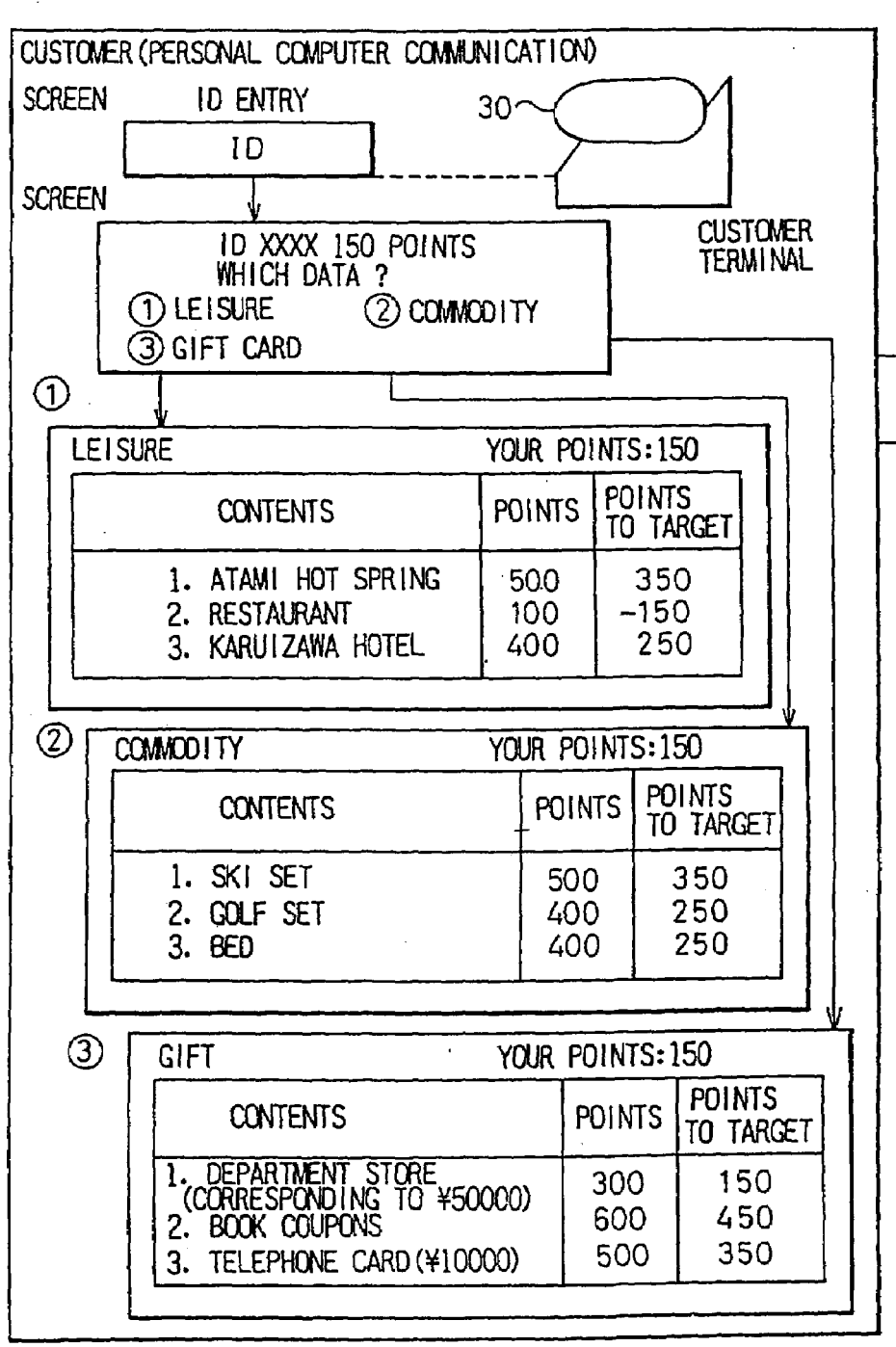
FIGS. 27(A) and 27(B) are views showing another example of informing a customer of a target object through personal computer communication.
Figure 27B:
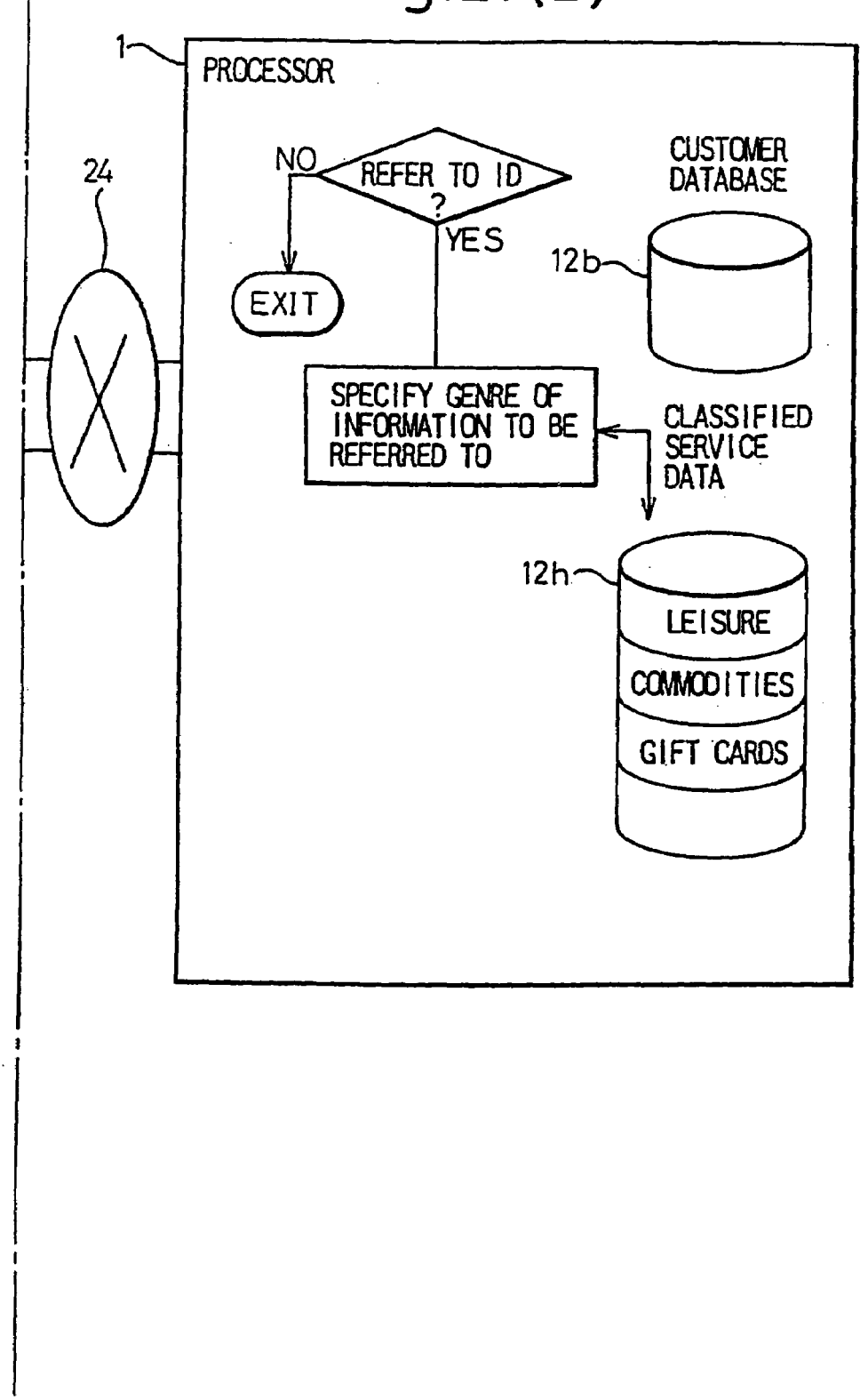

FIGS. 27(A) and 27(B) are views showing an example of a customer retrieving a required object through personal computer communication. The customer selects a type that may include a target object. The customer terminal 30 is connected to the processor 1 in the same manner as FIG. 26. The customer enters his or her ID according to operation guides displayed. Then, cumulative points of the customer and a type menu are displayed. Once the customer selects a type, the processor 1 retrieves corresponding service information from classified service data 12h and transmits the retrieved information to the customer terminal 30. The customer terminal 30 displays the contents of the service of the selected type, points required for the service, and points to obtain the selected service, i.e., a difference between the customer's cumulative points and the points for the required service.

Figure 28A:
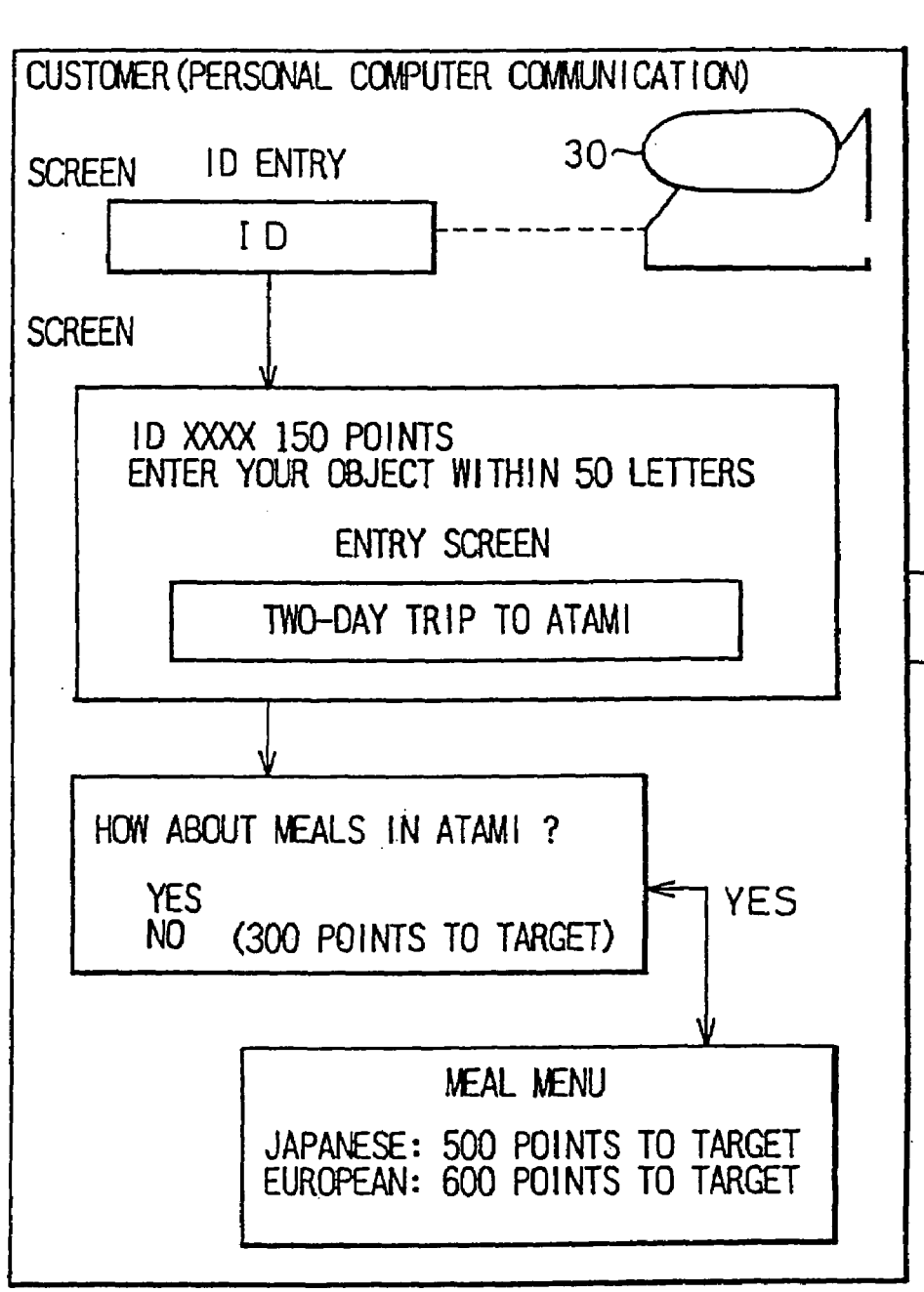
FIGS. 28(A) and 28(B) are views showing still another example of informing a customer of a target object through personal computer communication.
Figure 28B:
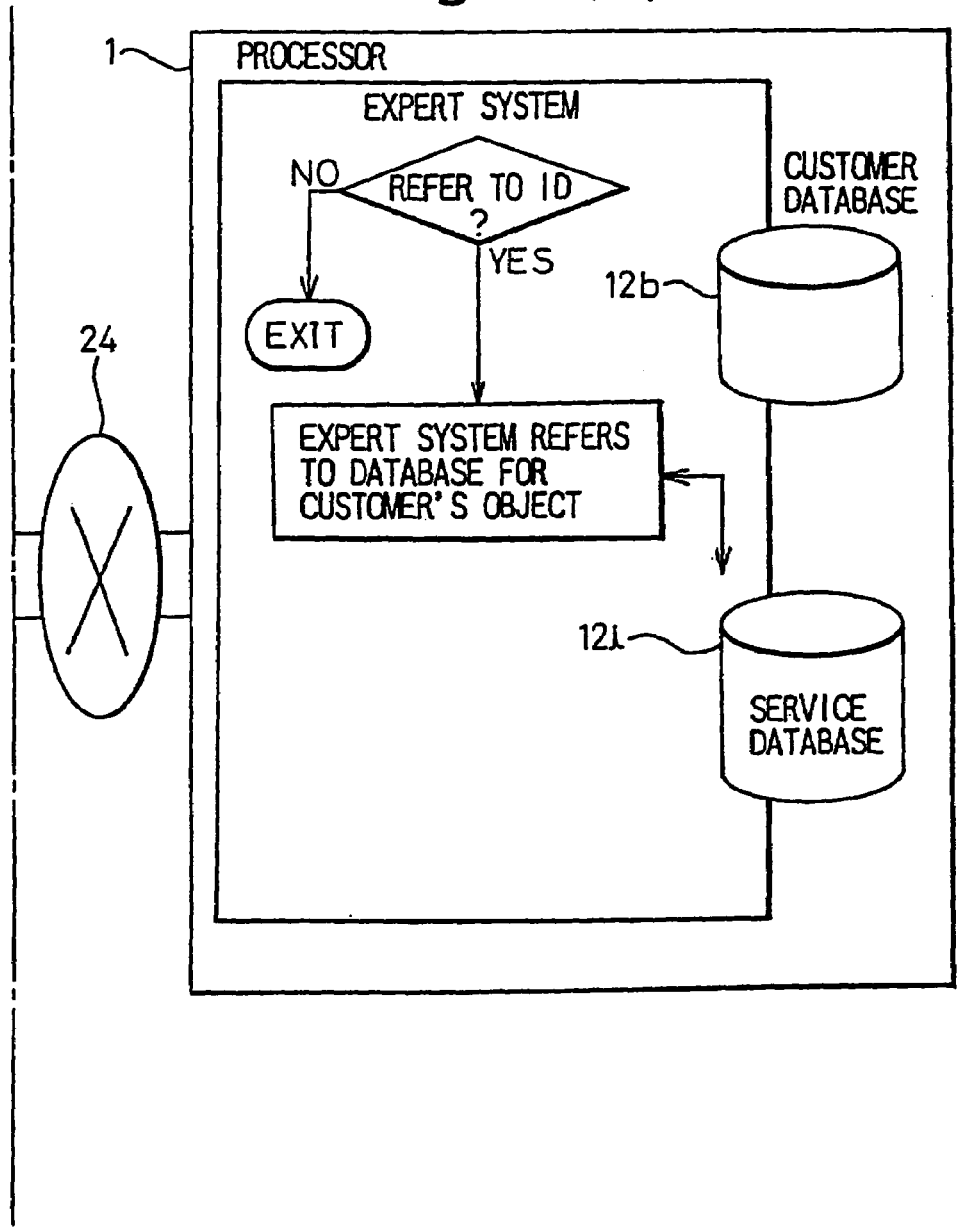

FIGS. 28(A) and 28(B) are views showing an example of a customer employing personal computer communication to retrieve a required object. The object is specified by the customer on an entry screen, and the data of the object is informed to the customer by an expert system in the processor 1. The customer terminal 30 is connected to the processor 1 in the same manner as FIGS. 26(A) and 26(B). According to displayed guides, the customer enters a customer ID and specifies an object using 50 characters or less. For example, if the customer prefers a two-day trip to Atami, the customer enters "two-day trip to Atami." According to the entered data, the expert system of the processor 1 retrieves a service database 12i, asks the customer for options such as meals, and informs the customer of points or a shortage of points for receiving the object.

Figure 29A:
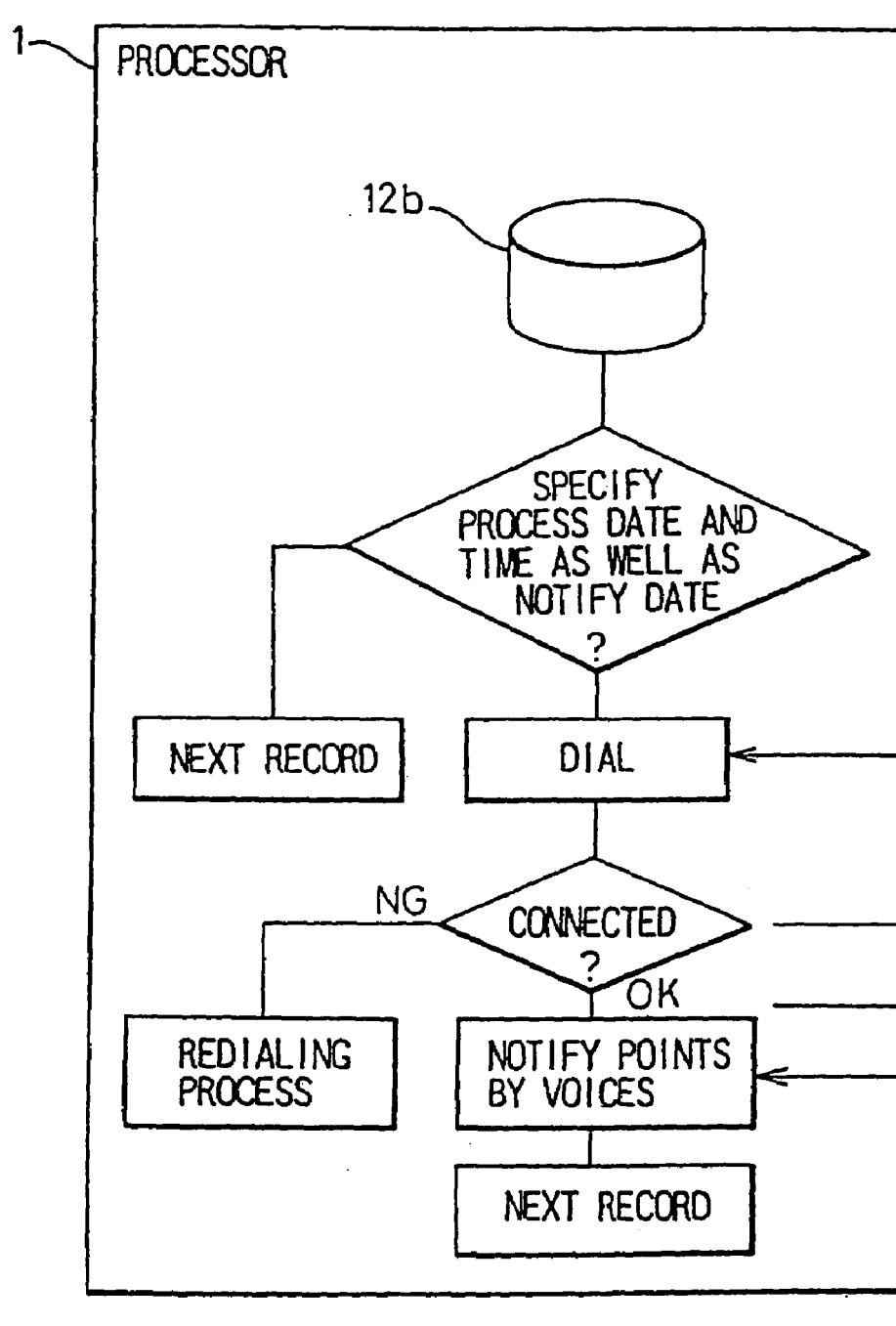
FIGS. 29(A) and 29(B) are views showing an example of a service for informing a customer of service point data by voice through a telephone line.
Figure 29B:
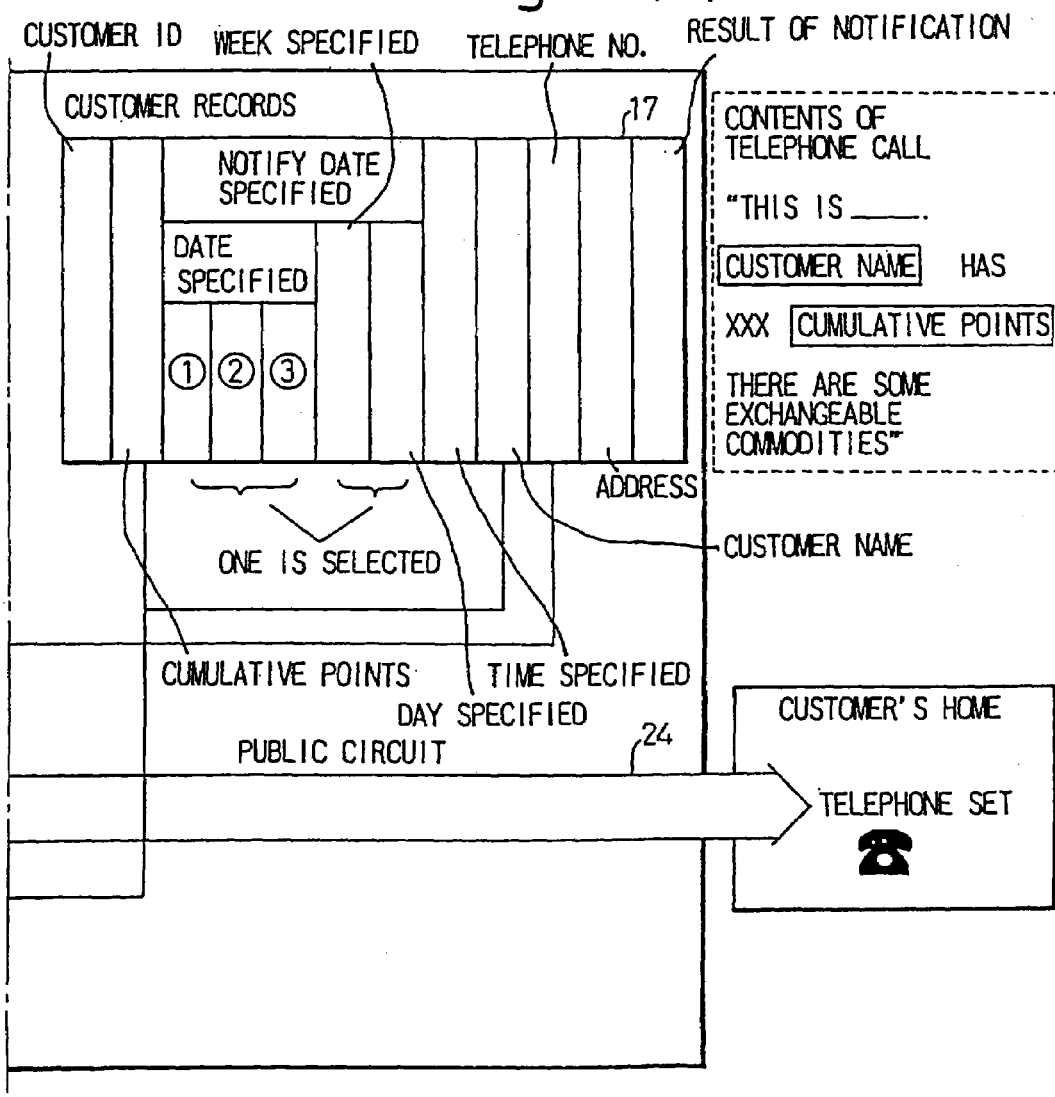

FIGS. 29(A) and 29(B) are views showing an example of providing a customer with point information by voice through a telephone.

In the figures, the processor 1 periodically retrieves customers to whom count data must be informed out of the customer database 12b with notification dates in the customer records 17 being keys. According to the retrieved data, the processor 1 informs each customer of the point information and service guide messages by voice through the public communication circuit 24.

Figure 30:
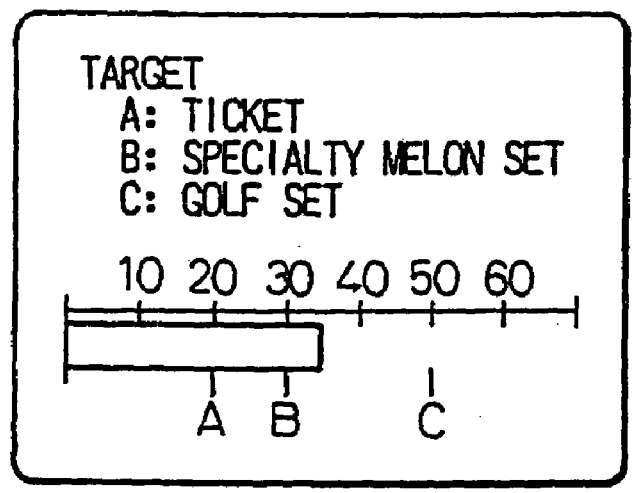
FIGS. 30(A) to 30(D) are views showing examples of displaying cumulative points and the degree of attainment of a target on a personal computer serving as a customer terminal.
Figure 30:
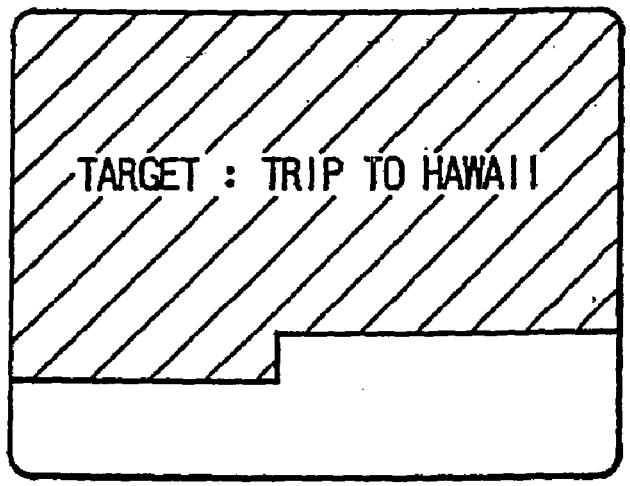
Figure 30:
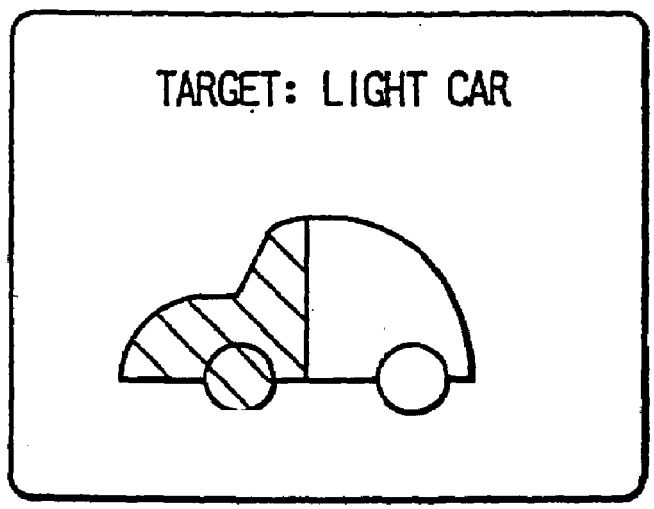
Figure 30:
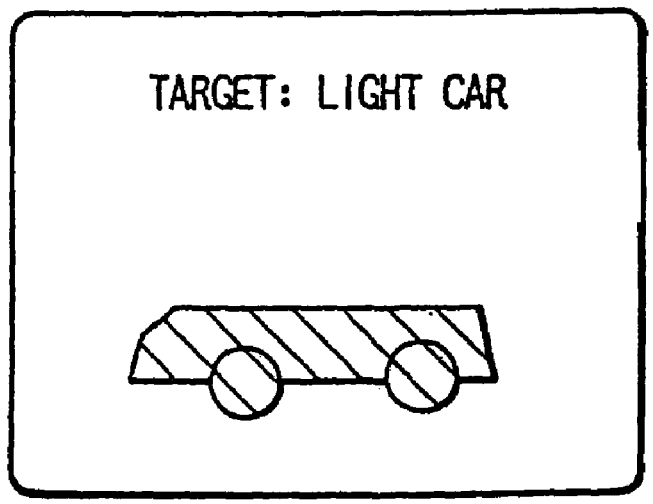

When a personal computer is employed as the customer terminal, the cumulative points of a customer may be displayed at the start of an access by the customer. In this case, the customer always sees the points and will be motivated to reach a number of target points. In FIGS. 30(A) and 30(B), target points and present points are plotted to visually show the attainment of the target points, to motivate the customer to get the target points.

FIG. 30(A) is a column graph showing present cumulative points with target points being plotted on a scale. The column graph is always displayed during point information service and software service. Once the target service is provided to the customer, the cumulative points are decreased and the decreased state can be visually confirmed by the customer at once.

FIG. 30(B) is a graph with a whole screen representing the target points of a selected object. An area corresponding to the present cumulative points of the customer is painted with a reverse color with respect to the 100% target area. A customer can grasp the present state of the points at a glance. As the area of the cumulative points increases relative to the target area, the customer may be motivated to attain the target.

FIG. 30(C) shows an example of displaying a target object as an illustration. An area corresponding to present cumulative points is displayed with a reverse color with respect to a 100% accomplishment of the target. FIG. 30(D) displays an illustration of a target step by step according to cumulative points. As the points reach the 100% accomplishment of the target, the shape of the target gradually becomes complete, so that the customer will be motivated to complete the shape.

When a target is switched from one to another in each of the displays 30(B) to 30(D), the display is instantaneously switched to show the degree of attainment of the new object.

Cumulative points may be presented to a customer through the customer terminal 30 by voice through a telephone, personal computer communication, a facsimile, a bidirectional television such as a television/telephone set, or a specific channel of a CATV. Present cumulative points may be displayed on a first access screen, plotted on a graph together with target points, or stored in a memory of the customer terminal. During off-hours of communication circuits, the memory of the customer terminal is updated. The present points may be periodically displayed on a terminal display.

Cumulative points may be presented to a customer in a store. In this case, the points may be informed to the customer with a voice synthesizer of the store terminal 35. Commodity prices and points may be displayed on a videocart in the store. A display in the store may be employed to retrieve and display customer's present points. The cumulative points of specific groups may be displayed on the display in the store.

The cumulative points of each customer managed by the computer of the store may be mailed to the customer.

1.3.3. A function of informing a shortage of points

A shortage of points may be informed to a customer by voice through a telephone line and the customer terminal 30. The shortage may be informed to the customer through personal computer communication, a facsimile, a bidirectional television system such as a television/telephone system, or a specific channel of a CATV. The shortage may be displayed on a first screen after an access to the processor of the store. The shortage may be stored in a memory of the customer terminal. During off-hours of circuits, the memory of the customer terminal may be updated. The validity of points may be warned on a display of the customer.

The shortage may be presented to the customer in the store. In this case, the shortage may be informed to the customer with a voice synthesizer of the store terminal 35. A shortage of points with respect to target points may be retrieved on a display installed in the store.

2. A function of presenting service

A function of presenting a service may include functions of carrying out a service and confirming points.

2.1. A function of carrying out service 2.1.1. A function of presenting cash

Cumulative points may be converted into money, which is transferred to a customer's bank account. Cumulative points may be used as part or all of communication charges.

2.1.2. A function of presenting commodities

A bouquet may be sent to celebrate a customer's special day. A birthday card may be sent to celebrate a customer's birthday. Service tickets may be issued to some customers.

2.1.3. A function of providing information

Service (a premium) for a customer is usually given in commodities or tickets. This embodiment presents attractive software information such as video movie software, PCM music software, and game software through communication circuits.

Information to be presented will be not only pay software information such as video software information and PCM music information but also sightseeing information and various data base information.

Points may be converted into a time period for supplying software information or into the number of software information pieces, and the points will be deducted before or after the presentation of the software. The points may be analogically deducted in proportion to an elapse of time while presenting the service. If the points are gradually deducted according to time for presenting service, present cumulative points and reductions may be plotted on a graph or displayed as numerals at a customer terminal.

Figure 31:
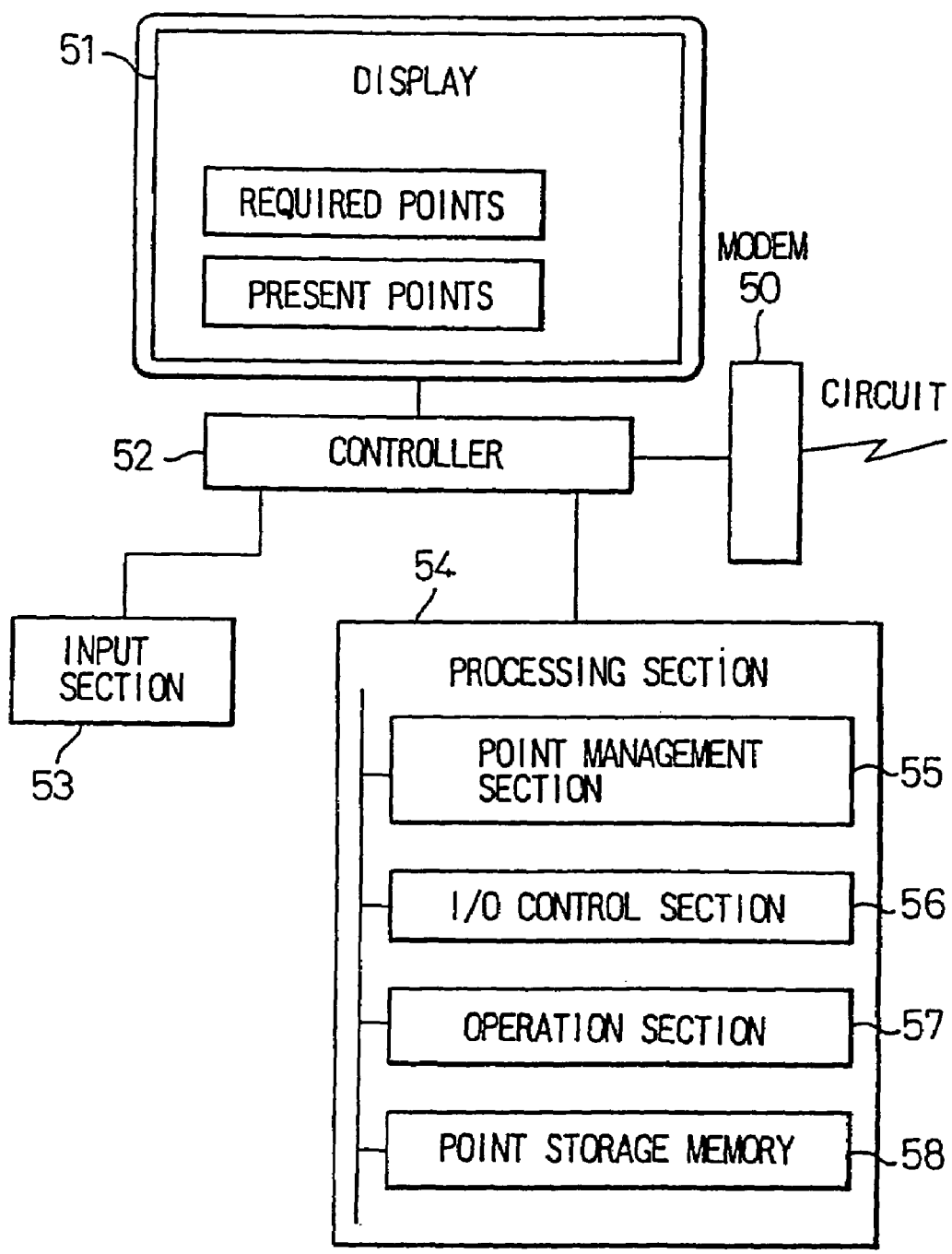
FIG. 31 is a view showing an example of software information received at a customer terminal.

FIG. 31 shows an example of a customer receiving software information service at the customer terminal. The host processor stores and manages points of the customer. In the example, the points are also held and managed by the customer terminal. For this purpose, the customer terminal comprises a modem 50 for demodulating signals transmitted through a circuit, a display 51, a controller 52 for controlling the display, an input unit 53 such as a keyboard or a pin pad and a processing unit 54. The processing unit 54 comprises point managing section 55 for managing the points of the customer, an I/O controller 56 for controlling inputs and outputs, an operation section 57 for calculating the points, and a memory 58 for storing the points.

The display 51 displays points required for receiving software information service and points presently kept by the customer. When receiving the software information service, the points are managed according to the number of software information pieces to receive or a time period for receiving the software information depending on the kind of the software information.

2.1.4. A function of presenting service

A sightseeing tour or medical counselling may be provided.

2.1.5. A function of presenting honor

Donators of points to public organizations will be displayed on store displays or public screens, to honor the donators. It is possible to automatically apply commendation for the donators to governmental organizations through communication circuits.

2.2. A function of confirming points

For achieving a function of monitoring points and a function of deducting points for which service has been provided, the processor 1 increases or decreases points and monitors the achievement of service. There is arranged means for providing a customer with point information when a customer ID and a password are provided through the store terminal 35 or customer terminal 30.

3. A function of managing customers 3.1. A function of registering customers

Means for forming a customer managing data base and registering customer data to the data base is provided.

3.2. A function of deleting customers

Means for deleting registered customer data for customers who want no service or who have lost qualifications from the database is provided.

3.3. A function of identifying customers.

The customer identifier 4 included in the processor 1 identifies customers and object persons. They will be identified with passwords, IDs used for personal computer communication, handwriting, and names and addresses. The customers may be also identified according to their physical properties such as figures, fingerprints, voiceprints, and eye patterns.

The present invention is achievable in various forms as follows:

(1) There are arranged a point issuer for issuing points according to transactions, a point accumulator for calculating and accumulating issued points, a point notifier, notifying a and a customer of point information, customer identifier identifying the customer according to customer identify data and ID number entered through a customer or store terminal. The point notifier notifies the customer identified by the customer identification means of the cumulative point information before transactions.

(2) The customer terminal notifies the customer of the customer's cumulative point information as primary data as soon as the customer terminal is turned ON.

(3) The store terminal notifies the customer identified by the customer identification means of the customer's cumulative point information as primary data.

(4) According to the arrangement of the above (1), the point issuer changes the point calculation rate according to purchase conditions.

(5) The purchase conditions are set for a predetermined period.

(6) The purchase conditions are set for purchases performed in predetermined hours.

(7) The point issue means issues points according to a point calculation rate determined according to a time band.

(8) The purchase conditions are set for stores in a specific area.

(9) The purchase conditions are set for a specific counter in a store.

(10) The purchase conditions are set to increase the point calculation rate for sales promotion commodities.

(11) The purchase conditions are set to optionally change the point calculation rate depending on days.

(12) The purchase conditions are set to apply a high point calculation rate for customers who bought a specific series of commodities.

(13) The point issuer increases the point calculation rate if a predetermined number of purchase transactions is attained.

(14) The point issuer increases the point calculation rate if the number of purchase transactions reaches a predetermined number in a predetermined period.
(15) The point issuer sets the point calculation rate according to the number of accesses to customer terminals in a specific area.
(16) The point issuer optionally sets the point calculation rate according to a time band for accessing the customer terminals.
(17) The point issuer increases the point calculation rate for operations carried out at the customer terminal during off-hours of communication circuits.
(18) The point issuer issues points according to the point calculation rate set according to the number of visits of a customer to a store.
(19) According to the arrangement of the above (1), the point notifier notifies the customer of the point information with images, voices, or both.
(20) The data from the point notifier is displayed on a display of a personal computer at the customer terminal through communication circuits.
(21) The data from the point notifier is displayed on a bidirectional television display through communication circuits.
(22) The point notifier displays a graph of cumulative points and target points.
(23) The point notifier displays the target points as the whole of a given screen area and the cumulative points as an area proportional to the target points area with a reverse color.
(24) The point notifier displays the target points of an object requested by a customer as an area and the cumulative points as proportional part of the target points area with a reverse color.
(25) The point notifier sets an area for the target points of an object requested by a customer and displays part of the area in proportion to the cumulative points.
(26) The point notifier comprises service contents storage storing a list of types of services and corresponding cumulative points, reads data out of the storage means according to a type selected by a customer through the terminal, and notifies the customer of the read data.
(27) The point notifier comprises service contents storage storing a list of services and corresponding cumulative points, selects a range of services available for the cumulative points of a customer, and notifies the customer of the selected services.
(28) The point notifier is installed in a store cart and notifies a customer of the customer's cumulative points in response to customer's operations.
(29) The point notifier is installed in a store videocart and displays customer's cumulative points.
(30) The point notifier is installed in a store videocart and displays customers cumulative points together with point information of specific commodities transmitted in a specific area in a store.
(31) The point notifier is installed in a store cart and notifies a customer of cumulative points in voices.
(32) The point notifier includes a display installed in a store and displays specific customers' cumulative points if required.
(33) The point notifier includes a display installed in a store and always displays cumulative points of groups.
(34) According to the arrangement of the above (1), the point notifier notifies the customer of points through available communication circuits.
(35) The point notifier informs the customer of target points through available communication circuits.
(36) The point notifier informs the customer of cumulative points through available communication circuits.
(37) The point notifier uses available communication circuits to notify the customer of a shortage of points with respect to the target points.
(38) According to the arrangement of the above (1), the point accumulator comprises a condition monitor changing cumulative points according to predetermined conditions.
(39) The condition monitor adds interest points to the points of a customer according to the customer's cumulative points and periods.
(40) The condition monitor decreases the points of a customer if the customer carries out no transaction during a predetermined period.
(41) The point accumulation means has means for converting the points of a customer managed by a group of stores into points managed by another group of stores according to a predetermined rate if the customer requests the conversion.
(42) According to the arrangement of the above (1), the service is provided to the customer through communication circuits.
(43) The service is provided to the customer as image and voice data.
(44) The service is provided to the customer as image and voice data, and the point accumulator decreases the customer's cumulative points according to a period of providing the service.
(45) The service is provided to the customer as image and voice data, and the point accumulator decreases the customer's cumulative points according to a period of providing the service and displays the decreased result on the display of the customer terminal.
(46) According to the arrangement of the above (1), the point information is supplied to the customer through the customer terminal through a communication circuit.
(47) According to the arrangement of the above (1), the point information is supplied to the customer through the store terminal installed in a store.
(48) The point information in the above (46) and (47) includes target points and corresponding electronic services.
(49) The point information in the above (46) and (47) includes services corresponding to the customer's cumulative points provided by the point accumulator.
(50) The point information in the above (46) and (47) is the customer's cumulative points.
(51) The point information in the above (46) and (47) is a shortage of points with respect to target points registered or specified by the customer.
(52) The point information in the above (46) and (47) includes the validity of the customer's cumulative points.
(53) According to the arrangement of the above (1), the point issuer issues points to the customer without disclosing points assigned for commodities.
(54) The point issuer issues points for each transaction at random.
(55) The point issuer issues a point calculation rate for each transaction at random.
(56) The point issuer issues bonus points to the customer if the number of transactions carried out by the customer reaches a predetermined number.

(57). According to the arrangement of (1), the point accumulator collectively accumulates points issued to customers if the customer identification means identifies that the customers belong to a group.

As explained above, the present invention is applicable not only for in-store purchase transactions but also for mail-order transactions performed through public circuits. The present invention notifies customers of point information and service data and providing the customers with services without directly contacting the customers. Unlike the prior art, the present invention sets a point calculation rate according to a variety of conditions and changing the point calculation rate as and when required. The present invention flexibly handles transactions and customer needs without increasing manpower. When a customer accesses a customer terminal or a store terminal, the present invention displays the customer's cumulative points on the terminal as soon as the customer is identified. The present invention quickly displays points for a commodity before checkout, to motivate the customer to purchase the commodity. The customer can have point information such as its cumulative points and target points. This improves customer's interest in the point service.

We claim:

1. A point management system using a computer to manage points issued to each customer of a plurality of customers who receives service according to an amount of points, comprising:
    a customer identification unit to identify each customer according to a customer identification information;
    a storing unit to store points for each customer;
    a calculation unit of the computer to calculate an amount of points for each customer's current transaction using a calculation rate based on at least one specific condition including a purchase amount of the current transaction;
    an issuing unit to issue the calculated amount of points;
    an accumulation unit to accumulate the issued points to the stored points for each customer; and
    a changing unit to change the calculation rate.

2. The point management system of claim 1, wherein the changing unit changes the calculation rate for each customer's current transaction according to each customer's past transaction record.

3. The point management system of claim 2, wherein each customer's past transaction record comprises a number of times of customer transactions.

4. The point management system of claim 2, wherein each customer's past transaction record comprises a number of times of customer access to the point management system through a terminal.

5. The point management system of claim 1, wherein the changing unit changes the calculation rate for each object in each customer's current transaction.

6. The point management system of claim 1, wherein the changing unit changes the calculation rate for each customer's current transaction according to a time zone of the transaction.

7. The point management system of claim 1, wherein the changing unit changes the calculation rate for each customer's current transaction according to a day of the transaction.

8. The point management system of claim 1, wherein the changing unit changes the calculation rate for each customer's current transaction according to an area of the transaction.

9. The point management system of claim 1, further comprising:
    a notifying unit to notify each customer of the stored and issued points via a terminal.

10. A point management system using a computer to manage points issued to each customer of a plurality of customers who receives service according to an amount of points, comprising:
    a customer identification unit to identify each customer according to a customer identification information;
    a storing unit to store points for each customer;
    a calculation unit of the computer to calculate an amount of points for each customer's current transaction using a predetermined-calculation rate based on a least one specific condition including a purchase amount of the current transaction;
    an issuing unit to issue the calculated amount of points;
    an accumulation unit to accumulate the issued points to the stored points for each customer; and
    a changing unit to change a total amount of accumulated points according to a frequency of each customer's transactions.

11. The point management system of claim 10, further comprising:
    a notifying unit to notify each customer of the stored and issued points via a terminal.

12. A method of managing points issued to each customer of a plurality of customers who receives service according to an amount of points, the method employing a computer and comprising:
    identifying each customer according to a customer identification information;
    storing points for each customer;
    calculating at the computer an amount of points for each customer's current transaction using a calculation rate based on at least one specific condition including a purchase amount of the current transaction;
    issuing the calculated amount of points;
    accumulating the issued points to the stored points for each customer; and
    changing the calculation rate.

13. The method of claim 12, wherein the changing operation changes the calculation rate for each customer's current transaction according to each customer's past transaction record.

14. The method of claim 13, wherein each customer's past transaction record comprises a number of times of customer transactions.

15. The method of claim 13, wherein each customer's past transaction record comprises a number of times of customer access to the point management system through a terminal.

16. The method of claim 12, wherein the changing operation changes the calculation rate for each object in each customer's current transaction.

17. The method of claim 12, wherein the changing operation changes the calculation rate for each customer's current transaction according to a time zone of the transaction.

18. The method of claim 12, wherein the changing operation changes the calculation rate for each customer's current transaction according to a day of the transaction.

19. The method of claim 12, wherein the changing operation changes the calculation rate for each customer's current transaction according to an area of the transaction.

20. The method of claim 12, further comprising:
    notifying each customer of the stored and issued points via a terminal.

21. A method of managing points issued to each customer of a plurality of customers who receives service according to an amount of points, the method employing a computer and comprising:
- identifying each customer according to a customer identification information;
- storing points for each customer;
- calculating at the computer an amount of points for each customer's current transaction using a calculation rate based on at least one specific condition including a purchase amount of the current transaction;
- issuing the calculated amount of points;
- accumulating the issued points to the stored points for each customer; and
- changing a total amount of accumulated points according to a frequency of each customer's transactions.

22. The method of claim 21, further comprising:
- notifying each customer of the stored and issued points via a terminal.

23. A machine-readable medium that provides instructions for managing points issued to each customer of a plurality of customers who receives service according to an amount of points, which, when executed by a machine, cause the machine to perform operations comprising:
- identifying each customer according to a customer identification information;
- storing points for each customer;
- calculating an amount of points for each customer's current transaction using a calculation rate based on at least one specific condition including a purchase amount of the current transaction;
- issuing the calculated amount of points;
- accumulating the issued points to the stored points for each customer; and
- changing the calculation rate.

24. The machine-readable medium of claim 23, wherein the changing operation changes the calculation rate for each customer's current transaction according to each customer's past transaction record.

25. The machine-readable medium of claim 24, wherein each customer's past transaction record comprises a number of times of customer transactions.

26. The machine-readable medium of claim 24, wherein each customer's past transaction record comprises a number of times of customer access to the point management system through a terminal.

27. The machine-readable medium of claim 23, wherein the changing operation changes the calculation rate for each object in each customer's current transaction.

28. The machine-readable medium of claim 23, wherein the changing operation changes the calculation rate for each customer's current transaction according to a time zone of the transaction.

29. The machine-readable medium of claim 23, wherein the changing operation changes the calculation rate for each customer's current transaction according to a day of the transaction.

30. The machine-readable medium of claim 23, wherein the changing operation changes the calculation rate for each customer's current transaction according to a day of the transaction.

31. The machine-readable medium of claim 23, wherein the instructions cause the machine to perform operations further comprising:
- notifying each customer of the stored and issued points via a terminal.

32. A machine-readable medium that provides instructions for managing points issued to each customer of a plurality of customers who receives service according to an amount of points, which, when executed by a machine, cause the machine to perform operations comprising:
- identifying each customer according to a customer identification information;
- storing points for each customer;
- calculating an amount of points for each customer's current transaction using a calculation rate based on at least one specific condition including a purchase amount of the current transaction;
- issuing the calculated amount of points;
- accumulating the issued points to the stored points for each customer; and
- changing a total amount of accumulated points according to a frequency of each customer's transactions.

33. The machine-readable medium of claim 32, wherein the instructions cause the machine to perform operations further comprising:
- notifying each customer of the stored and issued points via a terminal.

* * * * *

UNITED STATES PATENT AND TRADEMARK OFFICE
CERTIFICATE OF CORRECTION

PATENT NO. : 6,965,869 B1
APPLICATION NO. : 08/864762
DATED : November 15, 2005
INVENTOR(S) : Tokimori Tomita et al.

Page 1 of 1

It is certified that error appears in the above-identified patent and that said Letters Patent is hereby corrected as shown below:

Title Page, item (75) Inventors, after "Yasumasa Hiroshima, Kawasaki (JP)" insert - - Mitsuhito Matsumoto, Kawasaki (JP)- -

Cover Page, Line (56) References Cited, OTHER PUBLICATIONS, change "Database Marketng (Article in Catalog AGE, May 1988, pp. 85-97) Author unknown." to - - Database Marketing (Article in Catalog AGE, May 1988, pp. 85-97) Author unknown.- -

Column 24, line 14, delete "predeterminded-"

Column 24, line 14, change "a least" to - - at least - -

Column 26, line 14, change "a day" to - - an area - -

Signed and Sealed this

First Day of August, 2006

JON W. DUDAS
*Director of the United States Patent and Trademark Office*